(12) United States Patent
Shobatake

(10) Patent No.: US 7,272,143 B2
(45) Date of Patent: Sep. 18, 2007

(54) ATM COMMUNICATION SYSTEM, PROCESS MIGRATION METHOD IN THE ATM COMMUNICATION SYSTEM, AND HANDOVER PROCESSING METHOD

(75) Inventor: Yasuro Shobatake, Kawasaki (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 1072 days.

(21) Appl. No.: 10/253,413

(22) Filed: Sep. 25, 2002

(65) Prior Publication Data

US 2003/0021279 A1    Jan. 30, 2003

Related U.S. Application Data

(63) Continuation of application No. 09/198,454, filed on Nov. 24, 1998, now Pat. No. 6,553,014, which is a continuation of application No. 08/615,074, filed on Mar. 12, 1996, now Pat. No. 5,872,786.

(30) Foreign Application Priority Data

Mar. 13, 1995  (JP) .................................. 7-079363

(51) Int. Cl.
  *H04L 12/28* (2006.01)
  *H04L 12/56* (2006.01)

(52) U.S. Cl. .................... 370/395.3; 370/396; 370/410
(58) Field of Classification Search ................ 370/310, 370/321, 328, 331, 395.1, 395.2, 395.3, 396, 370/397, 398, 399, 400, 409, 410; 709/105, 709/106, 221, 310; 718/100–108

See application file for complete search history.

(56) References Cited

U.S. PATENT DOCUMENTS 4,901,231 A * 2/1990 Bishop et al. ............... 707/205

(Continued)

FOREIGN PATENT DOCUMENTS

JP        6-77989        3/1994

(Continued)

OTHER PUBLICATIONS

Michael R. Casey, "Realizing Mobile Computing Personae, Dissertation Proposal", Apr. 1994.

(Continued)

*Primary Examiner*—Chi Pham
*Assistant Examiner*—Saba Tsegaye
(74) *Attorney, Agent, or Firm*—Foley & Lardner LLP

(57) ABSTRACT

An ATM communication system has a connection setting section for controlling a plurality of ATM switches to set an n:n bidirectional ATM connection having n terminals of a plurality of constituent terminals as terminal points and using the VPI/VCI for identifying the n terminal points, and a process ID allocating section for allocating an MID as a process ID to a plurality of processes, executed by the n terminals for sending a message to the bidirectional ATM connection. The ATM communication system migrates a process executed on an arbitrary terminal to another terminal while keeping the process ID allocated to the processes. Where a dead-lock occurs due to that a process becomes a sleep state for the reason of that the bandwidth of a physical link is insufficient for executing in parallel the processes on the ATM communication system, the bandwidth of the physical link that a sleeping process occupies is intercepted to avoid a CAC dead-lock.

2 Claims, 32 Drawing Sheets

U.S. PATENT DOCUMENTS

| | | | |
|---|---|---|---|
| 5,164,938 A | 11/1992 | Jurkevich et al. | 370/231 |
| 5,258,979 A | 11/1993 | Oomuro et al. | 370/232 |
| 5,315,586 A | 5/1994 | Charvillat | 370/232 |
| 5,317,738 A | 5/1994 | Cochcroft, Jr. et al. | 718/103 |
| 5,371,852 A | 12/1994 | Attanasio et al. | 709/245 |
| 5,453,981 A | 9/1995 | Katsube et al. | 370/397 |
| 5,455,826 A | 10/1995 | Ozveren et al. | 370/232 |
| 5,467,348 A | 11/1995 | Fujii et al. | 370/468 |
| 5,487,065 A | 1/1996 | Acampora et al. | |
| 5,500,847 A | 3/1996 | Han | 720/665 |
| 5,506,987 A | 4/1996 | Abramson et al. | 718/103 |
| 5,553,069 A | 9/1996 | Ueno et al. | |
| 5,553,241 A | 9/1996 | Shirakihara | 709/227 |
| 5,559,797 A | 9/1996 | Murase | 370/412 |
| 5,583,865 A | 12/1996 | Esaki et al. | 370/397 |
| 5,633,868 A | 5/1997 | Baldwin et al. | |
| 5,802,590 A | 9/1998 | Draves | 711/164 |
| 5,872,786 A | 2/1999 | Shobatake | 370/398 |
| 5,892,910 A | 4/1999 | Safadi | |
| 5,930,806 A | 7/1999 | Taira et al. | 707/204 |
| 5,987,511 A | 11/1999 | Elixmann et al. | 709/221 |
| 6,085,086 A | 7/2000 | La Porta et al. | 455/432 |
| 6,167,430 A | 12/2000 | Lurndal | 709/203 |

FOREIGN PATENT DOCUMENTS

| | | |
|---|---|---|
| JP | 07-046248 A | 2/1995 |
| JP | 08-510884 A | 11/1996 |
| WO | WO94/28645 A1 | 12/1994 |

OTHER PUBLICATIONS

Michael R. Casey, "Realizing Mobile Computing Personae, A Dissertation", Apr. 1995.

Karen M. Tracey, Processor sharing: Research Overview and Proposal for Implementation in ARCADE, Technical Report 90-07-02, University of Notre Dame, Dept. Elec. & Comp. Engineering (1990).

Karen M. Tracey, Migrating to Processor Sharing, Technical Report 90-11-91, University of Notre Dame Dept. of Elec. & Comp. Engineering (1990).

Karen M. Tracey, Group Management: An Approach to Processor Sharing for Cooperative Multi-task Applications, Technical Report 91-02-01, University of Notre Dame, Dept. of Elec. & Comp. Engineering (1991).

M. Powell and B. Miller, Process Migration in DEMOS/MP. ACM (1983), pp. 110-119.

D. Eager et al., "The Limited Performance Benefits of Migrating Active Processes for Load Sharing," ACM (1988), pp. 63-72.

* cited by examiner

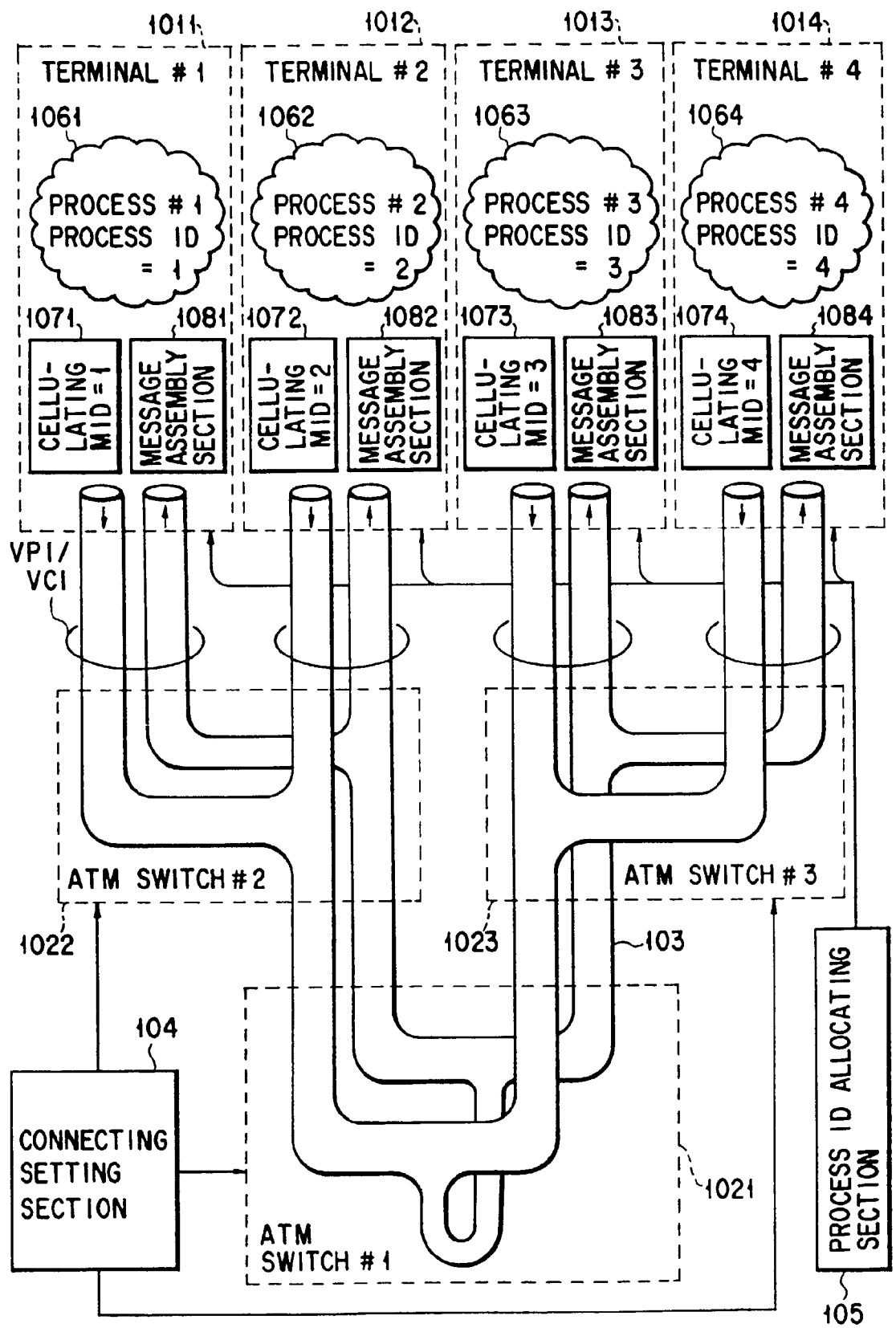
F I G. 1

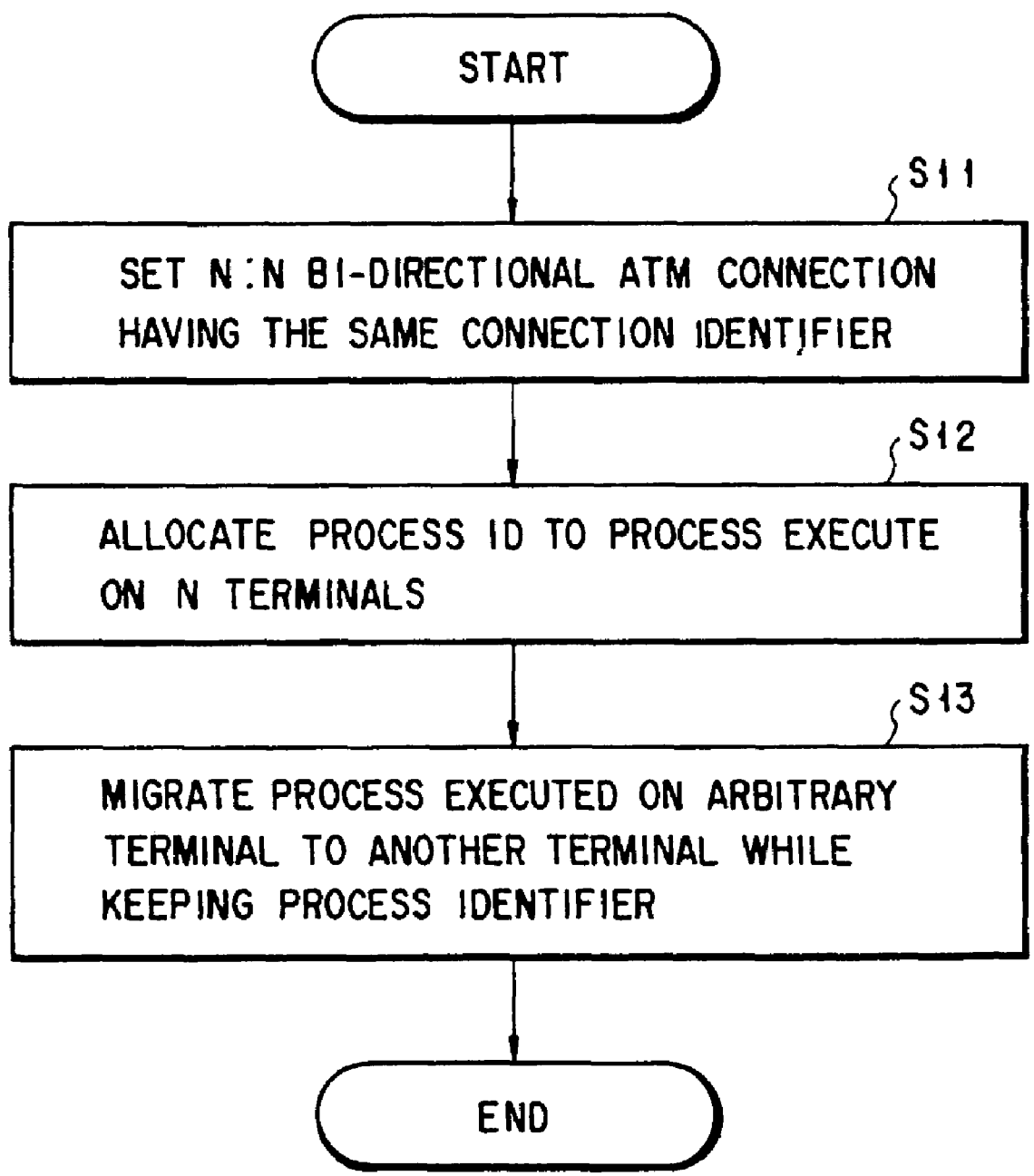
F I G. 2

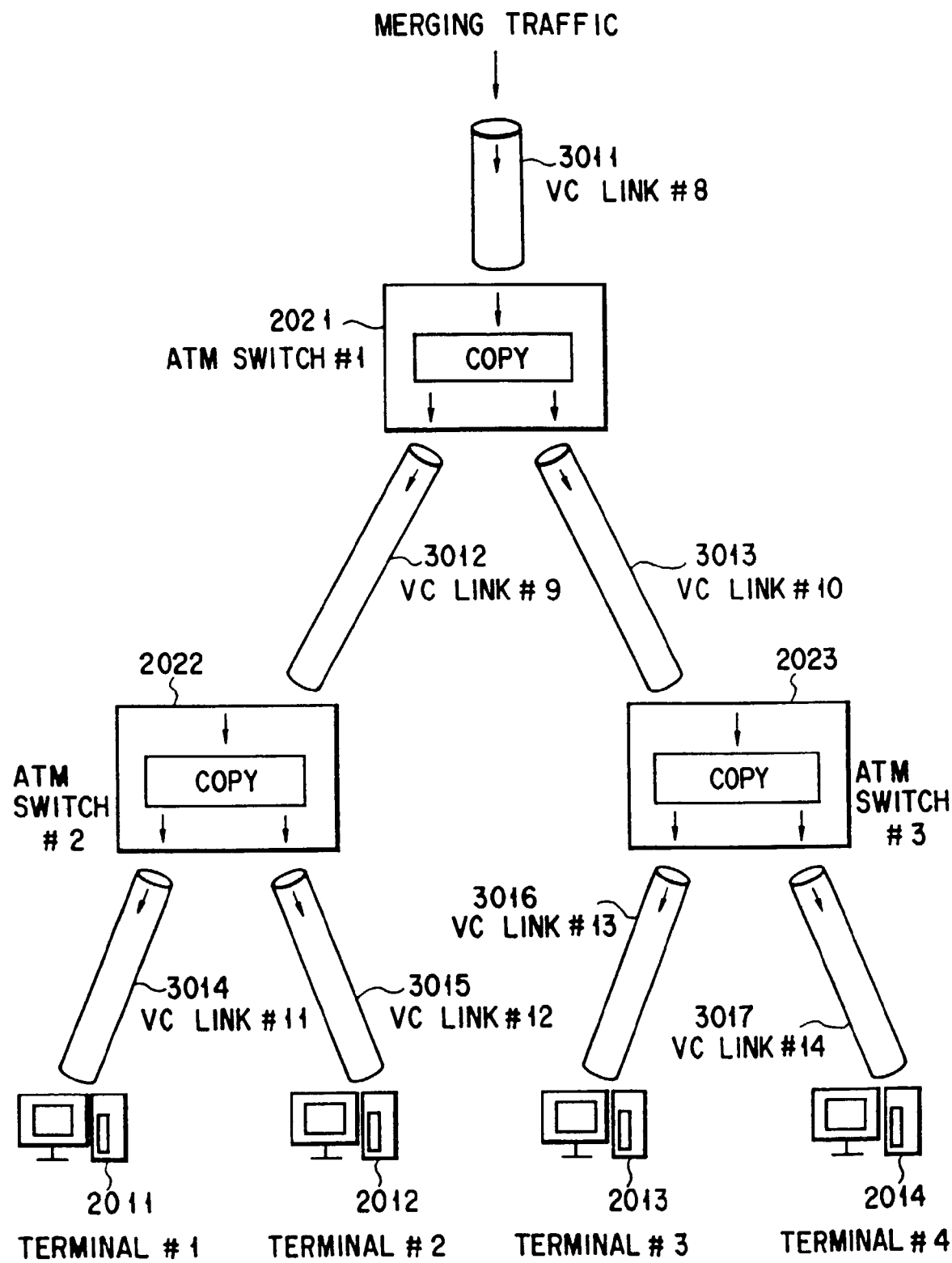
F I G. 4

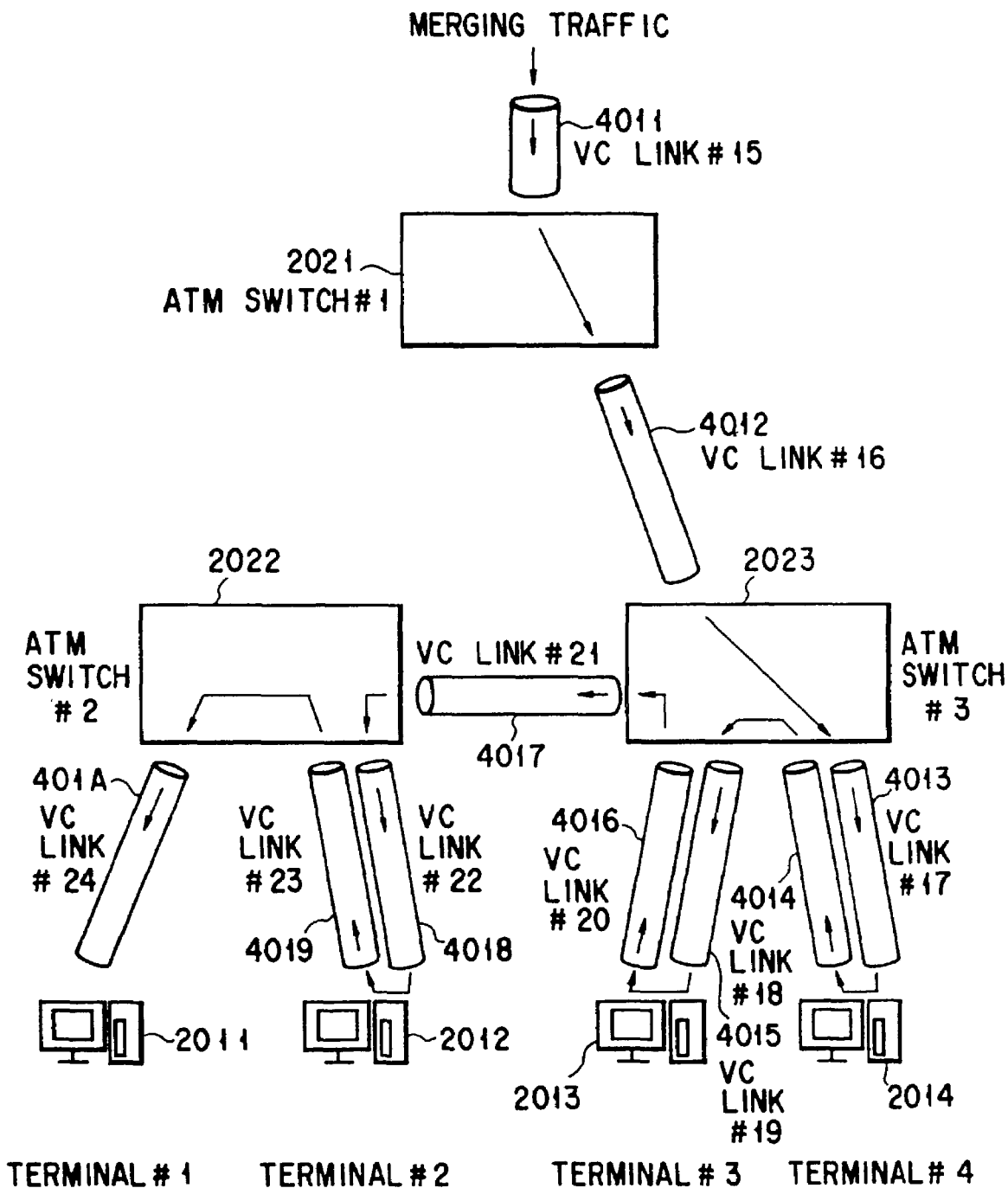
F I G. 5

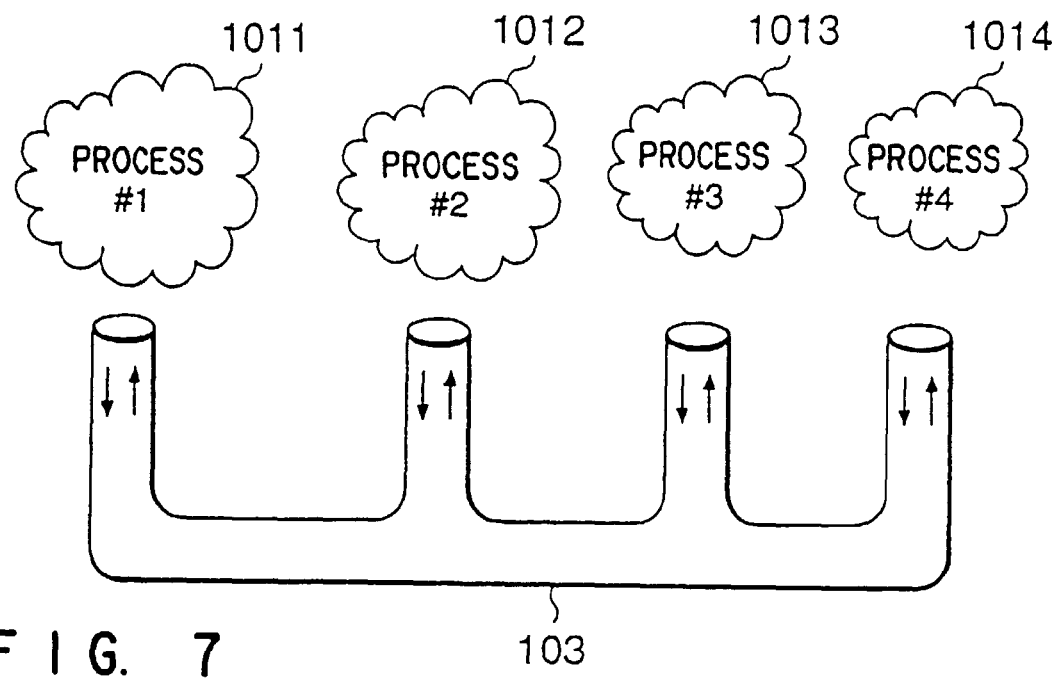
F I G. 7
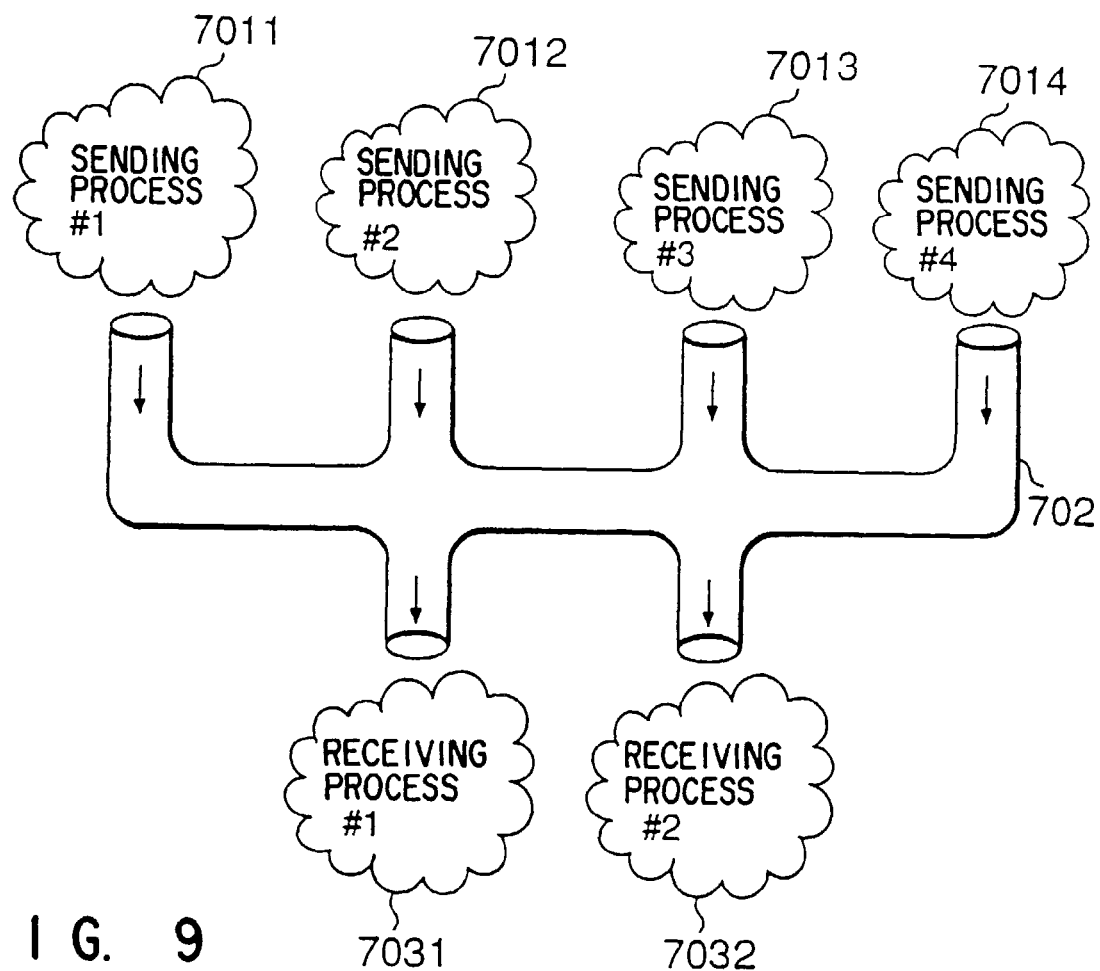
F I G. 9

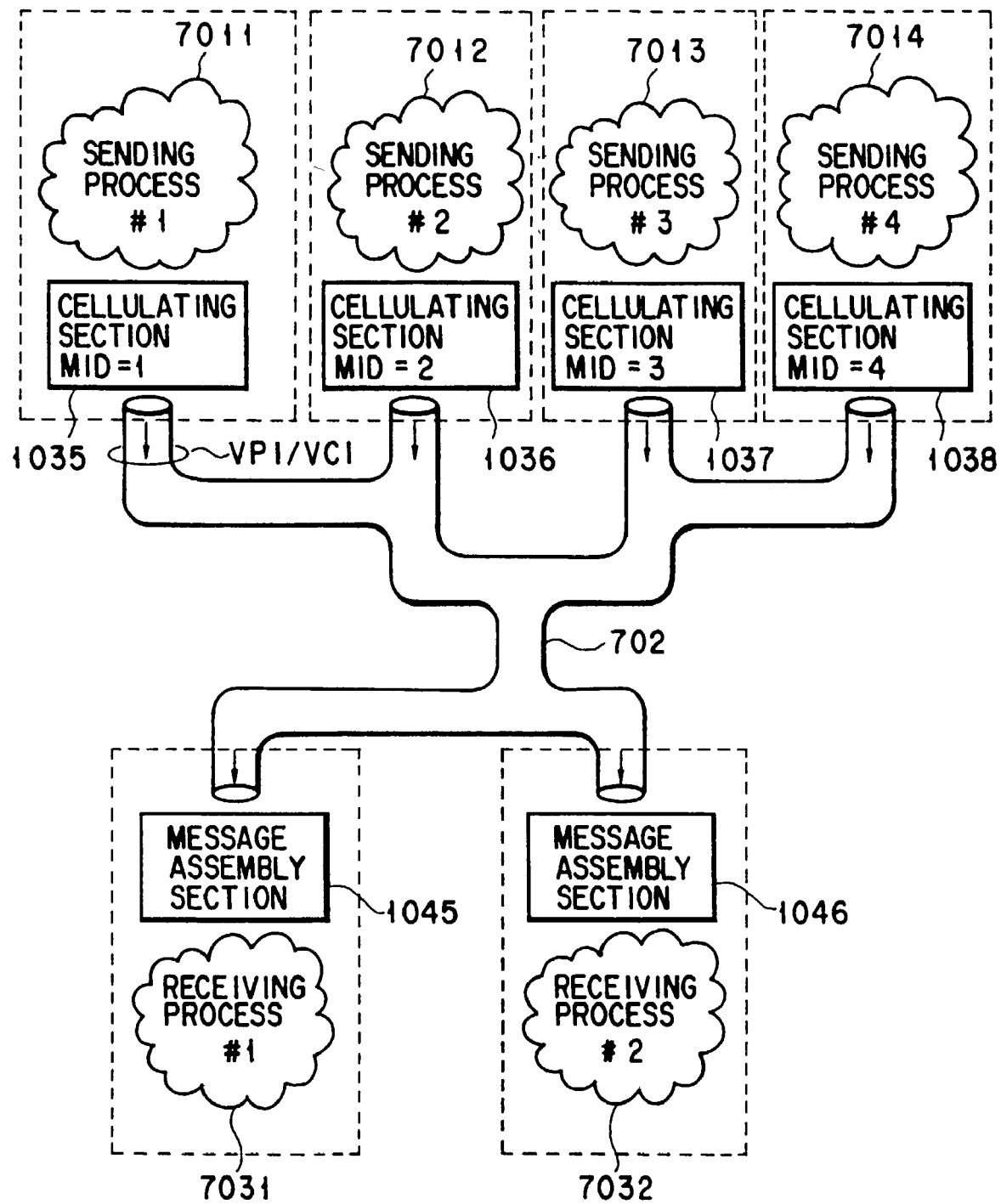
F I G. 8

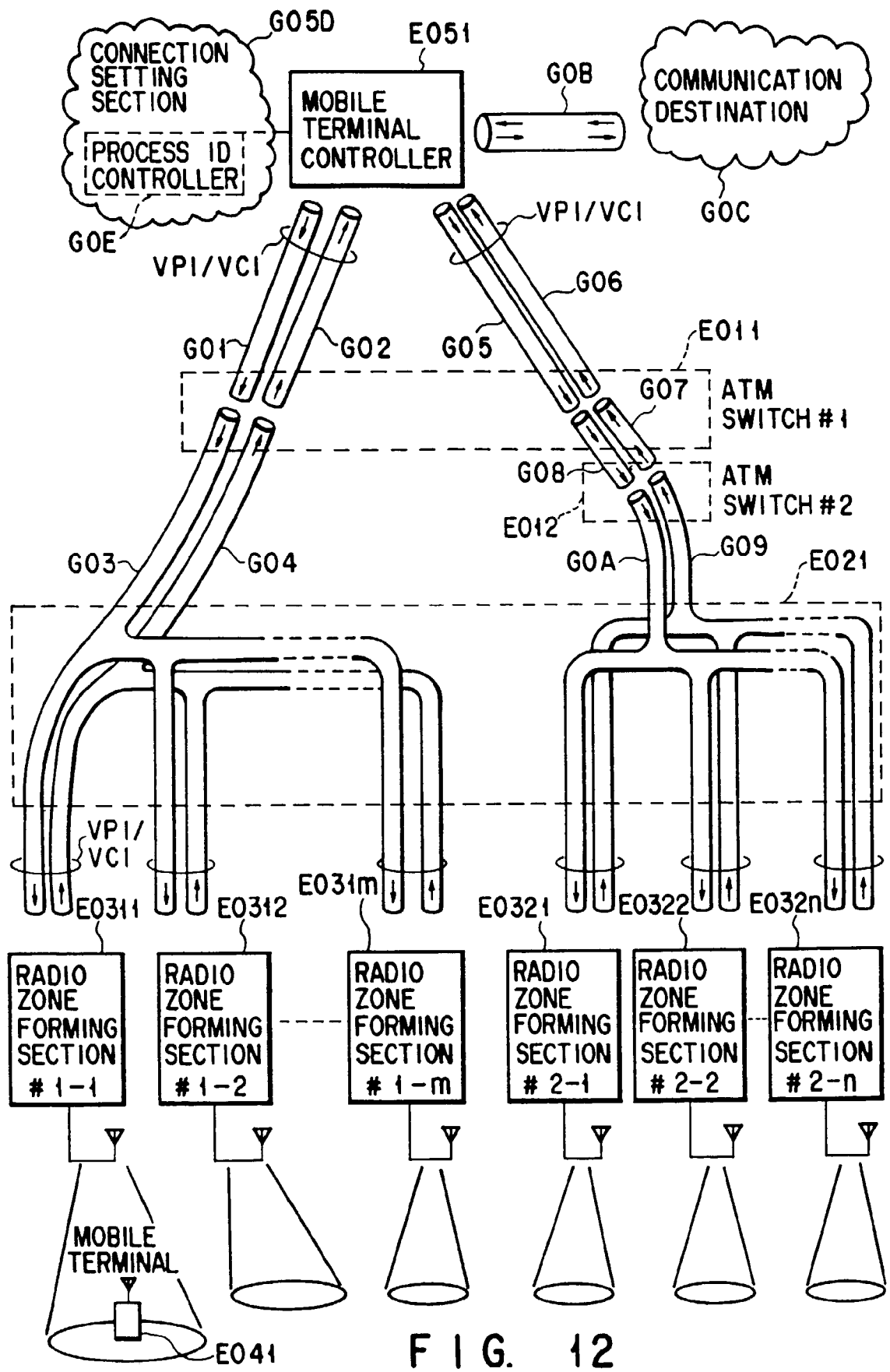
F I G. 12

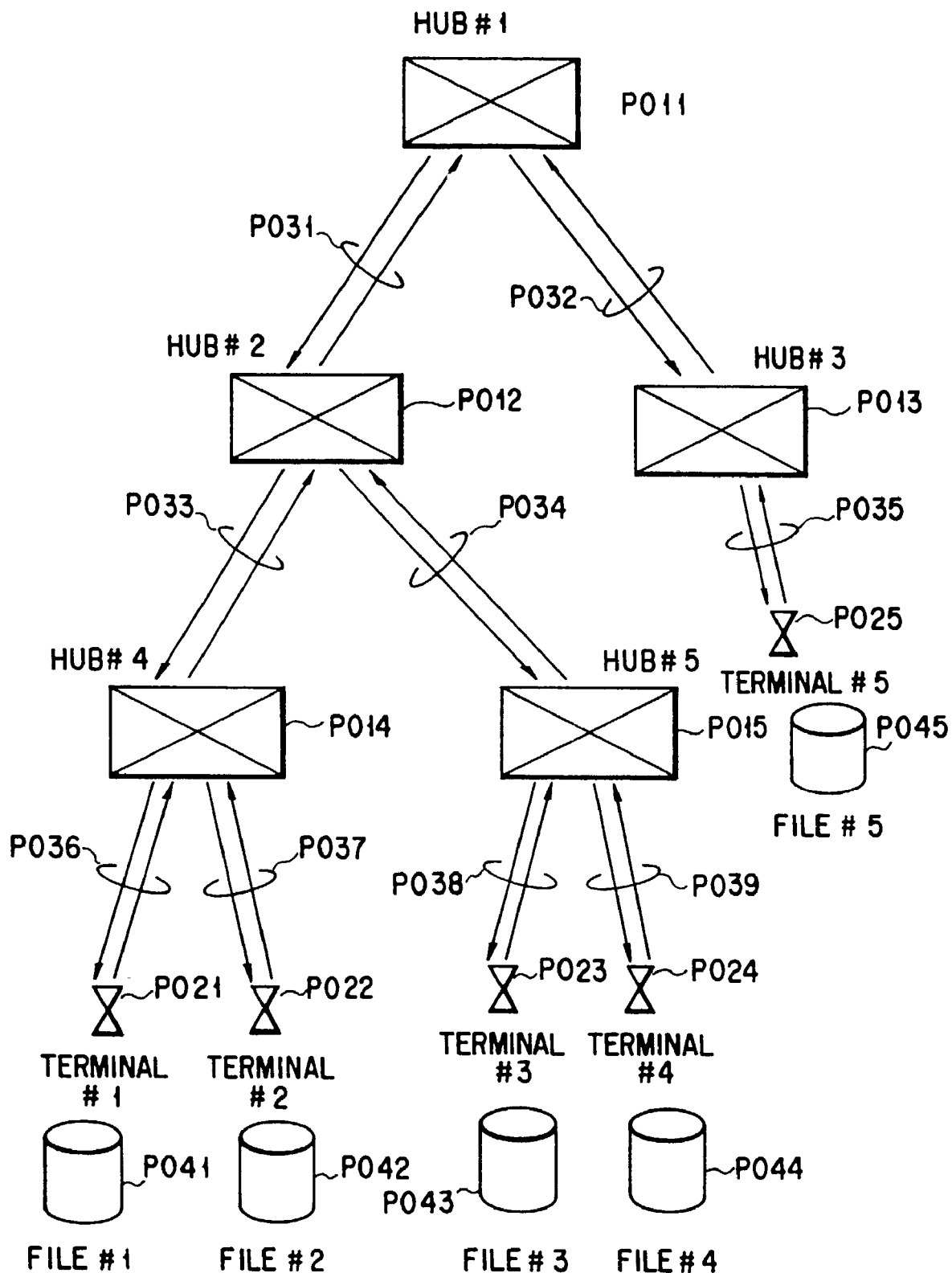
F I G. 18

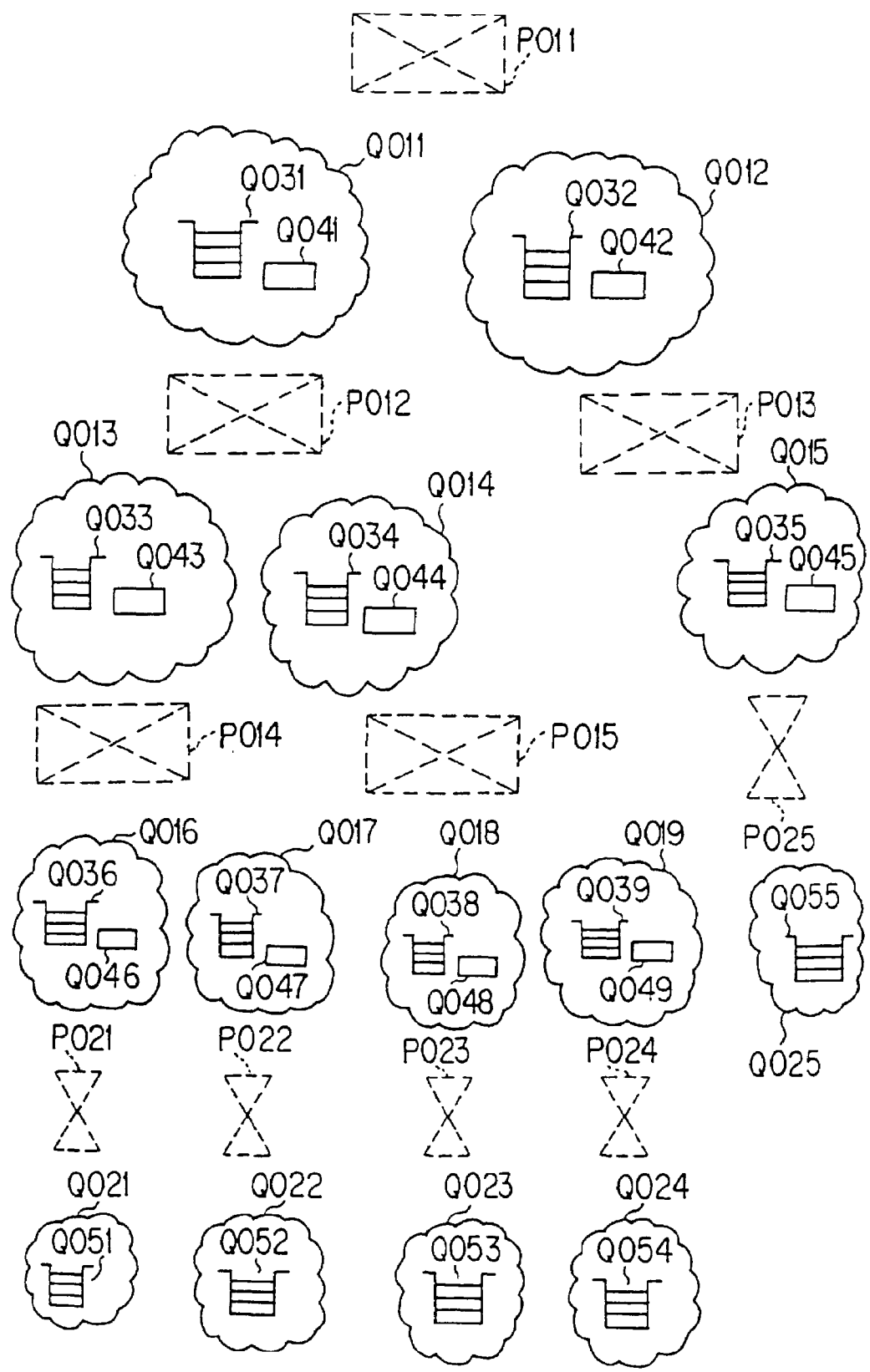
F I G. 19

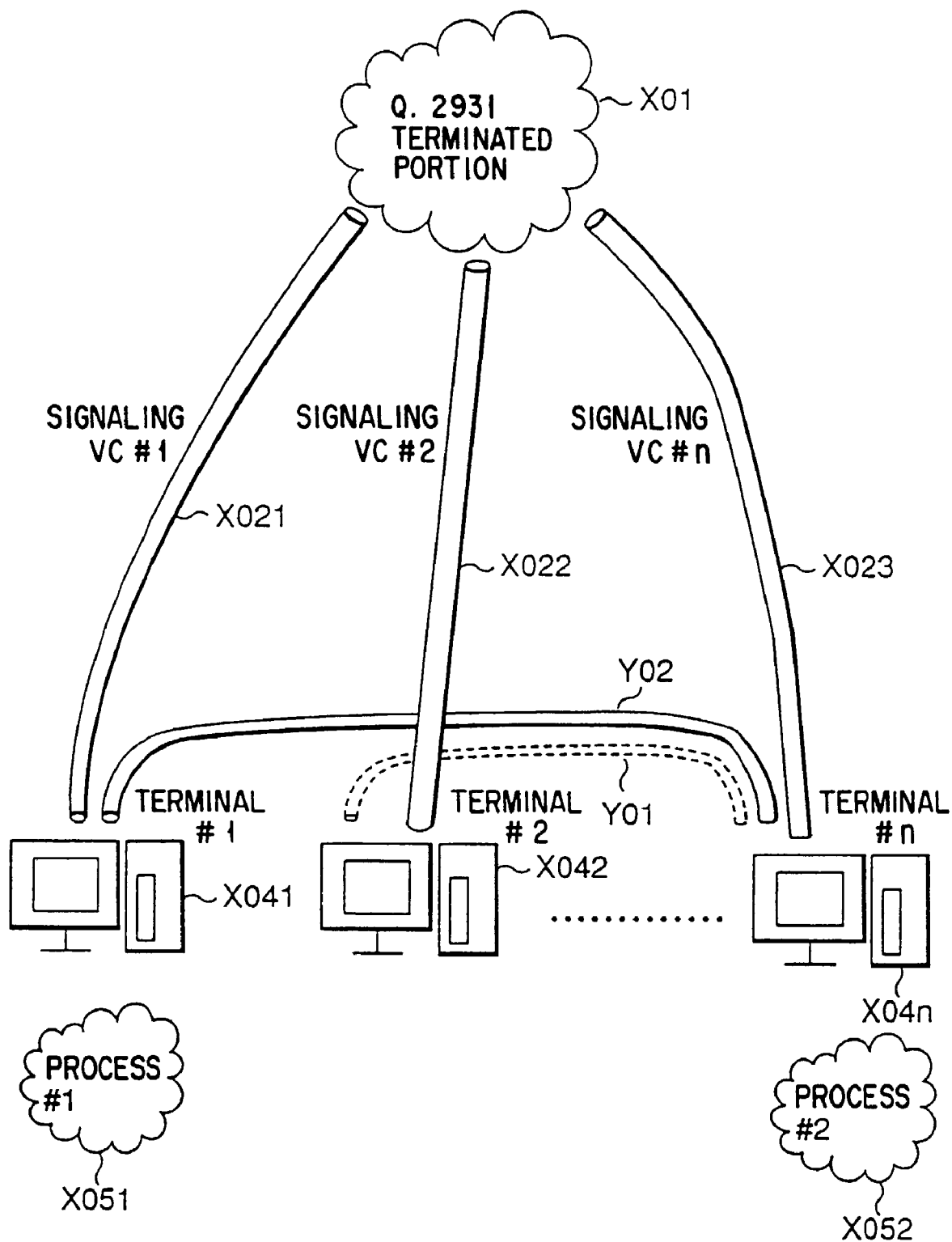
F I G. 32

ATM COMMUNICATION SYSTEM, PROCESS MIGRATION METHOD IN THE ATM COMMUNICATION SYSTEM, AND HANDOVER PROCESSING METHOD

BACKGROUND OF THE INVENTION

1. Field of the Invention

The present invention relates to a communication system, including a plurality of terminals, for performing communication among these terminals and, more particularly, to an ATM communication system in an ATM (Asynchronous Transfer Mode) and a process migration method in the ATM communication system.

2. Description of the Related Art

An ATM (Asynchronous Transfer Mode) attracts attention as a technique aiming at increasing the speed of transmission/switching technique. The ATM is a technique in which all pieces of information are carried by fixed-length short packets called cells to be transferred to aim at packaging hardware for packet exchange, thereby make it easy to transmit/switch information at a high speed.

The ATM is regarded as "promised solution" of a future B-ISDN (Broadband aspects of Integrated Services Digital Network). For this reason, study and development for applying the ATM technique to various communication systems are actively performed in recent years. For example, a so-called ATM-LAN in which the ATM technique is applied to not only a public network operated by a carrier but also a network, i.e., local area network (LAN), using a restricted area, e.g., one floor of an office to improve inter-operability with a public network, or a method of applying the ATM technique to a so-called CATV network which presents communication services to a restricted area are developed.

In the ATM communication system using the ATM technique, before communication, a so-called connection is set between terminals to communicate with each other. When the terminals to communicate with each other sends a cell to the communication system, the identifier of the connection is written in the header portion of the cell. The communication system refers to the header portion of the cell to transfer the cell along the connection to which the cell belongs, thereby transferring the cell to a desired terminal. In the ITU-T standards, the identifier of the connection in an ATM layer is called a VPI/VCI.

In this manner, in the ATM communication system, communication is performed by using a connection. For this reason, an ATM switch constituting the ATM communication system has a routing tag table for holding information indicating a specific output port to which a cell belonging the connection set on each input port is transferred and the value of a new VPI/VCI used when the cell belonging to the connection is sent from the ATM switch. Connection setting in the ATM layer is performed by setting the routing tag table on the ATM switch through which the connection passes to be a desired value.

The ATM communication system performs communication by setting a connection in advance as described above. Desired communication quality can be advantageously given to each terminal by allocating the bandwidth of each physical link to the connection in advance. However, the ATM communication system has the following problem.

A conventional ATM communication system cannot efficiently perform a multi-media application due to the following problem.

FIG. 18 shows the arrangement of an ATM-LAN serving as an example used to explain the problem. This ATM-LAN is constituted such that terminals #1 to #5 (P021 to P025) are connected to each other by hubs #1 to #5 (P011 to P015). Physical link pairs P031 to P039 are arranged to connect the hubs and terminals to each other in order to realize full duplex communication. Physical links such as optical fibers or UTPs provide unidirectional information transfer, and are used as pairs.

In addition, the terminal #1 (P021) has a file #1 (P041), the terminal #2 (P022) has a file #2 (P042), and, similarly, the terminal #5 (P025) has a file #5 (P045).

In a conventional LAN such as an ethernet, a communication bandwidth on a coaxial cable is shared by connections. However, in an ATM-LAN, CAC (Connection Admission Control) which is unique to the ATM-LAN is performed before communication is started, a communication bandwidth is exclusively allocated to each connection. For this reason, in the conventional LAN, a communication bandwidth allocated to a connection changes due to the operation of other processes. In the ATM-LAN, since communication bandwidths allocated to connections does not change due to the operation of other processes, communication which assures QoS such as to read data from a file at a constant speed can be performed. On the other hand, in a conventional LAN, a process using the LAN can always send a message. In contrast to this, in the ATM-LAN, when communication bandwidths are not allocated by the CAC, communication cannot be performed. For this reason, in consideration of execution of applications using communication bandwidths and a resource such as files, when the applications distributed on the ATM-LAN are executed, the following problem is posed.

This problem will be described with reference to the ATM-LAN shown in FIG. 18.

A process A executed on the terminal #1 (P021) assures the file #1 (P041) and transfers it to the terminal #3 (P023). In addition, a process B executed on the terminal #2 (P022) refers to the contents of the file #1. When the processes A and B are executed simultaneously, the following may occur.

The process A opens the file #1 (P041) first. On the other hand, the process B obtain all the communication bandwidths on physical links P036 and P037. In this state, the process A tries to obtain a route to the file #3 (P043) and the communication bandwidths on the physical links P036, P033, P034, and P038. However, at this time, since all the communication bandwidths of the physical link P036 has been assured by the process B. The process A fails to obtain the communication bandwidths. The process B tries to open the file #1 (P041). However, since the file #1 (P041) has been opened by the process A, the process B fails to open the file. When the processes A and B are slept in this state, a dead-lock state occurs.

Dead-lock of such a type occurs due to conflict of the usage requests of the processes A and B between the file #1 (P041) and the communication bandwidth on the physical link P036. More specifically, the dead-lock of such a type occurs such that the CAC is executed to exclusively give the communication bandwidths to a certain process, and is called CAC dead-lock. When communication bandwidths are allocated by Q. 2931, each process cannot recognize that the dead-lock state is caused conflict on the communication bandwidths on the physical link P036, and the CAC dead-lock cannot be canceled.

In a general communication system, due to a defective terminal, it may be desired to migrate a process executed on the terminal to another terminal. Such migration of a process from one terminal to another terminal is generally called process migration. In the conventional ATM communication system, this process migration is performed by the following procedure.

FIG. 31 shows a procedure of process migration on the conventional ATM communication system. In this procedure shown in FIG. 31, terminals #1 (X041), #2 (X042), ..., #n (X04n) which are connected to each other by the ATM communication system. In the conventional ATM communication system, a Q. 2931 terminated portion X01 which terminates Q. 2931 protocol for setting connections is present, a signaling VC#i (X02i) is set between the Q. 2931 terminated portion X01 and the terminals X04i. The signaling VC#i (X02i) is used to cause each terminal to specify the terminal of a callee or destination for the Q. 2931 terminated portion X01. The Q. 2931 terminated portion X01 sets a connection between a terminal which requests connection setting and a terminal specified by the connection setting request to use the connection for communication between the terminals. Although an ATM switch and physical links constituting the ATM communication system are omitted in FIG. 31 to avoid cumbersome illustration, it is considered that the ATM switch and physical links are present at a portion where the above VCs are set.

In the example shown in FIG. 31, a process #1 (X051) is executed on the terminal #(X041), and a process #2 (X052) is executed on the terminal #2 (X042). The process #1 (X051) communicates with the process #2 (X052) through a connection X03. In this state, it is considered that the process #2 (X052) operated on the terminal #2 (X042) is migrated to the terminal #n (X04n).

FIG. 32 shows a state after the migration. In order to perform the communication between the process #1 (X051) and the process #2 (X052), a new connection Y02 is set between the terminal #1 (X041) and the terminal #n (X04n). A connection Y03 set to perform the communication between these processes before migration is released. In order to migrate the process #2 (X052) from the terminal #2 (X042) to the terminal #n (X04n), a connection Y01 is set between the terminal #2 (X042) and the terminal #n (X04n). Upon completion of migration, the connection Y01 is released.

FIG. 33 shows a migration procedure performed in a conventional ATM communication system to shift the state shown in FIG. 31 to the state shown in FIG. 32.

When the terminal #2 (X042) tries to migrate the process #2 (X052) executed on the terminal #2 (X042), the terminal #2 (X042) requests the Q. 2931 terminated portion X01 to set the connection Y01 (step Z01). When the Q. 2931 terminated portion X01 receives the connection setting request, the Q. 2931 terminated portion X01 writes a proper value in the routing tag table of the ATM switch in the ATM system to set the connection (step Z02), and notifies the terminal #n (X04n) that the connection is set (step Z03). When the terminal #n (X04n) can receive the newly set connection, after the terminal #n (X04n) performs a process for receiving the connection, the terminal #n (X04n) notifies the Q. 2931 terminated portion X01 that the process for receiving the connection is performed (step Z04). When the Q. 2931 terminated portion X01 receives the connection receivable notification from the terminal #n (X04n), the Q. 2931 terminated portion X01 notifies the terminal #2 (X042) of connection setting completion (step Z0S). In this manner, since the connection Y01 is set between the terminal #2 and the terminal #n, the terminal #2 (X042) communicates with the terminal #n (X04n) by using the connection Y01 to transfer the process #2 (X052) from the terminal #2 (X042) to the terminal #n (X04n) (step Z06). At the same time, the terminal #2 (X042) uses a connection X03 to notify the terminal #1 (X041) that the process #2 (X052) executed on the terminal #2 (X042) is migrated to the terminal #n (X04n), i.e., that process migration is performed (step Z07).

When the terminal #1 (X041) is notified of process migration as described above, the terminal #1 (X041) temporarily stops execution of the process #1 (X051) and, at the same time, requests the Q. 2931 terminated portion X01 to set the connection between the terminal #1 (X041) and the terminal #n (X04n) serving as a migration destination (step Z08). When the Q. 2931 terminated portion X01 receives the request to set a connection, the Q. 2931 terminated portion X01 rewrites the routing tag table of the ATM switch on the route of the connection with a proper value to set the requested connection (step Z09). Upon completion of connection setting, the Q. 2931 terminated portion X01 notifies the terminal #n (X04n) that the connection is set (step Z10). When the terminal #n (X04n) is notified of connection setting, after the terminal #n (X04n) performs a predetermined process for receiving the connection, and notifies the Q. 2931 terminated portion X01 that reception of the connection is completed (step Z11).

When the terminal #n (X04n) notifies the Q. 2931 terminated portion X01 of the reception of the connection, the Q. 2931 terminated portion X01 notifies the terminal #1 (X041) which performs the connection setting request that the connection setting is completed (step Z12).

Since the connection Y02 between the terminal #1 (X041) and the terminal #n (X04n) is set by the above procedure, the terminal #1 (X041) uses the connection X03 and the connection Y02 to notify the terminal #2 (X042) and the terminal #n (X04n) that execution of the process #1 (X051) and the process #2 (X052) can be restarted (step Z13). By using this notification as a trigger, execution of the process #1 (X051) on the terminal #1 (X041) and execution of the process #2 (X052) on the terminal #n (X04n) are restarted.

On the ATM communication system, the connection X03 which has not been used in the communication between the process #1 (X051) and the process #2 (X052) and the connection Y01 used in only migration are still set. In order to release these connections, after the execution of the process #1 (X051) and the process #2 (X052) are restarted, the terminal #1 (X041) and the terminal #2 (X042) request the Q. 2931 terminated portion X01 to release the connection X02 and the connection Y01, respectively.

A sequences for releasing the connection X02 are shown in steps Z14, Z15, Z16, Z17, and Z18 in FIG. 33 (45), and a sequence for releasing the connection Y01 are shown in steps Z19, Z20, Z21, Z22, and Z23. Each sequence performs connection release according to the following sequence. The terminal of a connection release request sender sends a connection release request to the Q. 2931 terminated portion X01. When the Q. 2931 terminated portion X01 receives the connection release request, the Q. 2931 terminated portion X01 notifies the other terminal which performs communication by using the connection of connection release. The terminal notified of connection release executes a predetermined process executed in connection release, and then notifies the Q. 2931 terminated portion X01 that the connection release is received. When the connection release is received, the Q. 2931 terminated portion X01 changes the routing tag table of the ATM switch on the route of the connection to be released into a proper value, thereby releasing the connection. Upon completion of this operation, the Q. 2931 terminated portion X01 notifies the terminal which requires the connection release that the connection release is completed.

The above operation is a process which is executed when the process #2 (X052) is migrated from the terminal #2 (X042) to the terminal #n (X04n).

As is apparent from the above description, when process migration is to be executed on the conventional ATM communication system, connection setting/release must be performed many times. In addition, since the connection setting/release is executed by the Q. 2931 terminated portion X01, the throughput of the Q. 2931 terminated portion X01 must be increased to rapidly execute process migration, and a time required for rewriting the routing tag of the ATM switch must be shortened. However, when these measures are executed, the cost of the ATM communication system disadvantageously increases.

In addition, it should be noted that, as the values of the VPI/VCI used for identifying the connection Y02 by the process #1 (X051) and the process #2 (X052), i.e., the values of the VPI/VCI used when these processes send/receive a cell, values set when the connection X03 is used cannot be directly used. In the convention ATM communication system, the VPI/VCI for identifying a connection on each physical link is managed by the Q. 2931 terminated portion X01, and the Q. 2931 terminated portion X01 notifies the VPI/VCI at the terminal point of the connection Y02 to the terminal #n in connection setting report at reporting connection setup in step Z10 and to the terminal #1 in connection setting completion in step Z12. The terminals #1 (X041) and #n (X04n) must use the notified VPI/VCI to identify message to the processes #1 (X051) and #2 (X052), thereby performing routing to a required process. From the terminal #n viewpoint, this fact means that it must be recognized that the set connection is new connection setting according to process migration in step Z10 in which connection setting is reported. This recognition can be executed by the following manner. That is, information indicating that the connection is new connection setting according to process migration is written as user-user information serving as one information element of a Q. 2931 message, and the terminal in which the connection is set refers to the user-user information to perform matching between the notified VPI/VCI and the process using the VPI/VCI.

However, a change in VPI/VCI used before/after migration means that, when migration occurs, not only the migrated process but also a process whose execution is restarted on the same terminal refer to the information element of the message sent from the Q. 2931 terminated portion X01, the connections used when these processes input and output information must be reconnected. More specifically, the processes must refer to the message sent from the Q. 2931 terminated portion X01 to perform any process to all the processes related to the process in which migration occurs. For this reason, a time required for migration is more increased.

As described above, in the conventional ATM communication system, the CAD dead-lock occurs and a multi-media application cannot be efficiently executed. In addition, when process migration is to be performed, access to the Q. 2931 terminated portion must be performed in a complex pattern to set and release a large number of connections. In order to perform process migration at a high speed, the throughput of the Q. 2931 terminated portion X01 must be increased, and a time required for rewriting the routing tag of the ATM switch must be shortened. For this reason, the cost of the ATM switch disadvantageously increases. In addition, in order to realize high-speed process migration, it is a fault that a large number of processes must be performed to various processes in migration.

SUMMARY OF THE INVENTION

It is an object of the present invention to provide an ATM communication system capable of suppressing occurrence of the CAC dead-lock and rapidly performing process migration without increasing a system cost, a process switching method in the ATM communication system, and a process migration method in the ATM communication system.

According to the present invention, there is provided an ATM communication system comprising a plurality of ATM switches, and a plurality of terminals connected to each other thorough the plurality of ATM switches, wherein, since the bandwidth of a connection required to be set exceeds the remaining bandwidth of at least one physical link between the ATM switches or between the ATM switches and the terminals, when dead-lock occurs when a process executed by one of the plurality of terminals is slept, the process executed by the ATM communication system intercepts the bandwidth of at least one physical link obtained by a slept process group to allocate a bandwidth required by the process which requires the connection setting.

According to the present invention, there is provided an ATM communication system comprising a plurality of ATM switches, a plurality of terminals connected to each other through the ATM switches, a connection setting section for controlling the plurality of ATM switches to set an n:n bidirectional ATM connection having n terminals of the plurality of terminals as n terminal points and using the same VPI and VCI of a cell header serving as a connection identifier for identifying the n terminal points, a process identifier allocating section for allocating, to a plurality of processes for sending a message to the bidirectional ATM connection, a process identifier for identifying the processes, and a migrating section for migrating the process executed on an arbitrary terminal of the n terminals to another terminal of the n terminals while the process identifier allocated to the processes by the process identifier allocating section.

According to the first aspect of the present invention, there is provided a process migration method in an ATM communication system comprising the steps of: setting, through a plurality of ATM switches, an n:n bidirectional ATM connection having n terminals of a plurality of terminals as terminal points and using the same connection identifier for identifying the n terminal points; allocating, to a plurality of processes, executed by the n terminals, for sending a message to the bidirectional ATM connection, the process identifier for identifying the processes; and migrating the process executed on an arbitrary terminal of the n terminals to another terminal of the n terminals while keeping the process identifier allocated to the processes.

According to the second aspect of the present invention, there is provided a handover processing method in an ATM communication system in which a plurality of fixed terminals and a plurality of mobile terminal interface apparatuses arranged on different radio zones for interfacing mobile terminals are connected to each other through a plurality of ATM switches, comprising the steps of: setting an n:m first unidirectional ATM connection having n terminals of the plurality of fixed terminals as input side terminal points and m mobile terminal interface apparatuses of the plurality of mobile terminal interface apparatus and an m:n second unidirectional ATM connection having the m mobile terminal interface apparatus as input side terminal points and the n fixed terminals as output side terminal points by controlling the plurality of ATM switches; allocating the same connection identifier to identify the m input side terminal points of the first unidirectional ATM connection and identify the m output side terminals of the second unidirectional ATM connection; and specifying an ATM connection used in communication with the fixed terminals with the connection identifier allocated by the connection identifier allocating section when the mobile terminal communicates with the fixed terminal while moving.

According to the first aspect of the present invention, when process migration in which a process (process for transferring a message to an ATM connection) executed in a certain terminal is migrated to another terminal is to be performed, since the ATM connection for executing process migration is preset in n terminals including the terminal in which the process migration is executed, unlike the prior art, connection setting/release need not be performed by a Q. 2931 terminated portion. As the ATM connection for executing the process migration, an n:n bidirectional ATM connection having the same identifier at a terminal point is set. A process identifier used to perform a process of transferring a message to the bidirectional ATM connection is allocated to a process subjected to migration, and the process identifier is not changed before/after the migration. For this reason, influence on an inter-process communication process following the migration is minimized. Therefore, process migration can be performed at a speed higher than that in the prior art. In addition, since the process migration is performed without the Q. 2931 terminated portion, the throughput of the Q. 2931 terminated portion need not be increased, and a time required for rewriting the routing take of the ATM exchanger need not be shortened. For this reason, the cost of the ATM communication can be reduced.

The process which performs communication by the n:n bidirectional ATM connection sends/receives, through the ATM connection, a message of a single cell including the process identifier and the identifier of the terminal in which the process is executed, so that process identifiers respectively used by processes are exchanged with each other. In this case, when each process can access the n:n bidirectional ATM connection, the corresponding process can know unused process identifier by receiving only the notified message. For this reason, a new process can be easily added.

In a process of allocating a resource to be managed to a resource managing process group, when a process identifier is used to identify processes from each other, even if process migration in which a terminal in which one arbitrary process of the resource managing process group is merged to another terminal occurs, the process can conceal the occurrence of the process migration from the other resource managing processes. In addition, when resource identifiers of the resource managing process group can be made globally unique, even if a resource managing process is migrated, data of the resource managing process need not be rewritten. For this reason, high-speed process migration can be performed.

According to another aspect of the present invention, the connection identifier of the m output terminal points of an n:m first unidirectional ATM connection is made identical to the connection identifier of the m input terminal points of an n:m second unidirectional ATM connection. For this reason, even if a mobile terminal which accesses these input/output terminal points changes an access point, i.e., moves the access point to a different radio zone, an ATM connection used for communication with a fixed terminal without changing the connection identifier can be set to continue the communication, and migration of the mobile terminal, i.e., a handover process, can be performed with a simple protocol.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a view showing the arrangement of an ATM communication system according to Embodiment 2 of the present invention;

FIG. 2 is a flow chart showing a schematic procedure for process migration in Embodiment 1;

FIG. 4 is a view for explaining a first setting method on the copy side of the n:n bidirectional ATM connection in Embodiment 1;

FIG. 5 is a view for explaining a second setting method on the copy side of the n:n bidirectional ATM connection in Embodiment 1;

FIG. 7 is a schematic view showing an n:n bidirectional ATM connection;

FIG. 8 is a schematic view showing the arrangement of an ATM communication system according to Embodiment 2 of the present invention;

FIG. 9 is a schematic view showing an m:n uni-directional ATM connection in Embodiment 2;

FIG. 12 is a view showing an ATM connection set to execute the first application;

FIG. 18 is a view showing the arrangement of a system in which the second application of the present invention is executed according to Embodiment 4 of the present invention;

FIG. 19 is a view showing the correspondence between physical resources and resource managing processes in Embodiment 4;

FIG. 32 is a view for explaining process migration in the conventional ATM communication system.

DETAILED DESCRIPTION OF THE PREFERRED EMBODIMENTS

Figure 3:
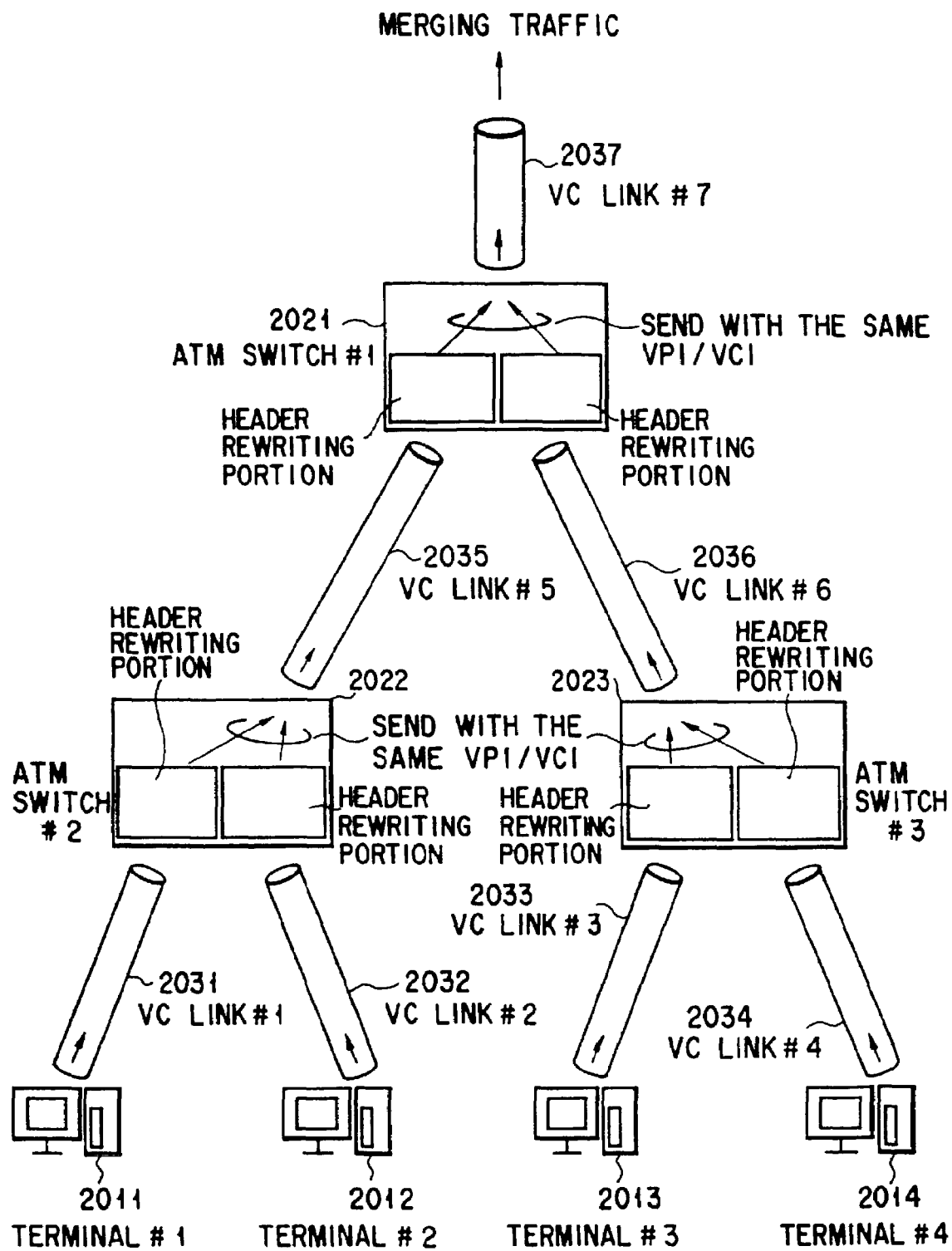
FIG. 3 is a view for explaining a setting method on the merging side of an n:n bidirectional ATM connection in Embodiment 1.

Embodiments of the present invention will be described below with reference to the accompanying drawings.

The problem of process migration is described first.

FIG. 1 is a view showing the schematic arrangement of an ATM communication system according to an embodiment of the present invention, and shows the following state. That is, four terminals #1 to #4 (1011 to 1014) are connected to each other through three ATM switches #1 to #3 (1021 to 1023), and an n:n bidirectional ATM connection 103 having the terminals #1 to #4 (1011 to 1014) as terminal points is set. As a matter of course, physical links are present between the ATM switches and between the ATM switches and the terminals in which the n:n bidirectional ATM connection 103 is set. However, the physical links are omitted in FIG. 1 for descriptive convenience. In this example, as the n:n bidirectional ATM connection 103, a 4:4 bidirectional ATM connection is constituted by four terminals and three ATM switches. As a matter of course, an ATM communication system constituted by an n:n bidirectional ATM connection can be applied as an ATM communication system constituted by an arbitrary number of terminals and an arbitrary number of ATM switches.

In the terminals #1 to #4 (1011 to 1014), four processes #1 to #4 (1061 to 1064) which perform a process with interaction communicate with each other through the n:n bidirectional ATM connection 103. In this case, when process migration is performed according to the present invention, i.e., when the processes #1 to #4 (1061 to 1064) respectively executed in the terminals #1 to #4 (1011 to 1014) are migrated to other terminals #i (101i), it is one characteristic feature that some or all of the ATM switches #1 to #3 (1021 to 1023) are controlled by a connection setting section 104 to preset the n:n bidirectional ATM connection 103 to the terminals #i in which processes #i may be executed. The present invention also has the following characteristic feature. That is, the n:n bidirectional ATM connection 103 uses the same identifier (VPI/VCI in this example) as the connection identifiers for identifying the connection in the terminals #1 to #4 (1011 to 1014).

Note that the number of the processes are not limited to four, and the number may be larger or smaller than four. In this case, the following description is performed while the number of processes is assumed as four. In addition, communication need not be performed by using the n:n bidirectional ATM connection 103 having the number of branches which is equal to the number of processes, and an n:n bidirectional ATM connection having the number of branches which is larger than the number of processes can be used.

Assume that a variable length message is used to perform communication of the processes #1 to #4 (1061 to 1064). In this case, as well known, an adaptation process must be performed each process and the bidirectional ATM connection 103. This adaptation process constituted by a cellulating process for deforming the variable length message in the form of a fixed length cell, and a message assembling process for assembling fixed length cells to reproduce a variable length message on the basis of the fixed length cells. In this case, in the terminals #1 to #4 (1011 to 1014), cellulating section 1071 to 1074 and message assembly sections 1081 to 1084 are arranged between the processes #1 to #4 (1061 to 1064) and the bidirectional ATM connection 103. Assume that, in the adaptation process in this case, an AAL3/4 defined by I. 363 of ITU-T standards is applied. The SAR sublayer of the AAL3/4 includes an identifier called an MID. By using the MID, a plurality of messages simultaneously transferred can be correctly assembled in the same VPI/VCI.

Note that the adaptation process applied to the present invention is not limited to the AAL3/4 described in this embodiment, and any adaptation process in which, even if a plurality of messages are simultaneously transferred to the same VPI/VCI as described above, the messages can be correctly assembled may be used. In this case, information such as the MID of the AAL3/4 indicating that the same identifier is added to the cells formed from the same message, i.e., that the cells are from the same message source is present in the header portion of an adaptation layer.

The connection setting section 104 may be, e.g., a network control function which is set by a maintenance person of an ATM communication system from an OAM interface comprising an ATM switch such as SNMP/CMIS/CMIP, or may be a network control function which is set by a request from a terminal according to a call setting protocol such as Q. 2931 or a call setting program disclosed in Japanese Patent Application No. 6-31180. More specifically, the execution position of the connection setting section 104 may be the ATM switch of terminal in the ATM communication system. In the following concrete embodiments, the execution position of the ATM connection setting by the connection setting section 104 is both the ATM switch and terminal.

When the processes #1 to #4 (1061 to 1064) executed on the terminals #1 to #4 (1011 to 1014) change a message into cells and send the cells to the n:n bidirectional ATM connection 103, the terminals #1 to #4 (1011 to 1014) use process identifiers (to be referred to as process IDs hereinafter) added to the processes #1 to #4 (1061 to 1064) to change the message into cells in the cellulating section 1071 to 1074. In this case, when the processes #1 to #4 (1061 to 1064) executed on the terminals #1 to #4 (1011 to 1014) are migrated to other terminals, the same process IDs can be used before/after the migration to make cells from the message in sending them.

The process IDs are notified to the terminals #1 to #4 (1011 to 1014) by a process ID allocation section 105 when the processes #1 to #4 (1061 to 1064) are started or the n:n bidirectional ATM connection 103 is set. The processes #1 to #4 (1061 to 1064) themselves may have the function of the process ID allocation section 105, or another function of the ATM switch or another process of the terminal may have the function of the process ID allocation section 105. When the processes #1 to #4 (1061 to 1064) themselves have the function of the process ID allocation section 105, a method of statically acquiring process IDs in which the maintenance person of the ATM communication system allocates the process IDs in advance when a program for realizing the processes is described, or a method of causing the processes to communicate with each other to dynamically acquire the process IDs used by the processes may be used. The following concrete embodiments have the following two cases. That is, the process ID allocation section 105 is realized such a manner that the process ID allocation section 105 is distributed into the processes which perform interaction by using the bidirectional ATM connection 103, and allocation of process IDs is performed in another process on the terminal side or on the ATM switch side.

Procedure of Process Migration

A schematic procedure of process migration in this embodiment will be described below with reference to the flow chart shown in FIG. 2.

When a service in which a process migration is predicted is started on an ATM communication system, the connection setting section 104 sets the bidirectional ATM connection 103 having the same connection identifier through the ATM stitches #1 to #3 (1021 to 1023) (step S11).

The process ID allocation section 105 allocates the process IDs for identifying these processes to the plurality of processes #1 to #4 (1061 to 1064) which send a message to the bidirectional ATM connection 103 (step S12).

When a process migration request is generated, processes #i (106i) executed in arbitrary terminals #i (101i) of the n terminals #1 to #4 (1011 to 1014) are migrated to other terminals #j (101j) of the n terminals #1 to #4 (1011 to 1014) while process IDs allocated to the processes are held (step S13).

With the above procedure, the process migration in which the processes #i (106i) executed in the terminals #i (101i) are migrated to the terminals #j (101j) is executed.

Concrete Operation of Embodiment 1

The operation of this embodiment will be more concretely described below. The processes #1 to #4 (1061 to 1064) executed on the terminals #1 to #4 (1011 to 1014) are connected to each other by the 4:4 bidirectional ATM connection 103. An MID serving as a process identifier used when a message is sent to the bidirectional ATM connection 103 is allocated to each of the processes #i (106i). When each message received from the processes #i (106i) is to be divided into cells by a cellulating sections 107i, the MID is added to each of the divided pieces. When the messages are to be assembled by message assembly sections 108i, cells having the same MID are gathered to assemble the messages. In this manner, even if cells from a plurality of message sources are merged and given to the message assembly sections 108i, the message assembly sections 108i can correctly reproduce the messages unless the arriving order of the cells sent from the same process in each process is the same as the sending order of the cells in the 4:4 bidirectional ATM connection 103.

This MID is allocated to each process in such a manner that the same MID is not used among the processes which perform communication by the same bidirectional ATM connection, i.e., that the same number is prevented from being used. This allocating method will be described later.

When each of the processes #i (106i) tries to transfer some information to another process, the process #i (106i) changes the information into a message and sends the message to a corresponding one of the cellulating sections 107i. Each of the cellulating sections 107i divides the received message into cells and sends the cells to the bidirectional ATM connection 103. The bidirectional ATM connection 103 temporarily merges the cells sent from each of the cellulating sections 107i, copies each cell and sends the copies to each of the message assembly sections 108i. When each of the message assembly sections 108i, the message assembly sections 108i refers to the MIDs of the received cells to gather the cells from the same message source, and assembles a message with referring to information except for the MIDs defined by I. 363 of the ITU-T standards. As a result, a message sent from one process is reproduced in all the message assembly sections 108i. In this case, since a message transferred with the MID used in a corresponding one of the cellulating sections 107i is a message formed and sent by the corresponding process 106i, the message assembly section 108i may discard such a message.

The message assembly sections 108i sequentially send the assembled messages to the processes #i (106i). For this reason, a message sent from one of the processes #i (106i) is received by one of processes #j (106j). Process migration means, for example, that the positions of the process #1 (1061) and the process #2 (1062) in the state shown in FIG. 1 are replaced with each other. At this time, when the processes #1 and #2 migrate together with their MIDs, i.e., when the MID used in the cellulating section 1071 and the MID used in the cellulating section 1072 are changed into 2 and 1, respectively, on the basis of the processes #3 and #4, it cannot be recognized that the processes are migrated. More specifically, migration of the processes does not influence other processes. From this point of view, the MID is can be regarded as a kind of identifier added to a process. The number of processes which can send and receive messages according to the above principle is determined by the bit length of the MID. According to I. 363 of the ITU-T standards, since an ID has 10 bits, a maximum of 1024 processes can perform communication.

As is apparent from the above description, VPI/VCI is not used to execute a message division process or a message assembly process for performing communication between these processes and indicate the destination of a message. For this reason, The VPI/VCI at each of the input/output points between the 4:4 bidirectional ATM connection 103 and the processes may have any value. In consideration of execution of process migration, the VPI/VCI values at the input/output points between the 4:4 bidirectional ATM connection and all the processes are preferably equal to each other such that communication can be performed with the same VPI/VCI in the destination to the process is migrated. That is, a message is changed into cells with the same VPI/VCI value in any input/output point, the cells are sent, and the message is preferably assembled by using the cells received with the same VPI/VCI value.

Assume that an adaptation process, called AAL5, in which, when a plurality of messages are simultaneously transferred with the same VPI/VCI, these messages cannot be correctly assembled, is to be applied. In this case, for example, a process may be identified by using a VCI in place of an MID such that an n:n bi-directional ATM connection is not presented by VC switching but is presented by VP switching. In this case, the same VPI is desirably used at the input/output points between the ATM connection and the processes. According to this method, a maximum of $2^{16}$ (=65536) can be connected to the same n:n connection. However, when the number of processes connected to the same n:n bidirectional ATM connection excessively increases, the following problems are posed. That is, (1) fault location identification, i.e. finding a faulty process, cannot be easily performed when a fault occurs, (2) a VPI/VCI space is pressed, i.e., a maximum of 255 (when a cell format at an interface point is UNI) n:n duplex connections described above are set, and (3) since the MID may be uniquely defined in the n:n bidirectional connection, the MID need not be changed at a position where the n:n bidirectional connection is set, but, since the VPI/VCI is uniquely defined at each interface point, the VPI/VCI may have to be changed in migration. For this reason, one of process identification by the VCI and process identification by the MID is selected depending on an application to be applied. Several services which can be presented will be described below according to the principle of the present invention. In these services, an application in which process identification is performed by using the VCI and application in which process identification is performed by using the MID are performed.

Note that a protocol in which an information element having the same mean as that of the MID is added to each cell may be defined as a user protocol on the AAL5. When the user protocol is defined as described above, a problem that process identification must be performed by the VPI/VCI in the AAL5 can be solved. In addition, in this case, unlike a case wherein an AAL3/4 is used, a user can set an MID having an arbitrary length. For this reason, the number of processes which perform communication on one n: n bidirectional connection and are subjected to migration can be set to be larger than 1024.

A method of realizing an n:n bidirectional connection on the ATM communication system, which method is an element playing an important role in this embodiment, will be described below.

Arranging Method on Merging Side of n:n Duplex Connection

FIG. 3 shows a method of realizing a portion where cells from message sources sent from the processes in an n:n bidirectional connection are merged. FIG. 3 shows only a portion to which the present invention is applied and which is cut from an ATM communication network. Terminals #1 to #4 (2011 to 2014) are connected to each other by ATM switch #1 to #3 (2021 to 2023) and VC links #1 to #7 (2031 to 2037). The ATM communication network is constituted by not only the terminals, the ATM switches, and the VC links, but also other terminals, ATM switches, and VC links.

In addition, the numbers of terminals, ATM switches, and VC links and the connection state thereof included in the portion to which the present invention is applied are not limited to the numbers and states shown in FIG. 3, as a matter of course. In addition, the ATM switches and terminals are connected to each other by optical fibers, STP (Sealed Twisted Pair) cables, or UTP (Unsealed Twisted Pair) cables, in a full duplex form, i.e., the ATM switches and terminals are connected such a manner that transmission and reception can be simultaneously performed. In order to avoid cumbersome illustration, the above state is not shown in FIG. 3. Assume that the physical links are arranged at positions where at least the VC links #i (203i) are set.

The processes #i which perform communication by using an n:n bidirectional connection are substantiated by the calculation capability of terminals #j to be executed. More specifically, the terminals to which the present invention is applied can be regarded as a kind of "field". The processes are mapped on terminals selected according to a predetermined procedure to be executed. As a matter of course, the terminals #j in which the processes #i are executed are not necessarily fixed. In particular, when process migration is executed, a process #b executed on a terminal #a is temporarily stopped, the process #b and its execution environment are migrated to a terminal #c. In addition, the processes #i need not be present at all the terminal points (positions where the processes #i transmits and receives messages) of a set n:n bidirectional connection. The n:n bidirectional connection may be set such that terminals are prepared for all the terminals which can be regarded as migrate destinations.

Referring to FIG. 3, in order to structure the "field", constituted by the terminals #1 to #4 (2011 to 2014), for performing processes, only the VC links #1 to #7 (2031 to 2037) for merging messages in the VC links set in the ATM communication network are shown. A VC connection for merging messages is arranged in such a manner that the VC links #1 to #7 (2031 to 2037) are connected to each other by the ATM twitch #1 to #3 (2021 to 2023). In this case, each VC link means a route for a cell which is transferred on one physical link by the same VPI and the same VCI. In addition, chaining of VC links means that a cell transferred on one VC link is sent to another VC link on a predetermined desired physical link, and is executed by an ATM switch #i (202i).

The chaining of VC links executed by the ATM switch #i (202i) is not limited to chaining shown in FIG. 3, and the moment the chaining of VC links is performed, chaining of VC links according to distribution of merging traffic (to be described later) is performed. In addition, if an ordinary point-point ATM connection is set between the terminal #1 (2011) and the terminal #2 (2012), the ATM switch #2 (2022) executes chaining of VC links for constituting the ATM connection simultaneously with the above chaining of the VC links executed by the ATM switch #i (202i).

In each of the ATM switches #i (202i), when cells are input from the VC links #i (203i) allocated to the merging side of an n:n bidirectional connection, the cells are transferred to a predetermined one of VC links #j (203j). For example, in the ATM switch #2 (2022), cells input from the VC link #1 (2031) and the VC link #2 (2032) are transferred to the VC link #5 (2035). More specifically, the VPI fields and VCI fields of all the cells input from the VC link #1 (2031) and the VC link #2 (2032) are rewritten into the VPI/VCI allocated to the VC link #5 (2035), and the cells are sent to the physical link set in the VC link #5 (2035).

For this reason, each of the ATM switches #i (202i) has a header conversion function for rewriting the header portion of a cell input from each physical link and a function of transferring the input cell to a desired physical link. As the ATM switch capable realizing these functions, an ATM switch disclosed in U.S. Pat. No. 5,274,641 can be used. However, since the method of realizing this ATM switch does not influence the validity of the present invention, the description of the present invention is carried out without being limited to the disclosed ATM switch.

As shown in FIG. 3, VC links are chained in a tree structure by the ATM switches #i (202*i*) to constitute the merging side of the n:n bidirectional ATM connection. Due to the VC connection having the tree structure, cells sent from the terminals #i (201*i*) serving as the "field" for process execution are finally transferred to the root of the tree structure to be merged to the VC link #7 (2037). In this case, in chaining of VC links in each ATM switch, it is required in the ITU-T standards that cells from given VC links are input to other VC links while keeping the sending order of the cells on the given VC links, i.e., that the cell order is keep. For this reason, in a merging traffic which is finally formed, it should be noted that a cell flow from the same terminal keeps an order in sending. For this reason, when a cell flow formed by copying the above cell flow to an ATM layer is send to each terminal, a message included in the cell flow can be correctly assembled in each terminal.

Note that an order of cells among terminals is not assured in the merging traffic. More specifically, with respect to cells simultaneously sent from the terminals #1 and #2, depending on the operation timing of an asynchronous portion of the operation of the ATM switch #2, the cell may be sent from the terminal #1 first or the cell may be sent from the terminal #2 first.

When the cells sent from respective terminals are merged with each other, traffics sent from a plurality of terminals are gathered in VC links near the root of the tree structure. As a result, a bandwidth which must be allocated to the VC links increases in width. In order to prevent another communication from being adversely affected, a plurality of ATM switches must execute a function which is known as UPC (Usage Parameter Control) and is to control a bandwidth used in each VC link.

The UPC in each ATM switch may be executed in the following manner in the example shown in FIG. 3:

policing performed by input portion:bandwidth T1 of the ATM switch #2 of the VC link #1, policing performed by input portion:bandwidth T2 of the ATM switch #2 of the VC link #2, policing performed by input portion:bandwidth T3 of the ATM switch #3 of the VC link #3, and policing performed by input portion:bandwidth T4 of the ATM switch #3 of the VC link #4.

As described above, it is the first method of the UPC that a bandwidth used when each terminal sends a cell to the 4:4 bidirectional ATM connection 103 is restricted in advance. According to this method, a point at which the UPC is performed is limited to the input portion of the ATM switch including the terminal, and other VC links need not execute the UPC. For this reason, it is satisfactory that the other VC links only execute CAC (connection acceptance control) based on the sum of bandwidths which are allowed to be used by terminals giving traffics.

The CAC, as well known, is control that the sum of bandwidths given to VC links set on physical links does not exceed the data transmission capability of the physical links. Although the CAC can be executed by only bandwidth management performed by a connection setting function, the UPC generally requires special hardware for executing the UPC. For this reason, this method can advantageously reduce the hardware required for the UPC, but each terminal cannot send a cell to a bandwidth T5 (T5=T1+T2+T3+T4 in the example described above) allowed to be used by a VC link (VC link #7 in FIG. 3) of the root portion of the merging traffic. Therefore, the peak flow rate of a cell which can be sent from each terminal is disadvantageously limited to a specific value.

The second method of the UPC executed on each ATM switch is as follows. That is, at the input portion of the ATM switch of VC links constituting the merging side of the n:n bidirectional ATM connection, policing is performed by the bandwidth T5 allowed to be used by the root of the merging side. In this case, each terminal can use up to the bandwidth T5 as a peak bandwidth. On the other hand, when a peak is allocated to each terminal, and when a plurality of terminals simultaneously give cell flows in peak bandwidths, adverse influence such as degradation of cell discarding rate is given to other connections treated by the ATM switches #i. In order to prevent this, the UPC must be performed at the input portion of the ATM switch of VC links constituting the merging side of the n:n bidirectional ATM connection, or at the output portion of the ATM switch of VC links constituting the merging side of the n:n bidirectional ATM connection. According to this method, a peak bandwidth in which each terminal can send a cell can be advantageously made large. On the other hand, UPC must be executed on a transmission path between an ATM switch and an ATM switch, and an amount of hardware for executing the UPC increases. Therefore, the second method has characteristics opposing the characteristics of the first embodiment.

In each of the first and second embodiments, as the method of the UPC, not only policing (when a bandwidth exceeds a limited band, cells are discarded until the bandwidth is equal to the limited bandwidth), but also shaping (when a bandwidth exceeds a limited band, sending of cells is stopped until the bandwidth is equal to the limited bandwidth) can be used. When shaping is performed, unlike a case wherein policing is performed, discarding of cells is not caused even if burst signals sent from the terminals collide with each other on an ATM switch. However, since a cell buffer must be arranged to temporarily wait sending of cells, an amount of hardware required for shaping disadvantageously increases.

Note that various methods of arranging the policing and shaping are known, and an example of the methods is disclosed in U.S. Pat. No. 5,274,641. Since this arranging method does not influence the validity of the present invention, the description of the present invention is carried out without being limited to the arranging method.

As described above, cell flows merged on the merging side of the n:n bidirectional ATM connection are transferred to the terminals while being copied. This portion is called a copy side of the n:n bi-directional ATM connection.

Arranging Method on Copy Side of n:n Duplex ATM Connection

FIG. 4 shows the first arranging method on the copy side of the n:n bidirectional ATM connection. FIG. 4 shows the arrangement of the copy side of the n:n bidirectional ATM connection when a "field", for process execution, constituted by the terminals #1 to #4 (2011 to 2014) shown in FIG. 3. The terminals and ATM switches in FIG. 4 are the same as those in FIG. 3, and the same reference numerals as in FIG. 3 denote the same parts in FIG. 4. VC links in FIG. 4 are different from the VC links shown in FIG. 3, and reference numerals different those in FIG. 3 are added to the VC links in FIG. 4. In addition, as in FIG. 3, physical links in which the VC links are set are not omitted in FIG. 4 to avoid cumbersome illustration.

The arranging method shown in FIG. 4 is an arranging method which can be applied when each of the ATM switches #i (202i) has a known function as a copy function. It is known that an ATM switch with copy function has various arrangements. The present inventor discloses one of the arrangements of ATM switches in Japanese Patent Application No. 6-140223. Since this arranging method does not influence the validity of the present invention, the description of the present invention is carried out without being limited to the arranging method.

As in the merging side of the n:n bidirectional ATM connection, VC links #8 to #14 (3011 to 3017) are chained in a tree structure by the ATM switches #i (202i). In each ATM switch, a predetermined number of copies are formed with respect to cells input from VC links constituting the copy side of the n:n bidirectional ATM connection, and the input cells and the copies of the cells are sent to predetermined VC links such that the cells and copies can be transferred to the terminals #i (201i) along the tree structure. For example, in the ATM switch #2 (2022), one copy of a cell input from the VC link #9 (3012) is formed, the input cell and the copy are sent to the VC link #11 (3014) and the VC link #12 (3015), respectively. As a result, respective cells constituting cell flows merged on the merging side of the n:n bidirectional ATM connection are transferred to the terminals #i (201i) realizing the "field" for execution of only one process. Therefore, the merging side shown in FIG. 3 is connected to the copy side shown in FIG. 4. More specifically, when the VC link #7 (2037) and the VC link #8 (3011) are connected to each other by an arbitrary ATM switch, a desired n:n bidirectional ATM connection can be realized.

In this case, it should be noted that UPC need not be executed in the VC links constituting the copy side of the n:n bidirectional ATM connection. It is satisfactory that only CAC is performed in a bandwidth allocated to the merging traffic at each physical link.

FIG. 5 shows the second arranging method on the copy side of the n:n bidirectional ATM connection. FIG. 5 shows the arrangement of the copy side of n:n bidirectional ATM connection when the "field", for process execution, constituted by the terminals #1 to #4 (2011 to 2014) shown in FIG. 3. The terminals and ATM switches in FIG. 5 are the same as those in FIG. 3, and the same reference numerals as in FIG. 3 denote the same parts in FIG. 5. VC links in FIG. 5 are different from the VC links shown in FIG. 3 or 4, and reference numerals different those in FIG. 3 or 4 are added to the VC links in FIG. 5. In addition, as in FIG. 3, physical links in which the VC links are set are not omitted in FIG. 5 to avoid cumbersome illustration.

The arranging method on the copy side shown in FIG. 5 is a method which can be applied when each of the ATM switches #i (202i) does not have a copy function. Since each of the ATM switches #i (202i) does not have a copy function, each of the terminals #i (201i) realizes a function which can be substituted for the copy function.

Traffics merged on the merging side are input to a VC link #15 (4011) at any place in the ATM communication network, and are input to the ATM switch #1 (2021). In the ATM switch #1 (2021), the traffics are output to a VC link #16 (4012). Subsequently, in the ATM switch #2 (2023), the traffics are related from the VC link #16 (4012) to a VC link #17 (4013). As a result, the merging traffic is given to the terminal #4 (2014) first. The terminal #4 (2014) receives the merging traffic and rearranges a message, and, at the same time, loops the merging traffic to input it to a VC link #18 (4014). Similarly, the merging traffic is caused to sequentially pass through VC links #19 to #24 (4015 to 4020), thereby giving the merging traffic to the terminal #3 (2013), the terminal #2 (2012), the terminal #1 (2011).

In the arranging method shown in FIG. 5, since each of the ATM switches #i (202i) has no copy function, the terminal #i (201i) loops the merging traffic to obtain the substitution of the copy function. For this reason, the arranging method shown in FIG. 5 has the following disadvantages compared with the arranging method shown in FIG. 4. (1) The route of the n:n bidirectional ATM connection is larger, and latency is degraded. (2) Since the calculation capability required to the terminals #i (201i) increases, a bandwidth which can be given to the merging traffic (since looping is performed at the terminals #i (201i), the physical link identical to that of the merging side of the n:n bidirectional ATM connection is used) is smaller than that of the arrangement in FIG. 4. (3) Although the n:n bidirectional ATM connection does not operate when a fault occurs at the terminals #i (201i). However, this arranging method has the advantage that a function such as a copy function which increases a hardware scale is not required, and the VC links #i (202i) can be advantageously constituted at low cost.

In each VC link in the arrangement shown in FIG. 5, as in the arrangement shown in FIG. 4, it is satisfactory that only CAC is performed without performing UPC.

Figure 6:
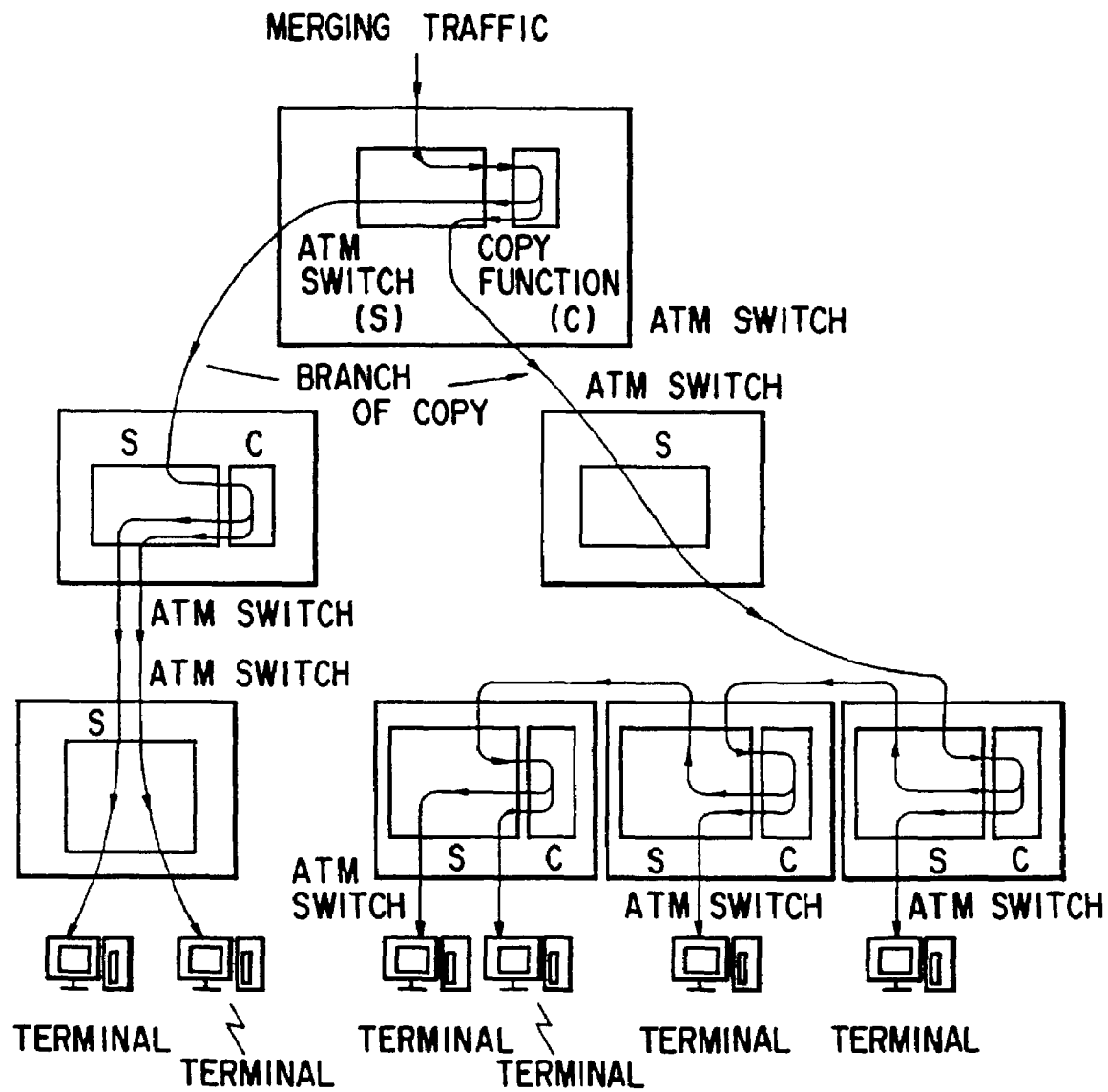
FIG. 6 is a view for explaining a third setting method on the copy side of the n:n bidirectional ATM connection in Embodiment 1.

As a matter of course, the copy side of the n:n bidirectional ATM connection cannot be formed by methods other than the methods shown in FIGS. 4 and 5. The copy side of the n:n bidirectional ATM connection can be formed by the following manner obtained by combining the formats shown in FIGS. 4 and 5. That is, in particular, when each ATM switch has a copy function with a small bandwidth, for example, when each ATM switch includes a cell switch realizing only a point-point connection, and a copy function for forming a desired number of copies of a cell input from the cell switch to be returned to the cell switch is connected to one inlet/outlet pair of the cell switch, as shown in FIG. 6, the merged traffic is copied into several branches by one of the copy function, and one of the branches is sent to one of the terminals performing loopbacking the marged traffic in order to hand another terminal sequentially, and another branch is sent to another copy function in order to make copy traffics which are sent some terminals directly.

In the setting format of the n:n bidirectional ATM connection described above, whether a communication resource can be effectively used is largely dependent on the function of ATM switches constituting the ATM communication network and its physical topology. However, from the point of view for performing the present invention, the n:n bidirectional ATM connection may be set in any format. Therefore, in this case, assume that the setting format of the copy side of the n:n bidirectional ATM connection is determined by a policy decided by the manager of the ATM communication network, and the description of the present invention is carried out without being limited to the setting format.

The above is the description of a method of constituting the n:n bidirectional ATM connection. Note that, in order to cumbersome illustration, the n:n bidirectional ATM connection is schematically shown in FIG. 7. In order to clearly show that the ATM connection is a bidirectional connection, two arrows having different directions are drawn at each input portion of the connection 103.

Embodiment 2

The present invention can be applied in not only a situation wherein messages sent from all processes must be received as shown in FIG. 1, but also a situation a process group for sending messages is different from a process group for receiving the messages. FIG. 8 shows a situation wherein four processes for sending messages and two processes for receiving the messages are present. Such a situation occurs in a case wherein respective processes specially realize different functions, e.g., so-called server client computing. Other concrete examples wherein such a situation occurs will be described later.

In the embodiment shown in FIG. 8, four processes (to be referred to as sending processes hereinafter) #1 to #4 (7011 to 7014) for sending messages are connected to the information input side of a 4:2 unidirectional ATM connection 702, and two processes (to be referred to as reception processes hereinafter) #1 (7031) and #2 (7032) are connected to the information output side of the 4:2 unidirectional ATM connection 702. As in the embodiment in FIG. 1, the number of processes is not limited to a value in the embodiment shown in FIG. 8. This embodiment can be applied when a smaller number of processes or a larger number of processes are used. In addition, the embodiment is not applied only when the number of sending processes is larger than the number of reception processes, but can be applied when the number of reception processes is larger than the number of sending processes. In this case, four sending processes and two reception processes are set as one example, and the following description is carried out. Communication need not be performed by an n:n ATM unidirectional connection having branches equal to processes in number, an m:n ATM unidirectional having branches larger than processes in number can be used as in FIG. 1.

In addition, VPI/VCI values sent from the sending processes to the 4:2 unidirectional ATM connection 702 are equal to each other in the sending processes, and VPI/VCI values received by the reception processes from 4:2 unidirectional ATM connection 702 are equal to each other in the reception processes. These conditions are desirable to execute process migration as in FIG. 1. It is to be determined by the nature of an application whether the VPI/VCI values used by the sending processes are equal to each other or not or whether the VPI/VCI values used by the reception processes are equal to each other or not.

Actual Operation of Second Embodiment

Messages sent from sending processes #i (701i) to the 4:2 unidirectional ATM connection 702 are given to the processes #1 (7031) and #2 (7032) through the 4:2 unidirectional ATM connection 702. As in the case shown in FIG. 1, in order to perform communication and to use a variable length message, cellulating functions 1035 to 1038 in an adaptation process are arranged between the sending processes and the 4:2 unidirectional ATM connection 702, and message assembly functions 1045 and 1046 of the adaptation process are arranged between the 4:2 unidirectional ATM connection 702 and the reception processes. Functions realized by these cellulating functions and message assembly functions are the same as those in FIG. 1. Therefore, when the MIDs of an AAL3/4 are allocated to the sending processes #i (701i) for sending messages to the 4:2 unidirectional ATM connection 702, according to the following manner, messages sent from the sending processes #i (701i) can be received by reception processes #i (703i).

The messages sent from the sending processes #i (701i) are changed into cells by cellulating functions (103i), and the cells are given to the 4:2 unidirectional ATM connection 702. After the 4:2 unidirectional ATM connection 702 merges the given cells, the 4:2 unidirectional ATM connection 702 gives the merged cells to message assembly functions 104i. The message assembly functions 104i reproduces messages with reference to the MIDs belonging to the sending processes, and gives the messages to the corresponding reception processes #i (703i), respectively. A method of allocating the MIDs to the sending processes #i (701i) will be described below. Note that when an adaptation protocol such as an AAL5 which does not include an MID is used, as in the case shown in FIG. 1, it is considered that an m:n unidirectional ATM connection is presented by a VP switch, a VCI may be used in place of the MID, or the MID may be defined on the AAL5 as a user protocol as described above.

Therefore, even if migration of a sending process in the sending processes or migration of a reception process in the reception processes occurs, the occurrence of the process migration can be concealed from a process in which migration does not occur, and high-speed process migration can be realized at low cost.

Method of Setting m:n Unilateral ATM Connection

A method of setting an m:n unidirectional ATM connection in an ATM communication network can be easily estimated based on the setting method on the merging side of the n:n bidirectional ATM connection shown in FIG. 2 and the setting method on the copy side of the n:n bidirectional ATM connection shown in FIGS. 4 to 6. For example, when a "field" where the sending processes #i (701i) are executed and a "field" where reception processes #j (703j) are executed are different terminals, the following operation is preferably performed. That is, the input terminal of the merging side is connected to the terminal which is the "field" where the reception processes #i (703i) are executed, and the output terminal of the copy side is connected to the terminal which is the "field" where the reception processes #j (703j) are executed. When a VC link where a merging traffic is constituted on the merging side is connected to the root of the copy side, an m:n unidirectional ATM connection capable of performing a desired operation can be obtained.

As in the case wherein UPC is performed in the n:n bidirectional ATM connection, UPC in the m:n uni-directional ATM connection is preferably performed by policing or shaping performed by bandwidths allocated to the terminals at the output portions of the terminals which are "fields" of sending process execution or policing or shaping performed by bandwidth allocated to merging traffics in the physical links where the connection on the merging side is set.

In order to avoid cumbersome illustration, the m:n unidirectional ATM connection is schematically shown in FIG. 9. In order to clearly show that the ATM connection is a unidirectional connection, arrows having directions toward the connection 702 are drawn at the input portions of the connection 702, and arrows having direction toward the output portions of the connection 702 are drawn at the output portions of the connection 702.

The above description about the basic embodiments of the present invention is completed. Services which can be presented to a user of a communication network will be described below by performing the present invention. By this description, the spirit of the present invention will be clearly shown.

A compromise mobile terminal service on a CATV network which is the first application to which the present invention is applied will be described below in detail.

The mobile terminal service, as represented by a mobile telephone or a portable telephone, is a service in which a subscriber can perform communication while moving. In order to make it possible that a subscriber (mobile terminal) can perform communication while moving, a process which is generally called a handover process and in which a radio zone used in communication between the mobile terminal and a fixed terminal is switched according to moving of the mobile terminal. In this case, when the subscriber or the mobile terminal is regarded as a process in which communication is performed while the subscriber moves, this handover process can be equivalently regarded as a kind of process migration. According to the present invention, as described later, the handover process can be simply realized.

Figure 10:
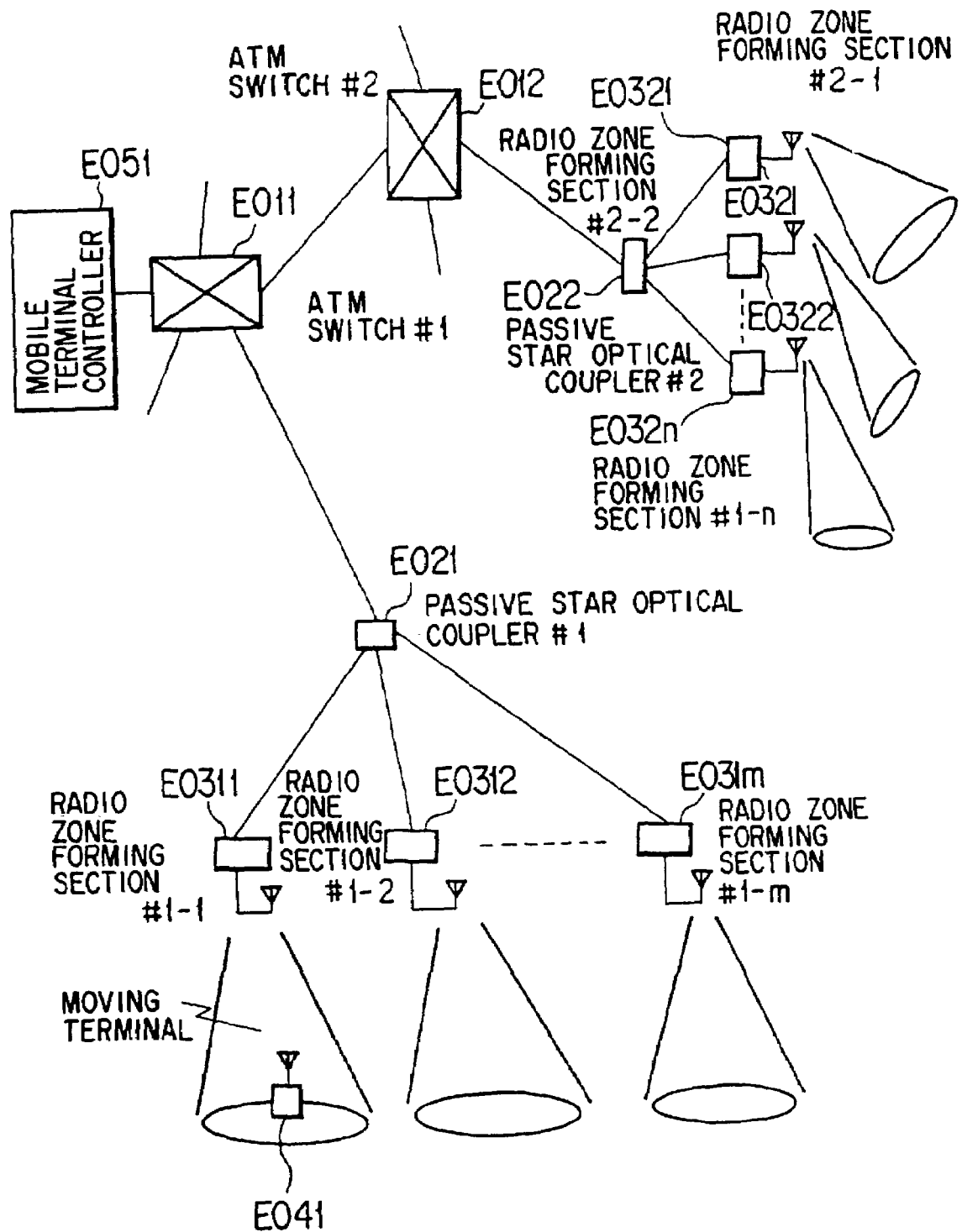
FIG. 10 is a view showing the arrangement of a system in which the first application of the present invention according to Embodiment 3 of the present invention.

FIG. 10 shows the arrangement of a CATV network in which the first application of the present invention is executed. In the CATV network, ATM switches #1 (E011) and #2 (E012) are connected to each other, and a plurality of radio zone forming sections #1-1 to #1-m (E0311 to E031m) and radio zone forming sections #2-1 to #2-m (E0321 to E032n) which are mobile terminal interface units are interfaced by passive star optical couplers #1 (E021) and #2 (E022). The passive star optical coupler is an optical part for coupling a plurality of optical fibers so that the light signal input from one of the optical fibers is uniformly distributed and output to the remaining optical fibers.

In the CATV network having the arrangement shown in FIG. 10, a backbone network is constituted by ATM switches (E01$i$). The CATV network has an object to interface subscribers at low cost by the passive star optical couplers (E02$i$) on which information transmission is performed in an ATM manner. In a range shown in FIG. 10, the radio zone forming sections only are connected to the passive star optical coupler. However, an user's local machine called a set top box and a radio zone forming section may be connected together to a single passive star optical coupler. In this manner, it is a great advantage of the ATM CATV network that a single passive star optical coupler can be used for various purposes.

Each of the radio zone forming sections #1-j (E03$ij$) respectively constitute radio zones. When a mobile terminal (E041) using the second application is in any one of the radio zones, the mobile terminal (E041) can perform speech communication or data communication with a communication destination G0C through a mobile terminal controller E051 which can be regarded as a fixed terminal. In this case, a radio channel in the radio zone may be an ATM radio channel disclosed by the present inventor in Japanese Patent Application No. 5-349634. The following description is carried out with assuming that communication is performed by this radio channel. When an ATM radio channel is used, a mobile terminal can relatively freely use not only a bandwidth of 64 kbps but also various bandwidths of, e.g., 8 kbps or 128 kbps. As a result, as a service presented to the mobile terminal (E041), not only a speech communication service but also a data transfer service which requires a relatively small number of bits and in which a subscriber holding the mobile terminal (E041) notifies another subscriber of a place where the subscriber holding the mobile terminal (E041) can be presented at low cost.

In addition, when a mobile terminal in communication is stopped in one radio zone, and does not move to another radio zone (i.e., no handover process is performed), a data transfer service, such as downloading of a file of a computer, having a high bit rate can also presented. In this case, it should be noted that the handover process must be stopped only while wide-band communication is performed. For example, the following service can be easily realized. That is, while a user of a mobile terminal performs communication in walking, the user stops when the mobile terminal accesses a relatively large file, the user begins to walk when the access to the file is completed.

The radio zone forming sections #1-j (E03$ij$) broadcast cell flows (cell flows of downstream links) given from the ATM switches (E01$i$) through the passive star optical couplers E02$i$ to the radio zones formed by the radio zone forming sections #1-j (E03$ij$), and, at the same time, gives cells (cell flows of upper stream links) sent from a mobile terminal being present in the radio zone formed the radio zone forming sections #1-j (E03$ij$) to the ATM switches through the passive star optical couplers E02$i$. As disclosed by the present inventor in Japanese Patent Application No. 5-349634, a carrier frequency for carrying the cell flows of the downstream links is made different from the carrier frequency for carrying the cell flows of the upper stream links to make full duplex communication possible. The radio zone forming sections #i-j may have various arrangements. For example, each radio zone forming section may have the arrangement disclosed in Japanese Patent Application No. 5-349634. However, the radio zone forming section described in Japanese Patent Application No. 5-349634 is designed to be directly connected to an ATM switch, but exchanges cells with an ATM switch through a passive star optical coupler. When a radio zone forming section exchanges cells with an ATM switch through a passive star optical coupler, a function for measuring the distance between the radio zone forming section and the ATM switch, a function of changing a timing for sending a cell flow, and a access protocol for sharing the upper stream link with other radio zone forming sections must be executed. It is assumed that the radio zone forming section described in this case includes these functions. Since a method of the access protocol in the upper stream link of the passive star optical coupler does not influence the validity, the description of the present invention is carried out without being limited to this method. For example, the scheme disclosed by the present inventor in Japanese Patent Application No. 6-140223 may be used.

When the mobile terminal E041 tries to start communication, and the mobile terminal E041 is present at a radio zone, the mobile terminal E041 outputs a connection setting request to a network side by using the control information channel of the radio zone. In response to the connection setting request, a required connection is set inside of the communication network. The mobile terminal E041 performs communication by using the connection set up as described above. Upon completion of the communication, the mobile terminal E041 outputs a connection release request to the network side. In response to the connection release request, the connection which has been used by the mobile terminal E041 is released. A communication method in the control information channel of the radio zone will be described later.

A handover process is controlled by the mobile terminal controller (E051) connected to the ATM switch #1 (E011). This mobile terminal controller (E051), in the handover process, has (a) a connection function for controlling the ATM switches #1 (E011) and #2 (E012) to set an n:m unidirectional ATM connection (e.g., G03) having the mobile terminal controller (E051) as an input side terminal point and m radio zone forming sections of the radio zone forming sections #1-j (E03*il*) serving as the mobile terminal interface units as output side terminal points, and an m:n unidirectional ATM connection (e.g., G04) having m radio zone forming sections of the radio zone forming sections #1-j (E03*il*) as input side terminal points, and the mobile terminal controller (E051) which is n fixed terminal as an output terminal point, and (2) a connection identifier allocating function for allocating the same connection identifier for identification of the m input side terminals of the n:m unidirectional ATM connection and identification of the m output side terminals of the m:n unidirectional ATM connection. In the example shown in FIG. 12, only the mobile terminal controller (E051) is used, and n=1. However, when n=2 or more, the present invention can be applied. When viewing from these ATM connections, the mobile terminal controller can be regarded as a kind of a fixed terminal.

When an ATM switch receives a connection setting request from a mobile terminal, the ATM switch sets an ATM connection (to be described later) between the mobile terminal controller E051 and each of the radio zone forming sections E03*ij*. Although a connection must be reformed during communication by a mobile terminal, this sends a connection reform request toward an ATM switch.

Method of Realizing Handover Process

A method of realizing a handover process by the mobile terminal controller E051, the ATM switches E01*i*, and the radio zone forming sections E03*ij* in the second application of the present invention will be described below.

Before interaction among the mobile terminal controller E051, the ATM switches E01*i*, and the radio zone forming sections E03*ij* is actually described, a method of setting a radio zone for realizing the handover process will be described below.

Figure 11:
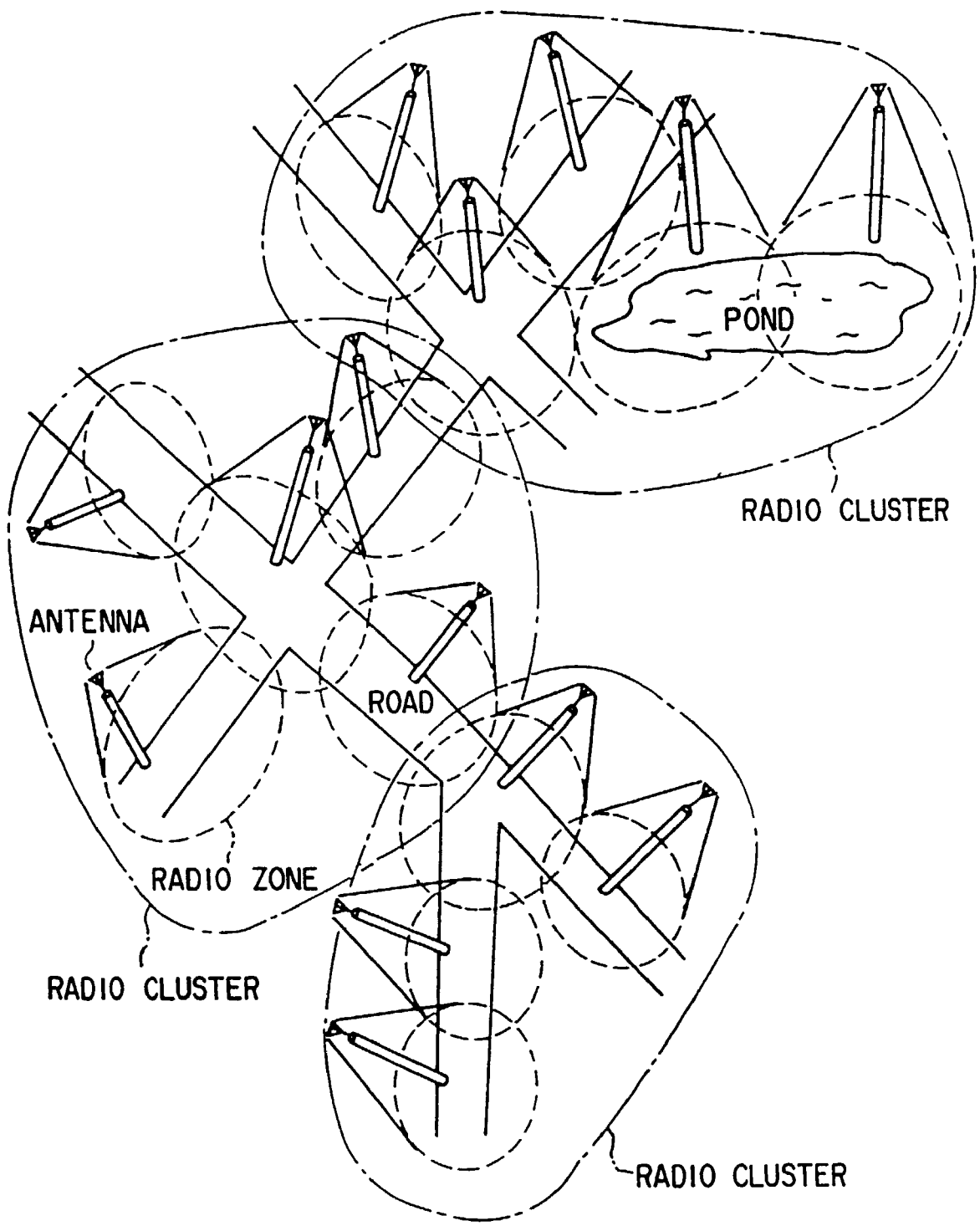
FIG. 11 is a view showing the physical arrangement of radio zones and radio clusters in Embodiment 3.

As shown in FIG. 11, a CATV network company installs the radio zones along roads in a city area where the company performs services in such a manner the radio zones partially overlap on each other. At this time, the frequencies of radio waves used in the overlapping portions of the radio zones are set to be different from each other. Note that radio zones (called radio clusters) formed by the radio zone forming sections connected to one passive star optical coupler are continuously arranged along the roads as shown in FIG. 11. The diameter of each of these radio zones is set to be small, e.g., 100 m, to obtain high-speed data transmission at low cost in the radio zone.

On the other hand, the mobile terminal always monitors frequencies used as downstream links in the CATV network, and operates to reproduce information by using, of these frequencies, a reception radio wave of a reception having the highest reception intensity. A radio wave which transfer information of a downstream link is monitored to automatically select a radio zone. In addition, a handover process can be realized at low cost by setting a connection in the following manner.

In this case, the pairs of frequencies of the downstream links and the upper stream links are not changed. More specifically, is should be noted that the following relationship is fixed in the CATV network. That is an upper stream link in the radio zone in which a downstream link has a frequency of $fd1$ is $fu1$, and a down stream link in the radio zone in which a downstream link has a frequency of $fd2$ is $fu2$. Therefore, when the frequency of the downstream link used by the mobile terminal is determined, the frequency of the upper stream link can be automatically determined, and information can be sent to the radio zone.

These radio zones are not necessarily arranged along the roads in the city area. For example, a radio zone is preferably installed at a dangerous place (e.g., pond) in the city area. A parent gives his/her child a radio terminal, and an alarm is given to the parent when the child gets close to a dangerous place while the child has fun in the city area. In addition, a radio zone may be installed the rooms such as a living room and dining room of the house of each subscriber. It is assumed that a CATV network manager installs a radio zone at a position where a subscriber wants to use the above service.

Sincerely, FIG. 12 shows connections set between the mobile terminal controller E051 and each of the radio zone forming sections E03*ij* when a mobile terminal service is executed. These connections are set inside the ATM communication network in calling from the mobile terminal or call arriving to the mobile terminal. Although data transfer routes are also required in calling from each mobile terminal or call arriving from each mobile terminal, the data transfer routes will be described later. In order to avoid cumbersome illustration, these routes are omitted in FIG. 12. In addition, when a mobile terminal performs calling, or call arriving to mobile terminal is received, a specific radio zone in which the mobile terminal is located must be notified to the network side. This will be described below.

In calling from the mobile terminal E041 or call arriving to the mobile terminal E041, 1:m unidirectional ATM connections G03 and G0A and m:1 unidirectional ATM connections G04 and G09 are set on each of the passive star optical couplers E02*i*, and these connections are connected to the mobile terminal controller E041 by 1:1 unidirectional ATM connections G01, G02, G05, G06, G07, and G08.

A 1:1 bidirectional ATM connection G0B is set between a communication destination G0C of the mobile terminal and the mobile terminal controller E051. In this case, it is assumed that the communication destination G0C of the mobile terminal does not move and is seamlessly connected to the mobile terminal controller E051 by an ordinary ATM connection. When the communication destination G0C of the mobile terminal is a mobile terminal, as in the case shown in FIG. 12, a 1:m unidirectional ATM connection and an m:1 unidirectional ATM connection are set toward the mobile terminal serving as the communication destination, and these connections are connected to the mobile terminal controller E041 by the 1:1 unidirectional ATM connection.

The 1:m unidirectional ATM connection G03 and the m:1 unidirectional ATM connection G04 is used to realize a handover process with respect to moving the mobile terminal E041 between the radio zones formed by the radio zone forming sections E03*lj* connected to the same passive star optical coupler, i.e., in a radio cluster.

The 1:m unidirectional ATM connections G04 and G0A are spontaneously set when ATM connections are set in the passive star optical coupler by the nature of the passive star optical coupler. In the radio zones formed by the radio zone forming sections E03*lj* connected to the same passive star optical coupler, cells which treats the same information can be received by the same VPI/VCI. Therefore, as described above, the mobile terminal E041 operates to reproduce information on the basis of a reception radio wave having the highest response intensity, and the radio zones are arranged to geographically overlap. For this reason, even if the mobile terminal moves between the radio zones, in the same radio cluster, frame synchronization and cell synchronization are released when the reception frequency is changed by moving the radio zones. Only when an operation for reestablish the frame synchronization and cell synchronization, mobile terminal E041 can continue communication. That is, an interrupt time of the reception information is short even if the radio zones are changed.

At this time, it should be noted that the VPI/VCI of extracted cells need not be changed. When information such as voice information whose interrupt can be interpolated is used, the interrupt time of the reception information can be shorter than a time which can be interpolated or neglected by human being, communication can be continued without interrupting a connection. In an ATM radio channel disclosed in Japanese Patent Application No. 5-349634, the interrupt time of radio information in the radio channel is a time required to establish frame synchronization and cell synchronization. When a frame structure is properly selected by shortening the overhead interval of the frames of the radio channel, the interrupt time of the reception information can be suppressed with in a required range. In this case, when communication in which the frame synchronization and cell synchronization between the radio zones are not allowed to be reestablished is to be performed, it is apparent that communication is preferably performed when a user does not move between the radio zones, i.e., when a user stops. Since ATM radio zones are used, when a service in which a user performs speech communication with walking, receives a transferred file with stopping, and performs speech communication again with walking is performed, it should be noted that a simple method in which a new ATM connection having a bandwidth required to perform file transfer is set is performed.

When a mobile terminal sends information in the radio cluster, a cell is preferably sent by a simply allocated VPI/VCI. The sent cell is naturally transferred to a portion of a desired communication destination through the 1:1 unidirectional ATM connection G02 by the operation of the m:1 unidirectional ATM connection G04.

By realizing only the above processes, a switching process of the radio zones performed when a handover process in the radio cluster, i.e., when a mobile terminal moves from a radio zone to another radio zone in the same radio cluster. In this case, when the handover process is performed in only a single radio cluster, the mobile terminal controller E051 is not required. The 1:1 unidirectional ATM connections G01 and G02 are preferably connected to the 1:1 bidirectional ATM connection G0B for the communication destination G0C.

However, in order to realize relatively high speed communication at low cost, the diameter of a radio zone formed by radio zone forming sections E03$ij$ is desirably small, i.e., 100 m. For this reason, a radio cluster constituted by one passive star optical coupler can not present compromise mobile terminal service to the entire area required by subscribers of the CATV network. Therefore, a handover process between a plurality of radio clusters must be performed. The mobile terminal controller E051 is arranged to perform the handover process between the plurality of radio clusters.

When calling to a radio terminal or call arriving to the radio terminal occurs, the network sets the connection shown in FIG. 12 in a given radio cluster in which the radio terminal is present, and, at the same time, the same connection as described above is set in a radio cluster adjacent to the given radio cluster. In FIG. 12, the connections G03 and G04 correspond to the given radio cluster in which the radio terminal is currently present. On the other hand, the ATM connections G09 and G0A correspond to the radio cluster adjacent to the given radio cluster.

The mobile terminal controller E051 chains the connection on the radio cluster in which the mobile terminal is present to the connection to the communication destination, and, at the same time, chains the connection set on the radio cluster adjacent to the radio cluster to the connection to the communication destination. More specifically, in the example shown in FIG. 12, cell flows given from the connection G0B to the mobile terminal controller E051 are copied, and the obtained copies are given to the connections G01 and G05. At the same time, the cell flows given from the connection G02 and G06 are merged and given to the connection G0B. In this manner, a cell flow sent from the communication destination G0C is given to the radio cluster in which the mobile terminal E041 is present and a cluster adjacent to the radio cluster. For this reason, even if the mobile terminal E041 is given to the radio cluster, when the mobile terminal reproduces information on the basis of a radio wave having the highest intensity, the reception information can be switched by the same process as that in which reception information is switched while the radio terminal moves between the radio zones in the same radio cluster. In addition, when the mobile terminal E041 is currently present in a given radio cluster or a radio cluster adjacent to the given cluster, a cell sent from the mobile terminal E041 is given to the communication destination. As a result, a handover process between the radio clusters can be performed by the same process as the handover process between the radio zones in the radio cluster.

Note that when the handover process between the radio clusters occurs, the adjacent radio cluster is changed. More specifically, a radio cluster which is not the adjacent cluster becomes the adjacent radio cluster, or a radio cluster which is regarded as the adjacent radio cluster becomes a radio cluster which is not adjacent.

In the radio cluster which is newly used as the adjacent cluster, the connection shown in FIG. 12 is set for a new handover process. In each radio zone in the new adjacent radio cluster, the same VPI/VCI as that used in another radio cluster is used as matter of course. This connection setting is requested by the mobile terminal controller E051 to the communication network. In order to realize this, the position of the mobile terminal must be notified to the mobile terminal controller E051. For this purpose, a 1:1 bidirectional connection is set between the mobile terminal controller E051 and each of the radio zone forming sections E03$ij$, and each radio zone forming section may notify the mobile terminal controller E051 of the position of the radio terminal, or the following method may be used. That is, as will be described later, each radio zone forming section broadcasts an identifier allocated to the radio zone forming section to a radio zone formed by the radio zone forming section, an identifier allocated to the radio zone is received by the mobile terminal E041, and the identifier is notified to the mobile terminal controller E051.

Connections set on a radio cluster which has been an adjacent radio cluster are preferably released for effective used of a communication bandwidth. On the other hand, since a probability that the mobile terminal E041 returns to the same radio cluster is high, in order to reduce a process amount related to a handover process, it is preferred that the connections remain to be released. It is determined by the behavior pattern of a human being having the mobile terminal E041 whether these connections are released or reduced. However, if the connections are released, the mobile terminal controller E051 requests the network to release the connections.

As described above, since connection setting/release according to a handover process can be performed after the mobile terminal moves between radio clusters, the above described method can advantageously perform a high-speed handover process with a low-cost structure.

When the CATV network according to the present invention is used, the mobile terminal service must perform a process which is different from communication performed by an ordinary ATM connection and is related to the special connection described above. For this reason, the mobile terminal service is regarded as an optional service, i.e., a service which need not be performed. In this case, as in a conventional ATM communication system as shown in FIG. 12, a connection setting section G0D may be arranged, and the mobile terminal controller E051 may request the connection setting section G0D to perform connection setting according to the mobile terminal.

The connection setting section G0D receives a request from the mobile terminal controller E051 or a request of another ordinary ATM connection setting and controls the ATM switches E011 and E012 in the ATM communication system, thereby setting the ATM connection. From this point of view, the mobile terminal controller E051 is added to the ATM communication system, and functions as a fixed terminal for realizing a kind of service function for realizing a special service (mobile terminal, in this case). As described above, since the special service is realized as the fixed terminal, a packaging method which is advantage in cost and in which the special service can be realized with a desired ATM communication network by only connecting the fixed terminal to the ATM switch can be obtained.

Schematic Procedure of Handover Process

The schematic procedure of the handover process described above will be described below with reference to FIG. 13. When a mobile terminal moves between radio clusters, for a handover process between the radio clusters, the mobile terminal controller E051 requests an n:m unidirectional ATM connection and an m:n unidirectional ATM connection to be set (step S21). At this time, the connection setting section (G0D) of the ATM communication network sets requested connections while allocating the same connection identifiers (VPI/VCI in this example) to identify m input side terminal points of the requested n:m unidirectional ATM connection and identify m output terminal side end terminals of the m n unidirectional ATM connection (step S22). In this manner, preparation for the handover process of the mobile terminal E041 between the radio clusters is completed. Even if the mobile terminal E041 is subjected to a handover process between the radio clusters, an ATM connection used in communication with the mobile terminal controller E051 can be specified by the VPI/VCI above described, thereby realizing the handover process (step S23).

Figure 14:
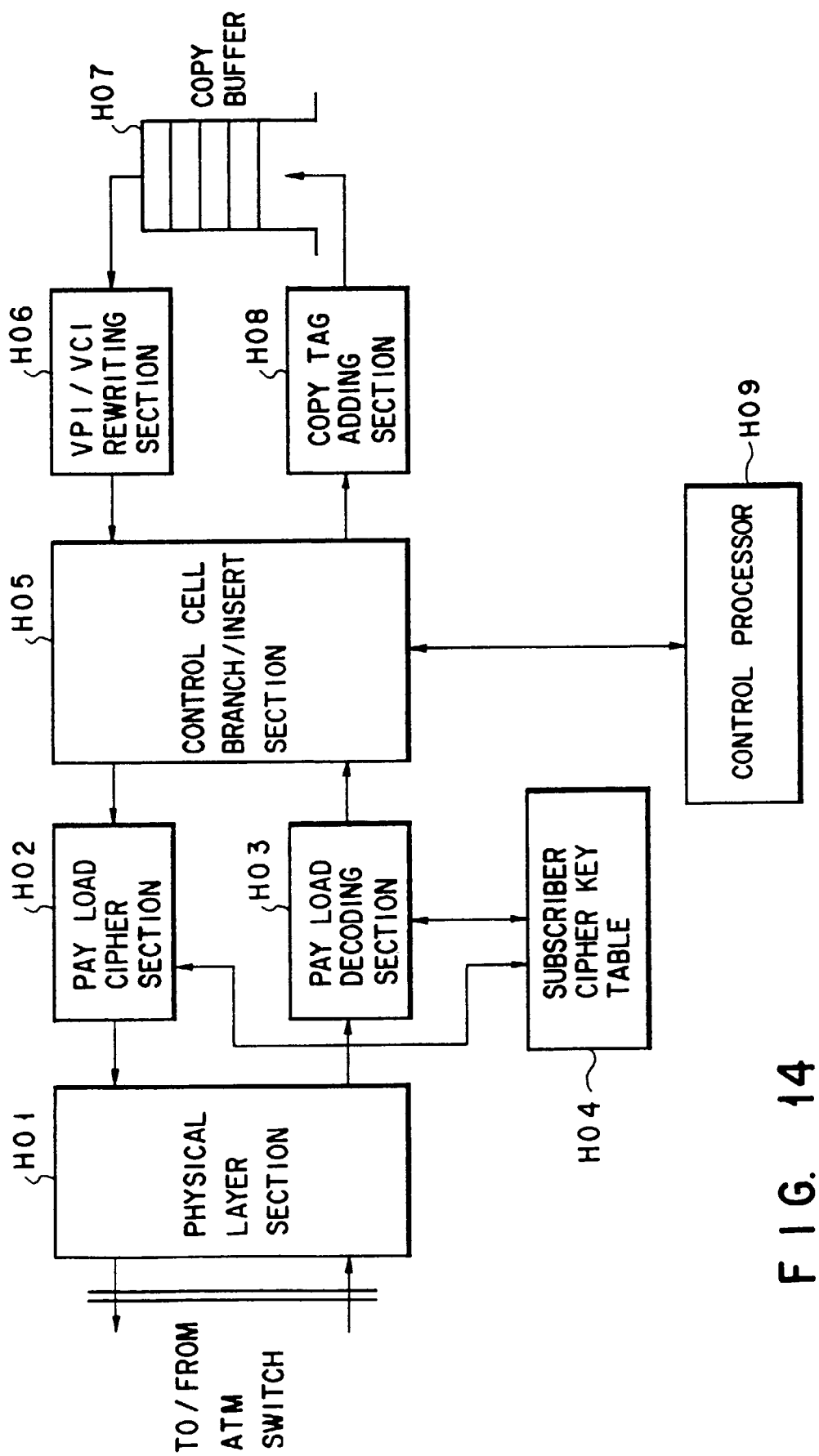
FIG. 14 is a view showing the arrangement of a mobile terminal control section in Embodiment 3.

FIG. 14 shows the arrangement of the mobile terminal controller E051 for realizing the handover process described above. The mobile terminal controller E051 is constituted by a physical layer section H01, a pay load cipher section H02, a pay load decoding section H03, a subscriber cipher key table H04, a control cell branch/insert section H05, a VPI/VCI rewriting section H06, a copy tag adding section H08, a copy buffer H07, and a control processor H09.

The mobile terminal controller E051 has a function of chaining connections set to radio clusters to a connection set to the communication destination of a mobile terminal, a function of realizing a handover process between the radio clusters, and a cipher function of the pay load portion of a cell to improve security which is always problem in a mobile terminal service. These functions are sequentially described below.

The function of chaining the connections set to the radio clusters to the connection set to the communication destination of the mobile terminal is described first. This function is constituted by a function of copying a cell given from the communication destination of the mobile terminal to send the copy to the radio cluster in which the mobile terminal is present and to an adjacent radio cluster, and a function of transferring the cell given from the mobile terminal to the communication destination.

In this embodiment, since the mobile terminal controller E051 is connected to the ATM switch #1 (E011) by a physical link, an ATM connection set to execute the mobile terminal service must be designed to identify the mobile terminal controller E051. More specifically, the interface points between the mobile terminal controller E051 and the ATM switch #1 (E011), different VPI/VCIs are added. The mobile terminal controller E051 can identify a radio cluster to which a cell is sent when the cell is sent to a specific VPI/VCI. In addition, in order to cause the mobile terminal controller E051 to present a mobile terminal service to a plurality of mobile terminals at once, the mobile terminal controller E051 must be able to identify ATM connections requested to mobile terminals. More specifically, the mobile terminal controller E051 can identify a mobile terminal to which a cell is sent when the cell is sent to a specific VPI/VCI. For this reason, an identifier for identifying a mobile terminal serving as a process migrated in the first application is not the MID serving as a process identifier used in the ATM-SYSTEM shown in FIG. 1 but the VPI/VCI serving as a connection identifier.

In order to chain connections set to the radio clusters to a connection set to the communication destination, the following process is preferably performed.

A function of copying a cell received from the communication destination of the mobile terminal to send the copy to a radio cluster in which the mobile terminal is present and the adjacent radio cluster is described first. As will be described below, this function is realized by a cell copy function of forming a plurality of cell flows.

Cell flows given from the communication destination G0C through the connection G0B are given to the reception side of the physical layer section H01 through an ATM switch. The physical layer section H01 performs a frame synchronization process and a cell synchronization process to a bit stream given from the ATM switch to reproduce cell flows. The cell flows are given to the copy tag adding section H08 through the pay load decoding section H03 and the control cell branch/insert section H05. The copy tag adding section H08 refers to the VPI/VCIs of the given cell flows to add information called a copy tag to the cells, and gives the cells to the copy buffer H07. In each copy tag, information indicating a connection to which the cell belongs and the number of copies to be formed. The former is called a copy connection identification, and the later is called the number of copies. For example, in the connection arrangement shown in FIG. 12, cells input from the connection G0B is transferred to the connection G01 and the connection G05, and the number of copies is set to be 2. The copy connection identification is uniquely added to each connection processed by the mobile terminal controller E051 to identify communication between the mobile terminal E041 and the communication destination G0C. For example, in order to identify this connection, value 1 is set as the value of the copy connection identification.

The copy buffer H07 refers to the number of input cells, forms copies which is equal in number to the number of copies, gives the copies to the VPI/VCI rewriting section H06. In this case, the copy buffer H07 writes sequence numbers in a field in which the number of copies is written in the sending order of the copies of the same cell. This sequence numbers are called copy numbers. For example, a cell input when the number of copies=4 is output from the copy buffer H07 four times. At this time, the copy numbers of the output copied cells are changed one, two, three four. This copy number are used to select a connection to which the copied cells are sent in the VPI/VCI rewriting section H06. Note that a field for copy connection identification is transparently output in the copy buffer H07.

The cells output from the copy buffer H07 are input to the VPI/VCI rewriting section H06. The VPI/VCI rewriting section H06 refers to the connection identification and the copy numbers to identify a connection to which the cells are to be sent. The VPI/VCI rewriting section H06 rewrites the VPI/VCI fields of the cells with VPI/VCI values for identify the connection, deletes the copy tags, and gives the cells to the transmission side of the physical layer section H01 through the control cell branch/insert section H0S and the pay load cipher section H02. When a plurality of cells from the same cell source having VPI/VCIs which can be respectively transferred to desired clusters are sent to the ATM switch, routing of these cells in the ATM switch can be performed, and these cells are transferred to the desired clusters as a matter of course. For example, in the connection arrangement shown in FIG. 12, since the copy connection identification is 1, it can be recognized that the cells are to be transferred to the connection G01 or G05. For example, if a cell having copy number 1 and a cell having copy number 2 are to be sent to the connections G01 and G05, respectively, the VPI/VCI of the cell having the copy connection identification of 1 and copy number 1 is rewritten with a value for identifying the connection G01, and the VPI/VCI of the cell having the copy connection identification of 1 and copy number 2 is rewritten with a value for identifying the connection G05.

Note that a VPI/VCI added to other terminal points of these connections, i.e., the same VPI/VCI allocated to each mobile terminal and used in all the radio zones to simplify the handover process and the VPI/VCI of a cell sent from the VPI/VCI rewriting section H06 have different values, respectively. The VPI/VCIs at terminal points on the radio zone sides of these connections are sent from an ATM switch to a passive star optical coupler or rewritten by a radio zone forming section.

With the above operation, cells sent from the communication destination G0C are transferred to desired radio clusters, and the cells having desired VPI/VCIs are given to the mobile terminal E041.

The cells sent from mobile terminals, as described above, are given to the mobile terminal controller E051 through the m:1 unidirectional ATM connection. At this time, it is noticed that a connection is set such a manner that a cell sent from a specific mobile terminal can be identified by the VPI/VCIs of the cells sent from the mobile terminals in the input portion of the mobile terminal controller E051. In this case, the mobile terminal controller E051 treats the input cells as described above, the cells can be transferred from the connections set in the radio clusters to a connection set to the communication destination of the mobile terminal.

A cell input from the connection G01 or G06, like the cell input from the connection G0B, is input to the copy tag adding section H08 through the physical layer section H01, the pay load decoding section H03, and the control cell branch/insert section H05. The copy tag adding section refers to the VPI/VCI allocated to the connection G02 or G06, adds a copy tag to the cell, and transfers the cell to the copy buffer H07. In this case, the number of copies in the copy tag may be 1. As a copy connection identification, the same value is allocated to the connections G02 and G06. Since the number of copies of the cell belonging to the connection G02 or G06 is set to be 1, the copy buffer H07 gives only one of the cells each having copy number 1 to the VPI/VCI rewriting section H06.

When the VPI/VCI rewriting section H06 refers to the copy identification and the copy number and recognizes that the input cell is a cell belonging to the connection G02 or G06, the VPI/VCI rewriting section H06 rewrites the VPI/VCI of the cell with the VPI/VCI allocated to the connection G0B, and outputs the cell to the ATM switch through the control cell branch/insert section H05, the pay load cipher section H02, and the physical layer section H01. When the value of the VPI/VCI is equal to that allocated to the connection G0B, the ATM communication network transfers the cell to the communication destination G0C. As described above, even if the mobile terminal E041 is present in any cluster, the cell sent from the mobile terminal is transferred to a desired communication destination.

When the two operations described above, i.e., an operation of transferring a cell from a communication destination to desired radio clusters and an operation of transferring the cell in the desired radio clusters to a desired communication destination, are performed, chaining between connections set to the radio clusters and a connection set to the communication destination of the mobile terminal can be realized.

The function of realizing an handover process between radio clusters performed in the mobile terminal controller E051 will be described below in detail.

As described above, connections are set in a radio cluster in which a mobile terminal is present and in a radio terminal adjacent to the radio terminal for a handover process. When the request of the handover process is generated, i.e., when the radio cluster in which the mobile terminal changes, a connection is set in a radio cluster adjacent to the new radio cluster for a new handover process. In order to realize the simple handover process described above, a radio cluster in which the mobile terminal must be recognized, and the communication network is requested to set a connection. In order to achieve these objects, the function of the handover process performed by the mobile terminal controller E051 is used. The capability of calculation for the handover process is presented by the control cell branch/insert section H05 and the VPI/VCI rewriting section H06.

Figure 15:
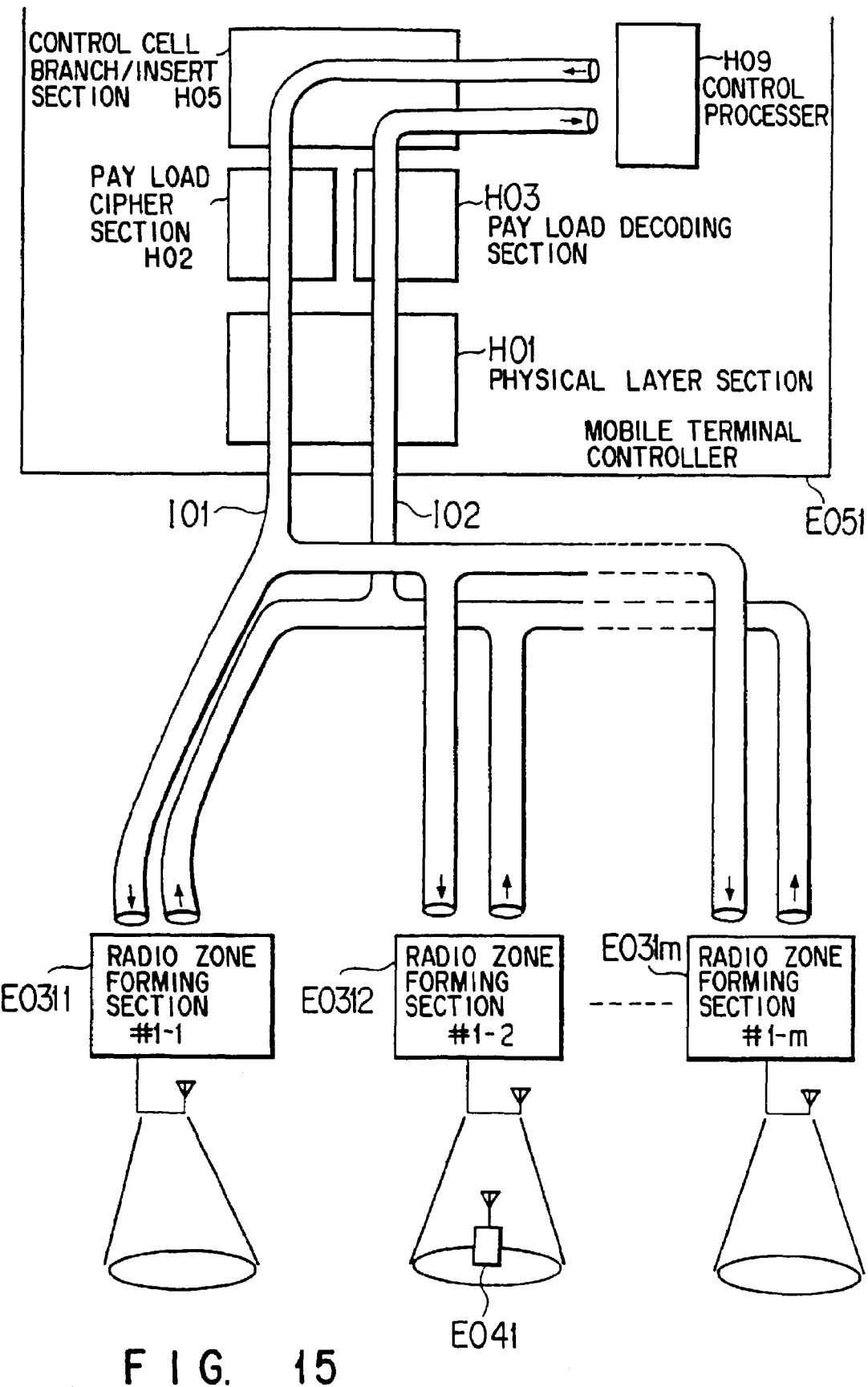
FIG. 15 is a view showing a method of setting a movement control connection in Embodiment 3.

FIG. 15 shows a connection set between the radio zone forming sections #1-j (E03*ij*) and the mobile terminal controller E051 in advance to perform mobile terminal control such as a handover process. A connection of such type is called a movement control connection. FIG. 15 shows only a movement control connection related to the radio zone forming section #i-j belonging to one radio cluster.

A 1:m unidirectional ATM connection I01 and a m:1 unidirectional ATM connection I02 are arranged as movement control connections between the mobile terminal controller E051 and the radio zone forming sections #1-j (E03*ij*) in each radio cluster. When information is transferred from the radio zone forming sections #1-j (E03*ij*) to the mobile terminal controller E051, the m:1 unidirectional ATM connection I02 is used; and when information is transferred from the mobile terminal controller E051 to the radio zone forming sections #1-j (E03*ij*), the 1:m unidirectional ATM connection I01.

A VPI/VCI is added to each cluster between the mobile terminal controller E051 and an ATM switch to identify a movement control connection related to a specific radio cluster. The same VPI/VCI is given to the 1:m unidirectional ATM connection 101 and the m:1 unidirectional ATM connection I02 which constitute the mobile control connection related to one radio cluster. More specifically, when a cell is to be transferred to the radio cluster of the sender of the input cell, a cell having the same value as that of the VPI/VCI of the input cell is given to the movement control connection.

In communication between the radio zone forming sections #1-j (E03*ij*) and the mobile terminal controller E051, an AAL3 is used as an adaptation layer to obtain a variable length message. For this purpose, an MID is allocated to each of the radio zone forming sections E03*ij*.

Each radio zone forming section divides a messages into cells by using the allocated MID when the message is to be transferred to the radio zone forming sections E03*ij*. Thereafter, the VPI/VCI values of these cells are sent as VPI/VCI values allocated to the connection I02 between the radio zone forming sections and a passive star optical coupler. As a result, with the operation of the connection I02, these cells are guided to the mobile terminal controller E051. In the mobile terminal controller E051, a message is assembled by cell flows transferred from the radio clusters with reference to the MIDs. In this manner, the radio cluster which sends a message assembled with reference to the VPI/VCI and the radio cluster which sends a message assembled with reference to the MID are identified by the radio zone forming section.

On the other hand, when the mobile terminal controller E051 sends a message of one of the radio zone forming sections E03*ij*, the mobile terminal controller E051 divides the message into cells by an MID allocated to the radio zone forming section E03*ij* to which the cells are to be sent. Thereafter, the VPI/VCI values of the cells are sent as VPI/VCIs allocated to the connection I01 between the mobile terminal controller E051 and the ATM switch. As a result, with the operation of the connection I01, these cells are guided to the radio zone forming sections E03*ij* in the same radio cluster. The radio zone forming section E03*ij* extracts only cells each having the same MID as that allocated to the radio zone forming section E03*ij* to assemble a message.

In the embodiment shown in FIG. 1, a message is changed into cells by an MID allocated to a sender. However, even if the mobile terminal controller E051 changes the message into cells by the MID allocated to a destination, a process for sanding the message to the connection I01 is only the mobile terminal controller. For this reason, it should be noted that normal message assembly can be performed by the radio zone forming sections E03*ij* without simultaneously changing different messages into cells by the same MID. When packaging is performed as described above, it can be advantageously determined with reference to only an MID whether a message is a message sent to the radio zone forming section, and an unnecessary message does not have to be assembled.

In the mobile terminal controller E051, a cell belonging to the connection I02 is transferred to the control cell branch/insert section H05 through the physical layer section H01 and the pay load decoding section H03. In the control cell branch/insert section H05, a cell given from a radio cluster as information for controlling a mobile terminal is branched to the control processor H09. The branching conditions in the control cell branch/insert section H05 are as follows. That is, the control cell branch/insert section H05 refers to the VPI/VCI of the cell input from the pay load cipher section H02 side, and branches cells having VPI/VCIs allocated to movement control connections set between the mobile terminal controller E051 and the ATM switch to the control processor H09.

A cell belonging to the 1:m unidirectional ATM connection 101 is transferred in the mobile terminal controller E051 in the following manner. The control processor H09 forms a control message sent to a mobile cluster such as a cell belonging to the connection I01, the message is divided into cells by an MID allocated to a radio zone forming section serving as a destination, and a VPI/VCI for transferring the cells to a radio cluster serving as a destination is written in the header portion of each cell obtained by dividing the message, thereby giving the cells to the control cell branch/insert section H05. The control cell branch/insert section H05 replaces an empty cell in the cell slow toward the physical layer section H01 with the cells given from the control processor H09, and the cells are sent to the physical layer section H01 through the pay load cipher section H02. In this manner, the cells formed by the control message formed by the control processor H09 are sent from the mobile terminal controller.

Note that the control processor H09 forms an ATM connection setting request for realizing the mobile terminal service. Therefore, like the mobile terminal connection described above, cells required for communication with a connection setting section G09D are also branched/inserted in the control cell branch/insert section H05.

Figure 16:
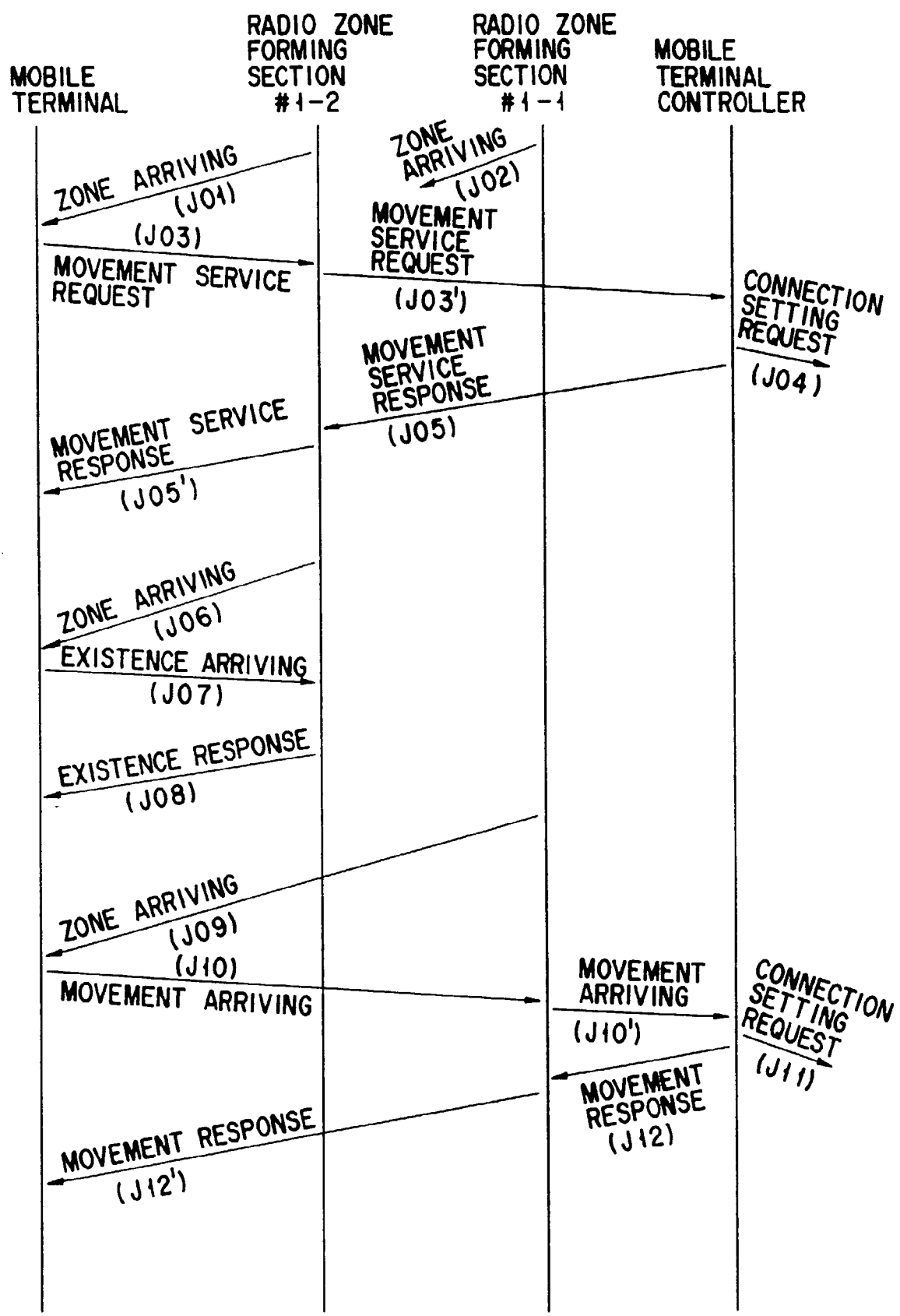
FIG. 16 is a view showing message sequences exchanged between a mobile terminal and a communication network in Embodiment 3.

FIG. 16 is a message sequence diagram in which messages exchanged among the mobile terminal E041, the radio zone forming sections E03*ij*, and the mobile terminal controller E051 are time-serially arranged. FIG. 16 shows a case wherein connection setting is performed when the mobile terminal E041 is present of the radio zone of the radio zone forming section #1-2, and, thereafter, the mobile terminal E041 moves to the radio zone of the radio zone forming section #1-1.

Like the radio zone forming section described by the present inventor in Japanese Patent Application No. 5-349634, the radio zone forming sections E03*ij* according to this embodiment broadcasts identifiers given to the radio zones of the radio zone forming sections E03*ij* to the radio zones at predetermined time intervals (zone arriving messages J01, J02, J06, and J09). As described above, since ATM cells are transferred on the radio channels in a radio zone, as described by the present inventor in Japanese Patent Application No. 5-349634, the zone arriving messages may be transferred as one type of broadcast cells defined as cells each having a predetermined VPI/VCI. In addition, the radio zone identifier may be a node number added to a radio zone forming section. The mobile terminal controller E051 has a table for holding the relationship between the radio zone identifiers and the positions of the radio zone identifiers on an actual map. This table is maintained and updated by a maintenance person of a CATV network when the radio zone forming sections are installed.

When a power is turned on, the mobile terminal E041 sequentially scans frequencies used as downstream links of the radio zones first to measure the intensities of electric field of the frequencies. Thereafter, a reception frequency is fixed to a frequency at which a radio wave having the highest intensity of electric field, and a bit stream is reproduced on the basis of the radio wave. Thereafter, frame synchronization and cell synchronization are established for the bit stream to reproduce cell flows on the downstream links. The mobile terminal E041 waits for the zone arriving message which appears on the downstream links.

When the mobile terminal E041 receives the zone arriving message appearing on the downstream links, it is regarded that the mobile terminal E041 can receive a movement service. When the user of the mobile terminal E041 begins to perform communication by using a new mobile terminal, the mobile terminal E041 sends a movement service request message (J03) in response to an instruction of a user. The mobile terminal sends the movement service request message (J03) at the upper stream link frequency of the radio zone to which the mobile terminal belongs by a broadcast cell, and gives the movement service request message (J03) to the radio zone forming section #1-2. The radio zone forming section #1-2 buries the movement service request message in the pay load portion of an AAL3 on the basis of an MID allocated to the radio zone forming section #1-2 to change the movement service request message into cells, and transfers the cells to the mobile terminal controller through the connection I02 (J03'). The mobile terminal controller E051 interprets the received movement service request message to obtain the layer 3 address of a point at which connection setting must be performed, and a connection setting request (J04) is sent to the connection setting section G0D to perform connection setting to the ATM communication network. Connections requested to be set at this time, as is apparent from the operation of the handover process described above, a connection between the communication destination and the mobile terminal controller, a connection between the mobile terminal controller and a radio cluster in which the mobile terminal is present, and a connection between a cluster adjacent to the radio cluster in which the mobile terminal is present and the mobile terminal controller.

According to the present invention, in order to integrate the VPI/VCI between an ATM switch and a passive star optical coupler in connections set for the movement service in the radio cluster in which the radio terminal is present and the radio cluster adjacent to the radio cluster, the connection setting section G0D must operate such that a service exceeding Q. 2931 protocol as described by the present inventor in Japanese Patent Application No. 5-349436. In order to realize the connection setting, a connection setting section G0E has a process ID allocating section G0E'. The process ID used in this case is an identifier, i.e., VPI/VCI, for identifying a radio terminal in each radio zone.

In Q. 2931 protocol at present, a connection can not be set by specifying the VPI/VCI. If Q. 2931 is modified in future such that a connection can be set by specifying the VPI/VCI, a connection for realizing a simple handover process according to the present invention can be set by Q. 2931 protocol. For this reason, when E. 164 address is allocated to the mobile terminal controller, each radio cluster, and the communication destination, the connection setting section G0D can also use the connection set by Q. 2931 of the host ATM communication network as a movement service.

Upon completion of required connection setting, on the basis of information returned from the connection setting section G0D and related to the set connection, the mobile terminal controller E051 rewrites the table included in the copy tag adding section H08 and the VPI/VCI rewriting section H06 such that the set connections are chained as described above. Thereafter, in order to notify the mobile terminal E041 that connection setting is completed, the mobile terminal controller E051 buries a broadcast cell in the information portion of the AAL3 to transfer a movement acknowledge message (J05) changed into cells again to the radio zone forming section #1-2 through the 1:m unidirectional ATM connection I01.

When the radio zone forming section #1-2 receives the movement acknowledge message from the mobile terminal controller E051, the radio zone forming section #1-2 reproduces a broadcast cell on the basis of the message to broadcast the broadcast cell to a radio zone formed by the radio zone forming section #1-2.

In preparation for a case wherein a mobile terminal moves between radio zones or radio clusters after movement service request message is sent, the mobile terminal response message may be transferred to all the radio zone forming sections of a radio cluster in which the mobile terminal is present when the movement service request message is sent and a radio cluster adjacent to the radio cluster. Transferring to all the radio zone forming sections may be performed such a manner that the same movement service response message is sent by sequentially using MIDs allocated to the radio zones, or MIDs for all-sender-point broadcast may be defined on a 1:m ATM connection. In each radio zone forming section, a cell having an MID for all-sender-point broadcast is assembled as a message, and a process according to the meaning of the message is performed. For example, when a movement service response message is used, the radio zone forming section broadcasts a broadcast cell included in the message to a radio channel formed by the radio zone forming section.

When the mobile terminal E041 receives movement service response message (J05'), the mobile terminal E041 starts communication with a communication destination by using the setting connection. When the mobile terminal E041 receives a zone arriving message (J06) sent from the radio zone forming section #1-2 during the communication with the communication destination, the mobile terminal E041 may return existence arriving message (J07). The two types of messages may be broadcast cells.

When the mobile terminal moves from the radio zone formed by radio zone forming section #1-2 to the radio zone formed by the radio zone forming section #1-1, the following occurs.

The intensity of electric field of a radio wave sent from the radio zone forming section #1-2 at the mobile terminal decreases. As a result, according to an intensity of electric field measurement of a frequency which is always performed by the radio terminal and used as a downstream radio channel, the intensity of the frequency sent from the radio zone forming section #1-2 is lager than each of the other frequencies. In this state, the mobile terminal E041 changes a reception frequency to reproduce a bit stream on the basis of a frequency which can be received at the highest intensity. As a result, frame synchronization and cell synchronization are temporarily released, and frame/cell synchronization is reestablished. As described above, according to the present invention, since a connection with the communication destination is set in the adjacent radio zone or the adjacent radio cluster in advance with the same VPI/VCI, communication with the communication destination can be restarted after the cell synchronization can be reestablished.

When not only the reception intensity measurement for the reception frequencies, but also an operation in which frame/cell synchronization at the reception frequencies is always established is performed, a time in which communication cannot be performed by a handover process can be further shortened. In this case, frame synchronization and cell synchronization must be performed to a plurality of radio channels. For this reason, an amount of hardware of the mobile terminal increases, and the power consumption of the mobile terminal is disadvantageously increases. It should be determined in consideration of characteristics required to the system whether frame synchronization and cell synchronization are simultaneously established at a plurality of reception frequencies.

After a short time, a zone arriving message (J09) sent from the radio zone forming section #1-1 can be received. When the mobile terminal E041 receives the zone arriving message from the new radio zone, the mobile terminal E041 sends a movement arriving message (J10) to the mobile terminal controller E051. The movement arriving message sent from the mobile terminal E041 has the format of a broadcast cell. The movement arriving message is temporarily received by the radio zone forming section #1-1 and changed into cells again such that the broadcast cell is buried in the pay load portion of the AAL3, and the cells are transferred to the mobile terminal controller E051 through the m:1 unidirectional ATM connection I02 (J10').

When the mobile terminal controller E051 receives the moving arriving message, the mobile terminal controller E051 knows the radio zone in which the mobile terminal E041 is present on the basis of the movement arriving message, if necessary (occurrence of movement between the radio clusters), the connection setting request (J11) is sent to the connection setting section G0D. A connection required at this time is a connection for connecting the new adjacent radio cluster to the mobile terminal controller. At the same time, a connection to the old adjacent radio cluster may be released. Upon completion of required connection setting, the mobile terminal controller E051 rewrites a table included in the copy tag adding section H08 and the VPI/VCI rewriting section H06 which are included in the mobile terminal controller E051 such that the newly set connection is connected as described. In this manner, the handover process is completed.

Upon completion of the handover process, the mobile terminal controller E051 forms a movement acknowledge message (J12) by a broadcast cell to notify the mobile terminal E041 of the completion of the handover process and changes the message into cells by the AAL3 to send the cells. The message is temporarily received by the radio zone forming section #1-1 and assembled in the formation of a broadcast cell, and the assembled message is broadcasted to the radio zone of the radio zone forming section to be send to the mobile terminal E041.

In preparation for movement between radio zones/clusters in a time from when the movement arriving message (J10) is sent to when the movement acknowledge message (J12'), the movement acknowledge message (J12), as in the case of the movement service resource message (J05) described above, may be copied and transferred to the radio zone forming sections E03$ij$ in the radio cluster in which the mobile terminal E041 is present or a radio cluster adjacent to the radio cluster.

When the use of service by the mobile terminal is completed, the mobile terminal notifies the ATM communication network that the use of service is completed. When the ATM communication network receives this notification, the mobile terminal controller E051 releases the connection which has been used by the mobile terminal and the connection which is set in advance for movement between the radio clusters. In this case, it is known by one skilled in the art that these connections can be released by the same protocol as described above.

The description related to a function of realizing a handover process for realizing the movement service according to the present invention is completed.

Method of Setting MID Allocated to Radio Zone Forming Section

Note that the values of the MIDs allocated to the radio zone forming sections #1-j (E03$ij$) used in communication on a movement control connection may be allocated by a maintenance person before the movement control connection is installed, or may be acquired by each mobile terminal controller E051 when the movement control connection is set in the following manner.

As an equipment constituting an ATM-LAN system described by the present inventor in the Japanese Patent Application No. 5-349634, is assumed that a global unique node number is added to the radio zone forming section #i-j to which the present invention is applied in the same number space as that of another equipment constituting the system. It is assumed that the VPI/VCI, allocated to a movement control connection, between a radio zone forming section and a passive star optical coupler is predetermined just like a signaling VCI in the UNI standards of the ATM forum.

MID=0 is reserved for an operation such as MID acquisition. When a power is turned on, each radio zone forming section E03$ij$ sends an MID acquisition request message of MID=0 to the connection I01 toward the movement control connection I02. The message of MID=0 is restricted in length i.e. one cell length in order to be able to receive this message without MID acquisition. In this manner, even if the message of MID=0 is sent from the plurality of radio zone forming sections #1-j (E03$ij$) to the connection I02 at once, the messages sent from the respective radio zone forming sections can be correctly received by the mobile terminal controller E051. The MID acquisition request message includes at least a node number allocated to the radio message forming section which sends an allocation request message.

The mobile terminal controller E051 has a table for managing the allocation state of an MID. When the mobile terminal controller E051 receives the MID acquisition request message of MID=0 from the connection I02, the mobile terminal controller E051 finds an empty MID with reference to the MID allocation table. The empty MID is allocated to a radio zone forming section having the node number in the received MID acquisition request message. Thereafter, an MID acquisition response message including the allocated MID and the node number of the radio zone forming section which sends the MID acquisition request message is formed, and is sent to the 1:m unidirectional ATM connection I01 as the message of MID=0. The MID acquisition response message is regarded as a message constituted by a single cell.

The MID acquisition response message is transferred to the radio zone forming sections E03$ij$ by the 1:m unidirectional ATM connection I01. When each of the radio zone forming sections E03$ij$ receives the MID acquisition response message, the radio zone forming section E03$ij$ refers to the node number included in the message to check whether the node number is for the radio zone forming section E03$ij$. When the node number included in the message is allocated to the radio zone forming section E03$ij$, the message is regarded as a message for the radio zone forming section E03$ij$, and the message is acquired. Communication on the following movement control connection is performed by using the MID included in the message.

Note that when the MID acquisition request/response message is lost by a bit error or the like on the way, the MID allocation table managed by the mobile terminal controller E051 does not coincide with the MID which the radio zone forming section E03ij actually has. In order to prevent this, the mobile terminal controller E051 sends the MID confirmation request message at predetermined time intervals, and a protocol in which all the mobile terminal controllers E051 responds to the MID confirmation request message may be defined on the mobile terminal control connection. In this case, as in the MID acquisition request/response message, a message of MID=0 constituted by a single cell is preferably used.

The mobile terminal controller E051 sends a MID confirmation request message to the connection I01 at predetermined time intervals when any fault occurs. The connection I01 causes all the radio zone forming sections E03ij included in one radio cluster to receives the MID confirmation request message. When each of the radio zone forming sections E03ij receives the MID confirmation request message, the radio zone forming section E03ij forms an MID confirmation response message including at least a node number and an MID which are allocated to the radio zone forming section E03ij, and sends the MID confirmation response message to the connection I02. The connection I02 transfers the MID confirmation response message sent from all the radio zone forming sections E03ij to the mobile terminal controller E051. In this manner, since the mobile terminal controller E051 knows MIDs allocated to all the radio zone forming sections E03ij in one radio cluster, the mobile terminal controller E051 can check whether mismatching is present between the MID allocation tables managed by the radio zone forming sections E03ij and actual allocation.

In addition, mismatching between the tables and the actual allocation is detected as a result of MID confirmation/response message, the radio zone forming sections E03ij must be requested to update the MIDs. In order to execute this, MID update request/response message is preferably defined on a movement control connection as a message of MID=0 constituted by a single cell.

The MID update request message includes the node number of the radio zone forming sections E03ij in which mismatching is detected and a correct MID allocated to the radio zone forming section E03ij. When mismatching is detected, the mobile terminal controller E051 forms the MID update request message to send the MID update request message to the connection I01. With the operation of the connection I01, the MID update request message is transferred to all the radio zone forming sections E03ij included in one radio cluster. When each of the radio zone forming sections E03ij receives the MID update request message, the radio zone forming section E03ij compares its node number with the node number included in the message. If the node numbers coincide with each other, it is determined that the MID included in the message is allocated, and the MID used for dividing the subsequent message into cells and assembling the message. Upon completion of the change in MID, the radio zone forming section E03ij forms an MID update response message to send it to the mobile terminal controller E051 through the connection I20.

Format of MID Operation Message

Figure 17:
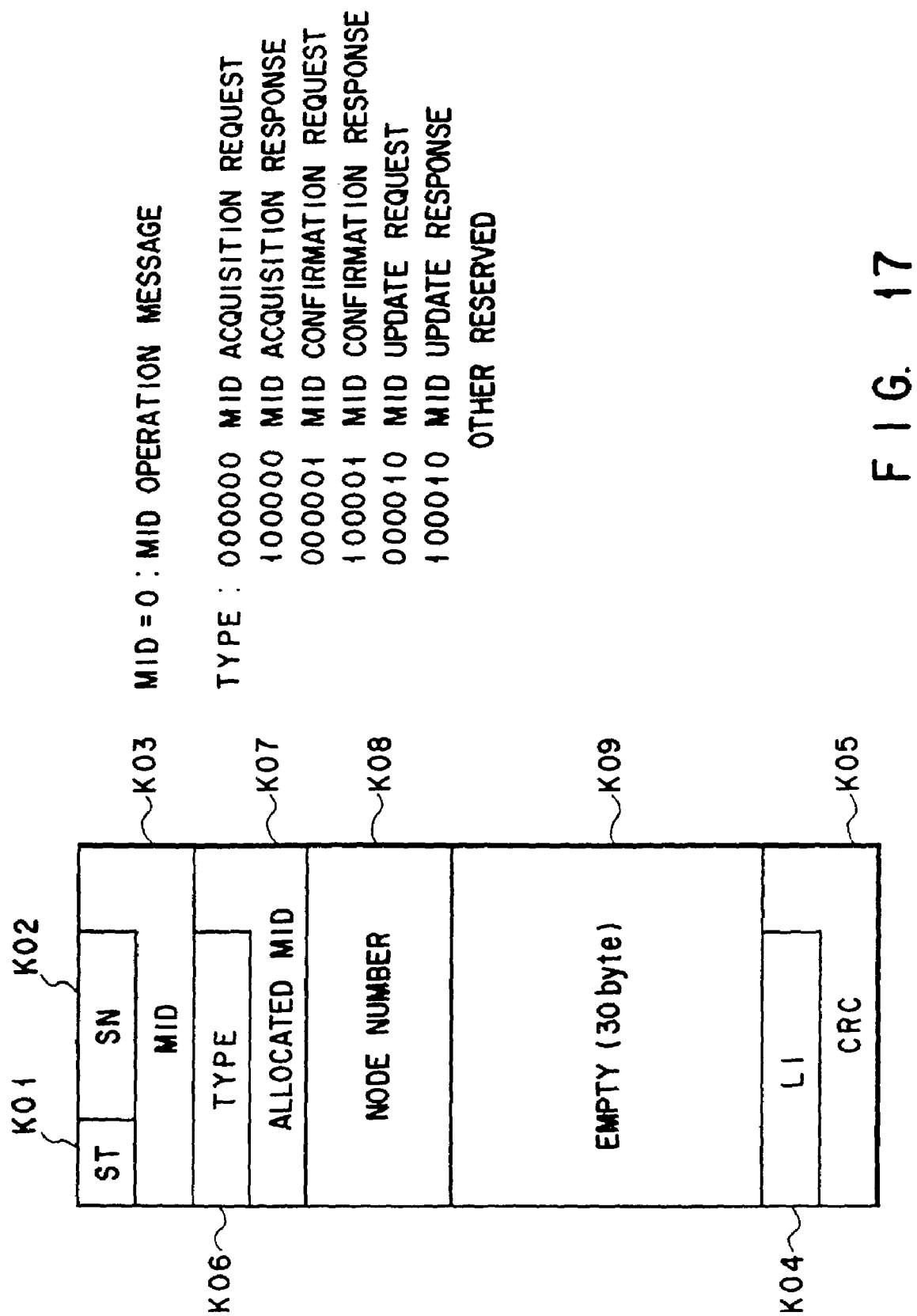
FIG. 17 is a view showing the format of an MID operation message in Embodiment 3.

The protocol defined on the connections I01 and I02 when MID=0 as has been described above. A detailed format of an MID operation message used in the above protocol is shown in FIG. 17. This is a format in which information required for an MID operation is buried in the SAR-PDU of an AAL3/4 in the ITU-T standards. As a matter of course, other formats than the format shown in FIG. 17 can be used. For example, a format in which information required for an MID operation is buried in the CPCS-PDU of the AAL3/4 in the ITU-T standards. However, a CPCS header constituted by information required to correctly assemble a message constituted by a plurality of cells. On the other hand, since a message constituted by a single cell is considered to perform the MID operation, the CPCS-UDP is not necessarily used.

Figure 13:
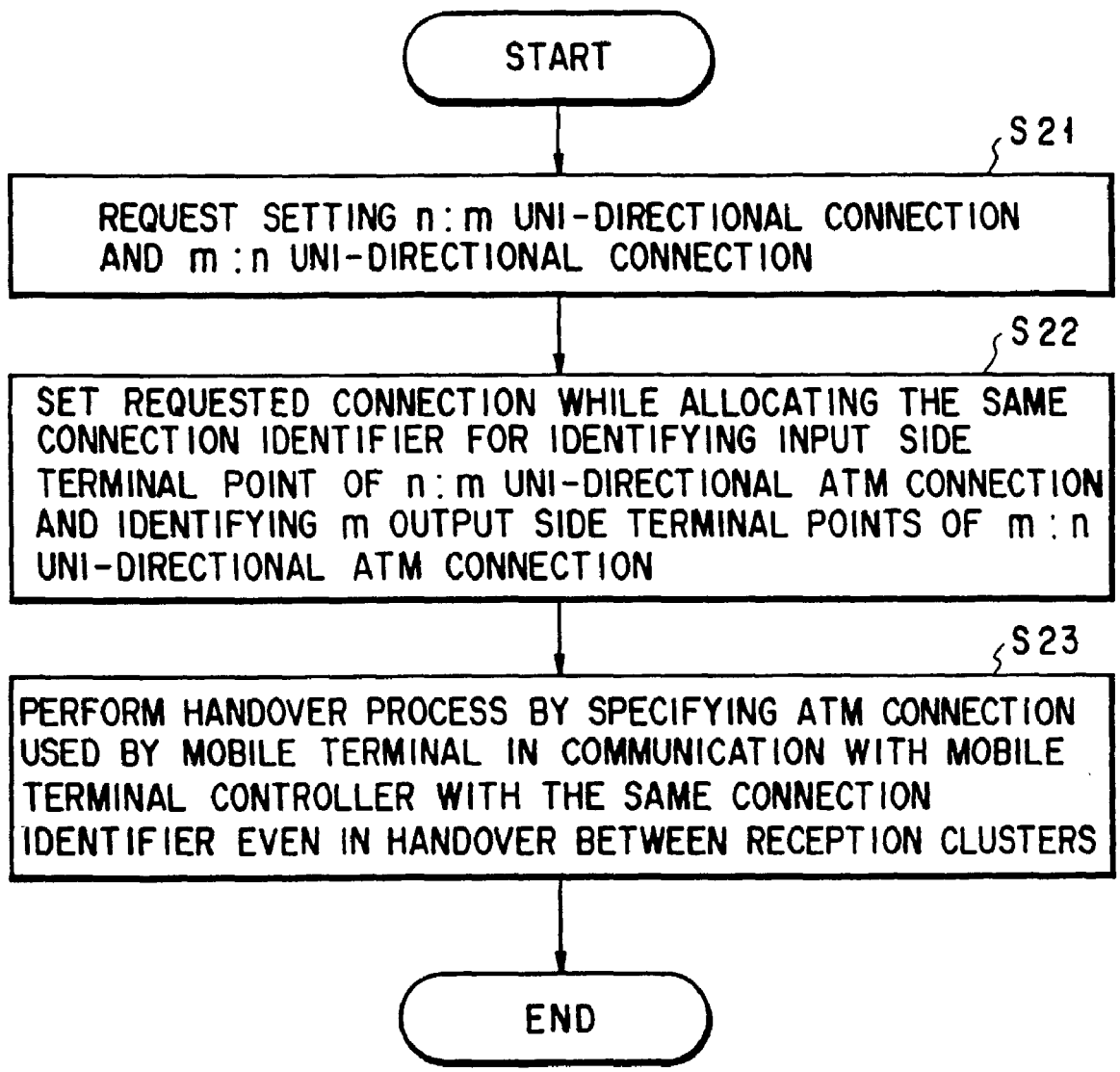
FIG. 13 is a flow chart showing a schematic procedure for a handover process in Embodiment 3.

Referring to FIG. 13, an ST field (K01), an SN field (K02), an MID field (K03), an LI field (K04), a CRC field (K05), a TYPE field (K06), an allocation MID field (K07), and a node number field (K08) are fields used in an SAR layer protocol of the AAL3/4 defined by I. 363 of the ITU-T standards. MID=0 is reserved for the MID operation, and each MID operation message of MID=0 is a single cell constituted by only one cell. For this reason, the ST field (K01) showing a segment type is 11, and all the MID fields (K03) are 0. The SN field (K02) including a sequence number, the LI field (K04) including an information length, and the CRC field (K05) including Circuic Redundancy code used to check bit according to the ITU-T standards.

In the information portion of the SAR-PDU, the following three fields are formed. The first field is a TYPE field (K06) showing the type of an MID operation message. In this example, the TYPE field (K06) has a 6-bit length. Depending on the value of the TYPE field (K06), it is determined whether this message is an MID acquisition request, MID acquisition response, an MID confirmation request, an MID confirmation response, an MID update request, or an MID update response.

The second field is an allocated MID field (K07). This field includes the following information depending on a message type:

In MID acquisition request: Don't care
In MID acquisition response: MID allocated by mobile terminal controller
In MID confirmation request: Don't care
In MID confirmation response: MID held by radio zone forming section
In MID update request: MID allocated by mobile terminal controller
In MID update response: MID registered in radio zone forming section The third field is a node number field (K08). This field includes the following information depending on a message type:

In MID acquisition request: node number of radio zone forming section which requests MID
In MID acquisition response: node number of radio zone forming section subjected to MID allocation
In MID confirmation request: node number of radio zone forming section which requests MID confirmation, or all-terminal broadcast address disclosed by the present inventor in Japanese Patent Application No. 5-349634
In MID confirmation response: node of radio zone forming section holding MID written in MID field
In MID update request: node number of radio zone forming section which requests MID update
In MID update response: node number of radio zone forming section in which MID update is performed A node number described by the present invention in Japanese Patent Application No. 5-349634 includes a process identifier in a terminal and has a total of 12 bytes. Since the allocated MID field has 10 bits, 30 bytes remains as the information portion of the SARPDU. This remaining portion may be designed to transfer other control information included in the broadcast cell described in Japanese Patent Application No. 5-349634.

The description related to the protocol of MID allocation is completed.

Cipher Function of Mobile Terminal Controller

At the end of the description of the mobile terminal controller E051, the cipher function of the mobile terminal controller E051 will be described below while referring to FIG. 14 again.

As has been described above, in the mobile service presenting method according to the present invention, information received by a mobile terminal is broadcasted to all the radio zones of a radio cluster in which the mobile terminal is present and an adjacent radio cluster. For this reason, in order to prevent the content of communication of a mobile terminal from leaking to other mobile terminals, i.e., in order to keep the privacy of communication, a cipher function is necessary. In the arrangement of the mobile terminal controller E051 shown in FIG. 14, the pay load cipher section H02, the pay load decoder H03, and the subscriber cipher key table H04 realize the cipher function.

A cell flow which is exchanged between the physical layer section H01 and an ATM switch includes not only cells which are exchanged between users, but also a control message such as a movement service request message. From the point of view of keeping the privacy of communication, ciphering is preferably performed to the pay load portion of each cell exchanged between users to perform broadcasting in a radio zone. When control messages are ciphered in units of users, since a cipher key required for decoding cannot be known, all the control messages must be ciphered by using one cipher key. However, when the ciphering is performed to all the control messages by using the same cipher key, these control messages can be decoded in all the terminals. Therefore, the meaning of the cipher is lessened.

Cells exchanged between users include a cell transferred to a radio cluster and broadcasted in a radio zone and a cell which is not broadcasted and guided to a destination terminal with cable communication. The cell guided to the destination terminal with cable communication may be ciphered as a matter of course. However, when the cell is not expected to be received by a malicious user, such a cell need not be ciphered.

As described above, between the mobile terminal controller E051 and the ATM switch, the connection between the mobile terminal controller E051 and a radio cluster, the connection between the mobile terminal controller E051 and the communication destination, and a movement control connection are set. These connections are identified by the VPI/VCI between the mobile terminal controller E051 and the ATM switch. More specifically, when the VPI/VCI of each cell is referred to, it can be determined whether the cell is ciphered or not or whether the cell is to be ciphered or not. A ciphered cell input to the mobile terminal controller E051 is temporarily decoded in the pay load decoding section H03, and is subjected to a process in the mobile terminal controller E051. After the cell is subjected to the process in the mobile terminal controller E051, when the cell is transferred to the physical layer section H01, a cell to be ciphered is ciphered in the pay load cipher section. In this manner, it is controlled whether an input cell flow is ciphered with a VPI/VCI. In addition, when it is controlled whether an input cell flow is ciphered with a VPI/VCI, connections can be freely chained from a terminal required to be ciphered to a terminal required not to be ciphered, from a terminal required not to be ciphered to a terminal required to be ciphered, or from a terminal required to be ciphered to a terminal required to be ciphered.

The subscriber cipher key table H04 holds information indicating whether the pay load portion of a cell belonging to a connection treated by the mobile terminal controller E051 is ciphered or not or whether the pay load portion is to be ciphered or not, and a cipher key required for decoding or ciphering if the pay load portion is ciphered or to be ciphered.

As is well known as a conventional cipher, a cipher algorithm using a common key which can independently cipher/decode the pay load of each cell and is used in ciphering or decoding is known. When this cipher algorithm to the pay load, the length of the ciphered pay load does not change. Such a cipher algorithm is preferably used in the pay load cipher section H02 and the pay load decoding section H03.

When a connection required to be ciphered is set by a connection which present a mobile terminal service, the control processor H09 of the mobile terminal controller E051 writes a cipher key which is registered in the control processor H09 in advance for each subscriber which requests connection setting in an entry corresponding to the VPI/VCI of the set connection.

The control cell branch/insert section H05 gives a cell to the physical layer section H01 through the pay load cipher section H02. At this time the pay load cipher section H02 uses the VPI/VCI of the input cell to refer the subscriber cipher key table H04. When the cell belongs a connection required to be ciphered, a cipher key is registered in the subscriber cipher key table H04, and the subscriber cipher key table H04 outputs the cipher key to the pay load cipher section H02. The pay load cipher section H02 ciphers the pay load portion of the cell by using the obtained cipher key, and gives the cell to the physical layer section H01.

When the pay load decoding section H03 receives the cell from the physical layer section H01, the pay load decoding section H03 uses the VPI/VCI of the input cell to refer the subscriber cipher key table H04. When the cell belongs a connection required to be ciphered, a cipher key is registered in the subscriber cipher key table H04, and the subscriber cipher key table H04 outputs the cipher key to the pay load decoding section H03. The pay load decoding section H03 decodes the pay load portion of the cell by using the obtained cipher key, and gives the cell to the control cell branch/insert section H05.

With the above operation, a selected pay load portion can be ciphered in only a necessary connection. Since the control cell branch/insert section H05 treats a relatively large number of connections, a relatively large amount of calculation is required to execute the ciphering/decoding. In consideration of this, the arrangement of the mobile terminal controller E051 shown in FIG. 14 can realize the ciphering/decoding with pipeline hardware.

Each connection and a cipher key can be made relate to each other in such a manner that, when a movement service request message shown in FIG. 16 is sent, a number allocated to a subscriber is included in the movement service request message. A correspondence table between the number of allocated to the subscriber and the cipher key registered when the subscriber joins the movement service is held by the mobile terminal controller E051, and a cipher key from the correspondence table is preferably written in a subscriber cipher key table corresponding the VPI/VCI of the connection set as the result of the connection setting. It is assumed that the subscriber using the mobile terminal E041 is only one or that charging to the mobile terminal E041 is performed to the only one subscriber, and a node number is given to the mobile terminal E041 according to a mobile terminal interface method disclosed by the present inventor in Japanese Patent Application No. 5-349634. In this case, the node number can be regarded as a subscriber number.

As the arrangement of the mobile terminal E041, the arrangement of the mobile terminal disclosed by the present inventor in Japanese Patent Application No. 5-349634 may be used. However, since it is supposed that the mobile terminal disclosed in Japanese Patent Application No. 5-349634 is used in a private network, the mobile terminal does not have a ciphering/decoding function for the pay load portion of a cell. In order to use a mobile terminal in the mobile terminal service described above, the mobile terminal E041 must have a function corresponding to the ciphering/decoding function executed in the mobile terminal controller E051. However, since the ciphering/decoding function on the mobile terminal side may be executed to only a cell which received by the mobile terminal, a large throughput is not specially required. For this reason, the function need not have a dedicated hardware, and may be realized as software which operates on the processor of the mobile terminal disclosed in Japanese Patent Application No. 5-349634. A cipher key required for the ciphering/decoding function may be mailed to a subscriber when the subscriber receives the mobile terminal service in the CATV network, or a subscriber may know the cipher key when the subscriber is registered by a terminal at the front of an office of a CATV company.

The detailed description related to the mobile terminal controller E051 is completed.

Supplementary Description about Compromise Mobile Terminal Service on CATV Network In a method of presenting a mobile terminal service according to the present invention, with movement of a mobile terminal, a connection allocated to the mobile terminal moves in an ATM communication network with the same VPI/VCI value. This means that the same VPI/VCI is allocated to one terminal over a plurality of interface points, i.e., that the VPI/VCI is used as a terminal identifier in an ATM layer. When the mobile terminal is regarded as one process to be migrated, in the first application, the processes to be migrated accesses the network by using the same VPI/VCI to use an MID for identifying the process; in the second embodiment, one process to be migrated accesses the network by using one VPI/VCI.

When the VPI/VCI allocated to the mobile terminal is used for other communication in advance at the migration destination, the VPI/VCI of the connection which performs the original communication must be changed, or the VPI/VCI used by the terminal must be changed. In either of these cases, a communication protocol is complicated. Therefore, in an ATM communication network to which the present invention is applied, an area for a VPI/VCI is formed to the mobile terminal service in advance, and an unused VPI/VCI in the VPI/VCI area is preferably allocated to a terminal which begins to receive the mobile terminal service. This can be more simply realized by the following method. That is, only a VPI is allocated to the mobile terminal service in advance, and a VCI in the VP is sequentially allocated. Such a process is executed in the process ID allocating section G0E shown in FIG. 12.

In the compromise mobile terminal service according to the present invention, when each mobile terminal moves between radio zones, a movement arriving message is sent to the mobile terminal in correspondence with a zone arriving message sent from a radio zone forming section. For this reason, a radio zone where each mobile terminal is located can be known on real time. By using this, the following can be realized. That is, a radio zone is installed at a dangerous place such as a pond located in an area in which a CATV network performs the service, and the mobile terminal controller holds a correspondence table between the number of the radio zone and information indicating whether said radio zone is a dangerous place. When a mobile terminal enters a radio zone specified as a dangerous place by the correspondence table, a predetermined mobile terminal or a fixed terminal can be notified that the mobile terminal enters the dangerous place. Therefore, the following very convenient service for a subscriber can be realized. That is, as described above, a parent gives his/her child a mobile terminal, and an alarm is generated by a mobile terminal which the parent has or a terminal in a living room when the child gets close to the dangerous place.

As has been described above, the mobile terminal controller E051 is a kind of fixed terminal for realizing a special service with the help of the connection setting section G0D. For this reason, an ATM connection must be set between the mobile terminal controller E051 and a connection setting section G05D, as a matter of course. This ATM connection may be a signaling VC defined by Q. 2931 or the like or may be a broadcast channel described by the present inventor in Japanese Patent Application No. 5-349634.

The description related to the compromise mobile terminal service on a CATV network, which is the second application to which the present invention is applied is completed.

Embodiment 3

A resource management method on an ATM-LAN capable of efficiently executing distributed multimedia applications will be described below. As will be described later, this method can be more efficiently used by combining the method to the above process migration method.

Scheduling Method for User Process

The scheduling method for user processes will be described below. In order to cancel the CAC dead-lock described above to advance execution of the user processes, a resource temporarily allocated to a user process #i is intercepted by another user process once before execution of the user process #i is completed. After the operation of the user process which intercepts the resource is completed, or the intercepted resource is released, a resource must be allocated to the user process whose resource is intercepted. For example, in the above mentioned case wherein the CAC dead-lock occurs, a file #1 assured by a process A is intercepted, the file #1 is allocated to a process B, or a communication bandwidth on a physical link P036 obtained by the process B is intercepted to be allocated to the process A. In this case, one process advances, and the other process can be executed by using the resource released upon completion of execution of one process. In this manner, the CAC dead-lock can be canceled.

More specifically, in order to cancel the CAC dead-lock, an OS integrally manages not only ordinary resources such as a file, a memory, and a processor which are managed to be allocated to user processes, but also a communication bandwidth serving as a resource unique to the ATM communication network, and the resources are orderly allocated to the respective user processes. At the same time, a process in which, when dead-lock occurs, resources are intercepted from a user process to be allocated to another user process must be realized.

When interception of resources is to be realized, a process is preferably performed such a manner that an overhead for intercepting the resources. In order to decrease the overhead in size, an interception process must be structured in consideration of the nature of resources. The nature of the resources has the following two types.

The first type is a resource having a side effect represented by a file. The side effect means that a result obtained when a process obtains the resource and then processes the resource influences execution of another process. For example, assume that a plurality of processes write some data in a same file. It is assumed that a process A writes data "A" in a file A having an initial value "0" that a process B writes data "B". In this case, when the process A is executed first, and the process B is executed, information read when the process B accesses the file A is "A". However, when the process B is executed first, information read from the file A becomes "0". More specifically, execution of the process A influences execution of the process B.

The access order for resources having side effects considerably influences execution of the processes.

The other type of a resource is a resource which is represented by, e.g., a processor, and has no side effect. When allocation of a processor is changed from a process to another process, the value of a register in the processor is temporarily saved at a place, generally, in an area called a stack on a memory, the value of the register of a new process to be executed is loaded in the processor, and the new process begins to be executed. In this manner, unless the processor is allocated to processes, execution of a process does not influence execution of another process. That is, there is no side effect.

When a resource having a side effect is to be intercepted, an operation which is performed to the resource by a process is temporarily reset, and the operation must be performed to another resource. For example, dead-lock occurring when the process A and the process B scramble for a file #1 (P041) and a physical link P036 is to be canceled, in order to intercept the file #1 assured by the process A, a process such as data write or data delete performed to the file #1 before the process A is slept must be reset, otherwise, the process B accesses the file #1 in a vague state, i.e., in the middle of processing for the process A. To reset the contents of a file is an important process of the overhead. Therefore, as a resource to be intercepted, a resource having no side effect is preferentially intercepted.

In addition to the processor described above, a communication bandwidth serving as a source unique to an ATM communication network can be regarded as a resource having no side effect. More specifically, the communication bandwidth is a resource which is suitable for interception. When the communication bandwidth is intercepted to prevent a process for a user process from being executed, the user process becomes a sleep state in this state. Even if a communication bandwidth is allocated to the user process again to restart the process for the user process, the process advances from the state in which the user process is slept, and only a message is sent. For this reason, the process can be advanced without considering that the user process is slept. A message which is input in the ATM communication network immediately before the user process is slept and which arrives at the user process after the user process is slept may be received by the user process. In this case, as in a case wherein a message is discarded due to a bit error or the like, when a resending process is executed, a correct process can be performed.

After some request is sent on a protocol process, when the response of the request is not returned within a predetermined time, it is determined that abnormality occurs (for example, a request message is discarded), and a timeout process is often started. When a timer used for the timeout process is stopped while the user process is slept, the timeout process can be preferably prevented from being stopped while the user process is slept.

While a user process to which a communication bandwidth is allocated is slept, the user process cannot send a message. More specifically, since the user process which is slept does not use a communication bandwidth, the communication bandwidth allocated to the user process is intercepted by another user process, and the user process performs communication by using the communication bandwidth. In this case, the communication bandwidth on a physical link can be effectively used, and a total of execution time of user processes can be advantageously shortened.

A method of integrally managing a communication bandwidth which is a resource having no side effect and a file which is a resource having a side effect will be described below.

When the scheduling method for user processes which are distributed multimedia of the present invention is used, in order to schedule a request from each user process to the communication bandwidth of each physical link P03$i$, as shown in FIG. 19, communication bandwidth management processes Q011 to Q019 for temporarily holding requests from the user processes to communication bandwidths in units of physical links are arranged. The communication bandwidth management process Q011 manages a communication bandwidth on a physical link P031, the communication bandwidth management process Q012 manages a communication bandwidth on a physical link P032, and, similarly, the communication bandwidth management processes Q013 to Q019 respectively manage communication bandwidths on physical links P033 to P039. Each communication bandwidth management process Q01$i$ includes a process queue Q03$i$ for queuing a communication bandwidth request from each user process. In addition, since the communication bandwidths are allowed to be intercepted, each communication bandwidth management process Q01$i$ includes an intercepted process register Q04$i$ for, when a communication bandwidth allocated to a user process is intercepted by another process, holding the intercepted.

In order to schedule requests from the user processes to the files P04$i$, file management processes Q021 to Q025 for temporarily holding the requests from the user processes in units of files are also arranged. The file management process Q021 manages a file #1 (P041), the file management process Q022 manages a file #2 (P042), and, similarly, the file management processes Q023 to Q025 respectively manage files #3 (P043) to #5 (P045). Each file management process Q02$i$ includes a process queue Q05$i$ for queuing a file use request from each user process. In the scheduling method described here, assume that a file having a side effect is not allowed to be intercepted. For this reason, an overhead related to interruption decreases in size, but dead-lock may occur with respect to a file. With respect to this, when a well-known protocol for parallel control to a shared file system such as "Optimistic concurrency control" disclosed in "Distributed systems concepts and design", George F. Coulouris & Jean Dollimore (supervisorily translated by Mizuno Tadanori, Denki Shoin) is applied, a occurrence probability of dead-lock can be decreased. It does not influence the validity of the present invention whether such a protocol is applied to a file.

For descriptive convenience, the following description is performed with assuming that a parallel control protocol is not applied to a file. As a matter of course, when interception of a communication bandwidth described here and a parallel control protocol related to a file are performed at once, an occurrence probability of dead-lock decreases. However, in this case, an overhead for performing interception disadvantageously increases in size.

Figure 20:
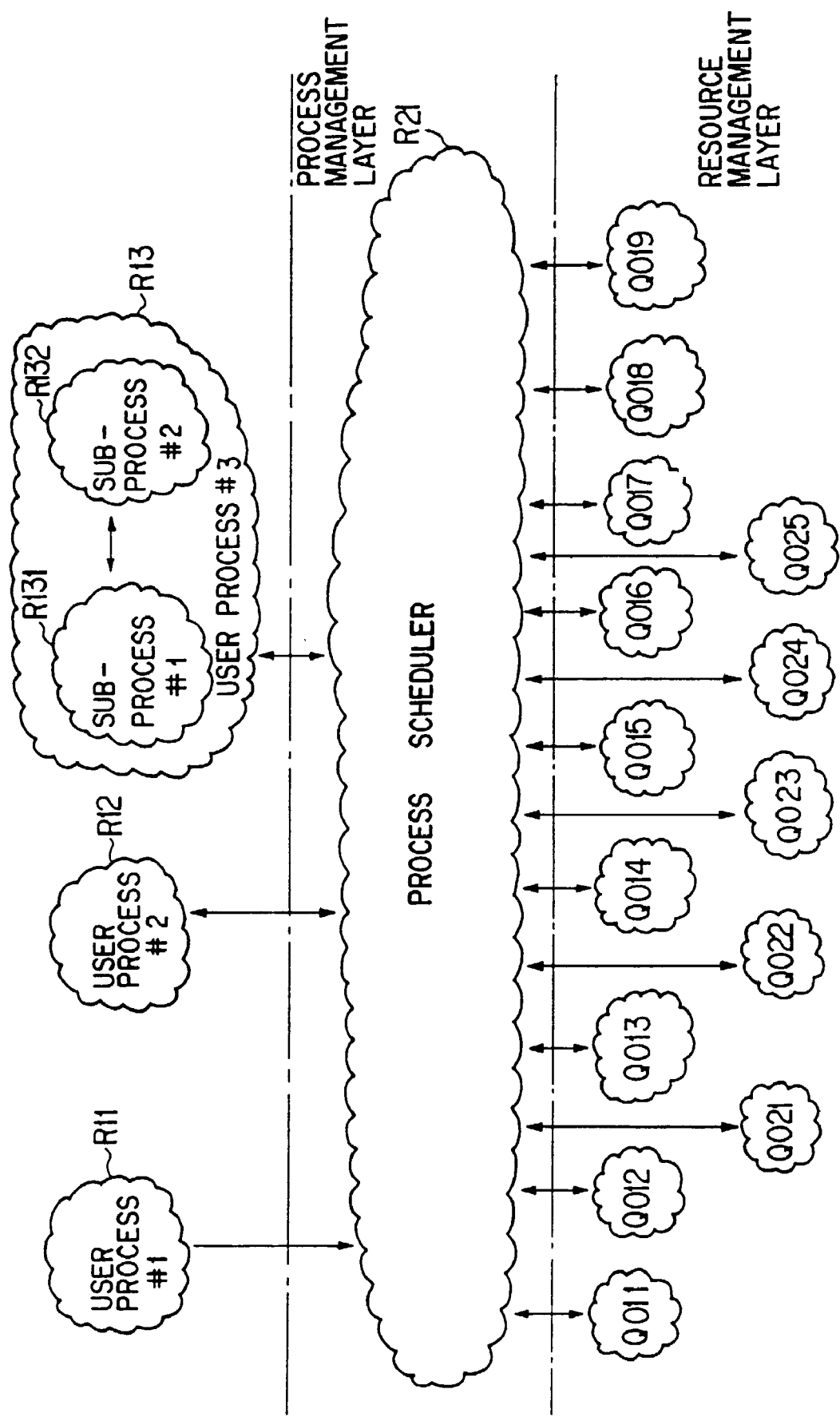
FIG. 20 is a view showing the correspondence among a resource managing process, a user process, and a process scheduler in Embodiment 4.

The communication bandwidth management processes Q01$i$ and the file management processes Q02$i$ are designed to communicate a process scheduler R21 as shown in FIG. 20. The process scheduler R21 controls the operation of the user process #i (R1$i$) in consideration of a resource request from each user process. Each user process #i outputs a use request for resources other than a process resource to the process scheduler R21. The process scheduler R21 communicates process groups Q01$i$ and Q02$i$ for managing resources to determine whether resources are allocated to the requests. When the resources are allocated to the requests, execution of the user process #i is continued; when the resources are not allocated to the requests, the user process is slept until the resources are allocated to the requests.

Each user process #i may be constituted by a plurality of sub-processes R131 and R132 for performing communication through an ATM connection whose communication bandwidth is assured. In this case, it is assumed that all the plurality of sub-processes are not simultaneously slept/restarted. It is considered that resources requested by the plurality of sub-processes are requested from the same process, the resources may be processed by the process scheduler R21.

Figure 21:
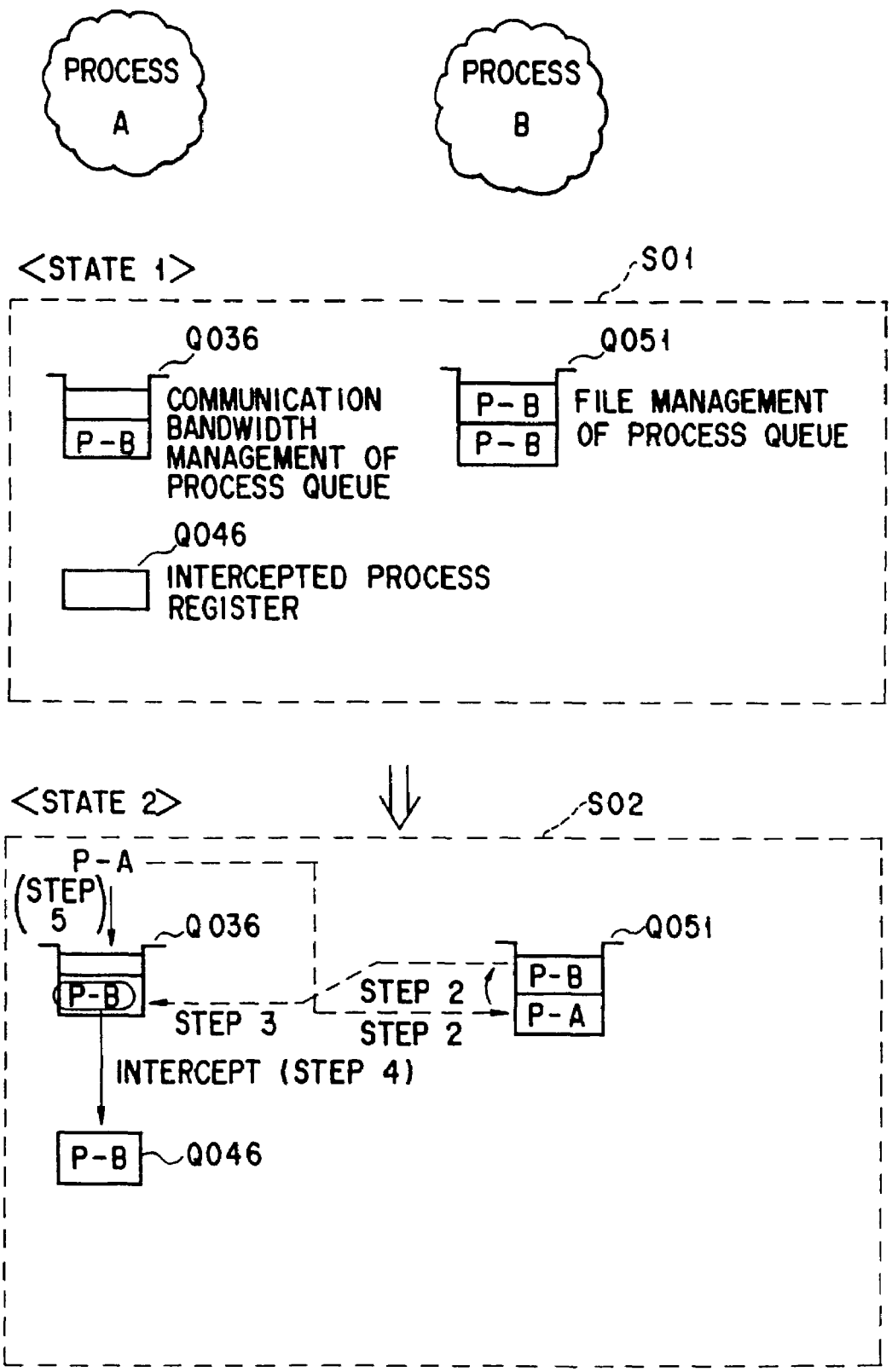
FIG. 21 is a view showing the principle of CAC dead-lock detection in the second application.

The principle of a detection method and avoiding method of CAC dead-lock using process queues executed by the process scheduler R21 will be described with reference to FIG. 21. FIG. 21 shows an example wherein the CAC dead-lock occurs, i.e., only a portion where conflict occurs in the operations of two processes A and B which are arbitrated with respect to a file #1 (P041) and a physical link P036.

In the example described here, concerned process queues are a process queue Q036 for managing the bandwidth of the physical link P036 and a process queue Q051 for managing the file #1. These process queues hold the identifier of a process which generates a request to a corresponding resource. A corresponding resource is allocated to a process corresponding to an identifier held at the start of each of these process queues, and a process corresponding to a subsequent identifier waits for allocation of the resource.

Referring to FIG. 21, in a box (S01) surrounded by a broken line called state 1, the communication bandwidth of the physical link P039 is allocated to the process A, and the file #1 is allocated to the process B. FIG. 21 shows a condition wherein the process B waits for allocation of the file #1. The process B is slept until the file #1 is allocated to the process B.

In this condition, when the process scheduler R21 allocates the communication bandwidth of the physical link P039 to the process A, the process scheduler R21 tries to enqueue the process queue Q036. State 1 is shifted to the condition in a broken-line box (S02) called state 2.

When the identifier of the process A is to be enqueued to the process queue Q036, the identifier of the process B is enqueued to the process queue Q036 in advance (i.e., the bandwidth of the physical link P039 is allocated to the process B in advance). As a result, the process A waits for the bandwidth of the physical link P039. When the process scheduler R21 enqueues the identifier of a process to a process queue, a resource corresponding to the process queue is not immediately allocated to the process corresponding to the identifier to be enqueued, thereby setting an waiting state. In this case, in order to avoid dead-lock, the process scheduler R21 performs the follows.

A resource (in this example, file #1) which has been to a process (in this example, process A) corresponding to an identifier to be newly enqueued is listed up (step 1). A process (in this example, process B waits for file #1) waiting for the resource which has been allocated is listed up (step 2). It is checked whether the process listed up in step 2 assures a resource to be set in a waiting state at present (step 3). If the process listed up in step 2 has assured the resource to be set in a waiting state at present (in this example, process B has assured the communication bandwidth of physical link P039), when the process waits for the resource, dead-lock occurs. For this reason, this resource allocation is not desired. As a result, the process scheduler R21 up to this detects dead-lock.

When the dead-lock is detected, the process scheduler R21 intercepts a resource (in this example, communication bandwidth of physical link P039) having no side effect from the process which has assured the resource to avoid the dead-lock (step 4), and the process scheduler R21 allocates the intercepted resource to a process which generates a new request (step 5). In this example, the communication bandwidth of the physical link P039 is intercepted from the process B and allocated to the process A. Since this condition is expressed by a process queue group shown in FIG. 21, the process scheduler R21 dequeues the identifier of the process B from the process queue Q036 corresponding to the communication bandwidth of the physical link P039, and the identifier of the process B is held by an intercepted process register Q046. Thereafter, the identifier of the process A is enqueued to the process queue Q036. As a result, all the resources required for execution of the process A are allocated, and execution of the process A is continued by the process scheduler R21. More specifically, CAC dead-lock is canceled.

A method of process execution control executed by the process scheduler R21 will be described below with reference to a more complex example.

Figure 22:
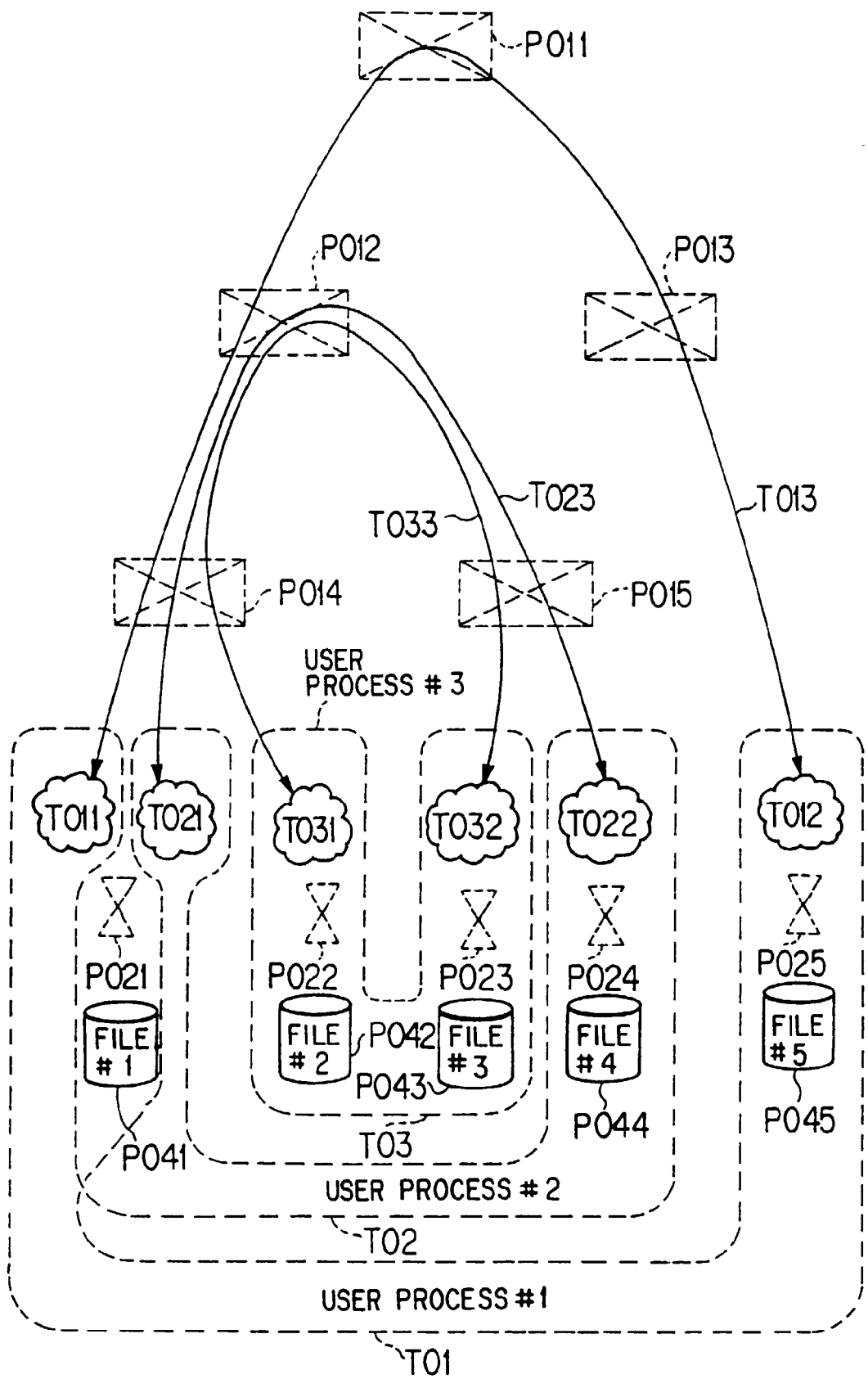
FIG. 22 is a view for explaining a process group for explaining the detailed operation of the second application.

An example for explaining the process execution control will be described below with reference to FIG. 22. The example described here is a case wherein three user processes #1 (T01), #2 (T02), and #3 (T03) are simultaneously executed.

The user process #1 (T01) is constituted by a sub-process T0111 executed on a terminal #1 P021 and a sub-process T012 executed on a terminal P025 which communicate with each other by using a connection T013 through an ATM-LAN. The sub-process T011 refers to the file #1 (P041), and the sub-process T012 refers to a file #5 (P045).

The user process #2 is constituted by a subprocess T021 executed on the terminal #1 P021 and a sub-process T022 executed on a terminal P024 which communicate with each other by using a connection T023 through the ATM-LAN. The sub-process T021 refers to the file #1 (P041), and the sub-process T022 refers to a file #4 (P044).

The user process #3 is constituted by a sub-process T031 executed on the terminal #1 P022 and a sub-process T032 executed on a terminal P023 which communicate with each other by using a connection T033 through the ATM-LAN.

The sub-process T031 refers to a file #2 (P042), and the sub-process T032 refers to a file #3 (P043).

Figure 23:
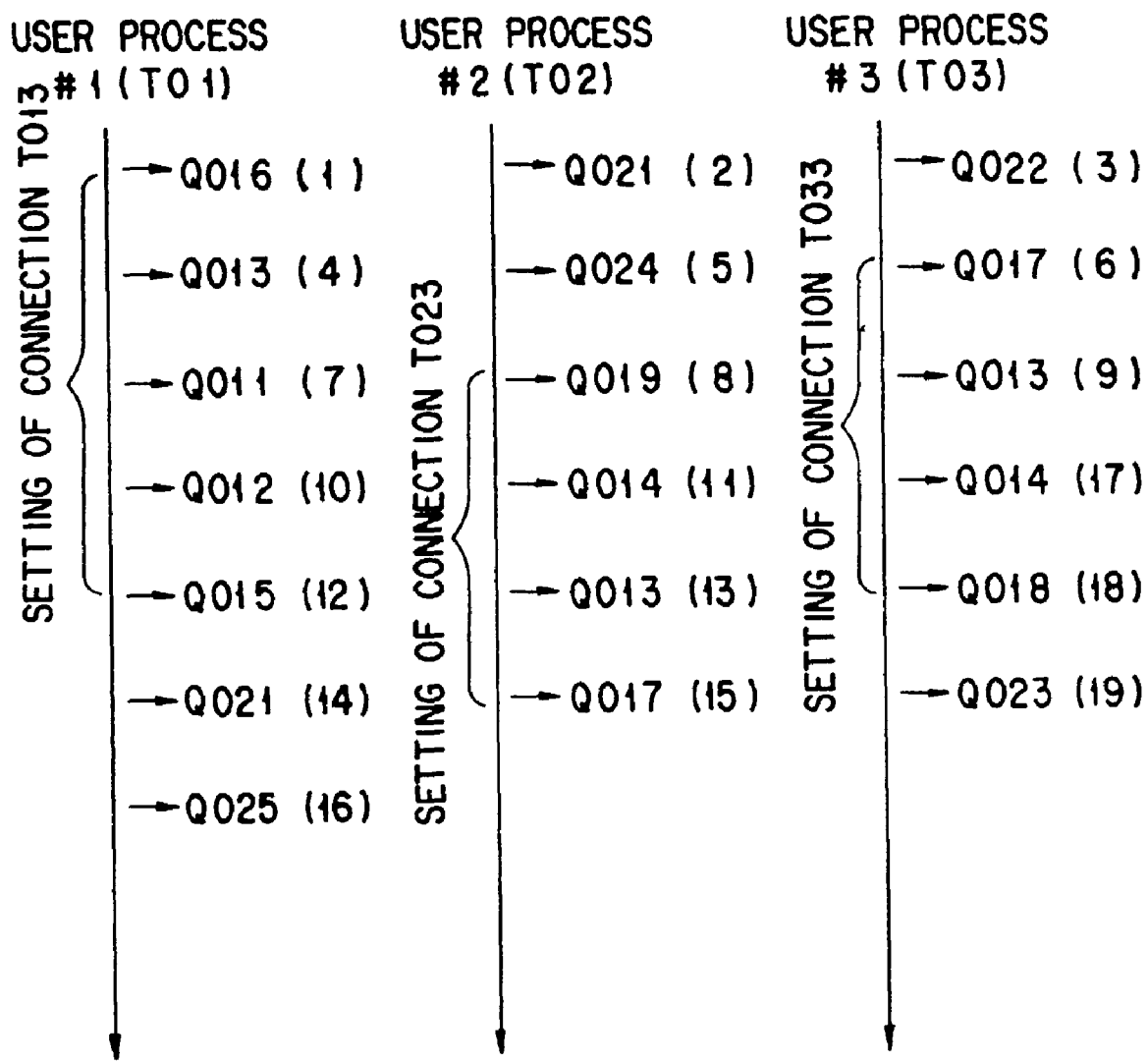
FIG. 23 is a view for explaining a resource request of each process of the process group for explaining the detailed operation of the second application.

Each user process assures the communication bandwidths of physical links in the ATM-LAN in the order shown in FIG. 23 to set a connection required by the corresponding user process, thereby obtaining a file required by the user process.

In order to set connection T013, the user process #1 (T01) sequentially requests the bandwidths of physical links in which the connection T013 is set, and requests two files. More specifically, in order to set the connection T013, the user process #1 (T01) sends a request to a communication bandwidth management process Q016 which manages the bandwidth of the physical link P036, sends a request to a communication bandwidth management process Q013 corresponding to the physical link P033, sends a request to a communication bandwidth management process Q011 corresponding to the physical link P031, sends a request to a communication bandwidth management process Q013 corresponding to the physical link P032, and sends a request to a communication bandwidth management process Q015 corresponding to the physical link P035. Thereafter, the user process #1 (T01) sends a request to the file management process Q021 to use the file #1, and sends a request to a file management process Q025 to use file #5.

The user process #2 (T02) requests two files first, and, in order to set the connection T023, sequentially requests the bandwidths of the physical links in which the connection T023 is set. More specifically, the user process #2 (T02) sends a request to the file management process Q021 to use the file #1, and sends a request to the file management process Q024 to use the file #4. Thereafter, in order to set the connection T023, the user process #2 (T02) sends a request to a communication bandwidth management process Q019 which manages the bandwidth of the physical link P039, sends a request to a communication bandwidth management process Q014 corresponding to the physical link P034, sends a request to a communication bandwidth management process Q013 corresponding to the physical link P033, and sends a request to a communication bandwidth management process Q017 corresponding to the physical link P037.

The user process #3 (T03) requests the file #2 file, and, in order to set the connection T033, sequentially requests the bandwidths of the physical links in which the connection T033 is set. Thereafter, the user process #3 (T03) requests the file #3. More specifically, the user process #3 (T03) sends a request to the file management process Q022 to use the file #2. In order to set connection T033, the user process #3 (T03) sends a request to the communication bandwidth management process Q017 which manages the bandwidth of a physical link P037, sends a request to the communication bandwidth management process Q013 corresponding to the physical link P033, sends a request to the communication bandwidth management process Q014 corresponding to the physical link P034, and sends a request to a communication bandwidth management process Q018 corresponding to a physical link P038. Finally, the user process #3 (T03) sends a request to the file management process Q023.

Since these user processes are executed in parallel, an actual order in which resource requests issued by the user processes are processed by the process scheduler R21 changes depending on loads or the like acting on the terminals. However, in this case, for descriptive convenience, it is assumed that these requests are processed by the process scheduler R21 in the order indicated by circled numbers added to the sides of the requests to the processes which manage the resources in FIG. 18.

Resource management and process execution control where are executed by the process scheduler R21 with reference to the resource management processes are sequentially described below with reference to FIGS. 24 to 28. Note that FIGS. 24 to 28 show the states of the process queues and intercepted process registers of the resource management processes, and show the states of resource lists U01, U02, and U03 which are prepared by the process scheduler R21 in units of user processes and which the user process have.

Figure 24:
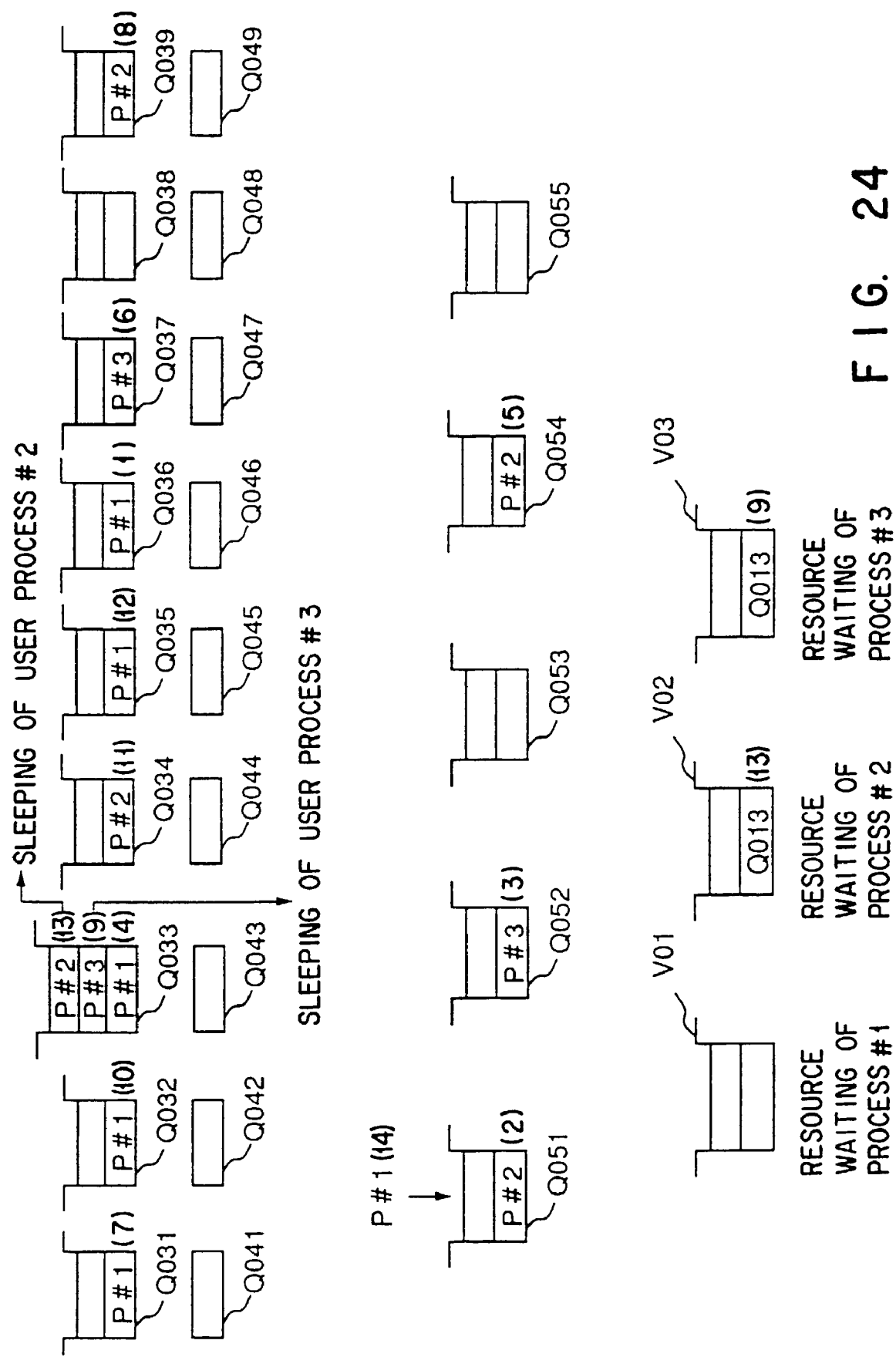
FIG. 24 is a first view for explaining a process scheduling by the second application.
Figure 25:
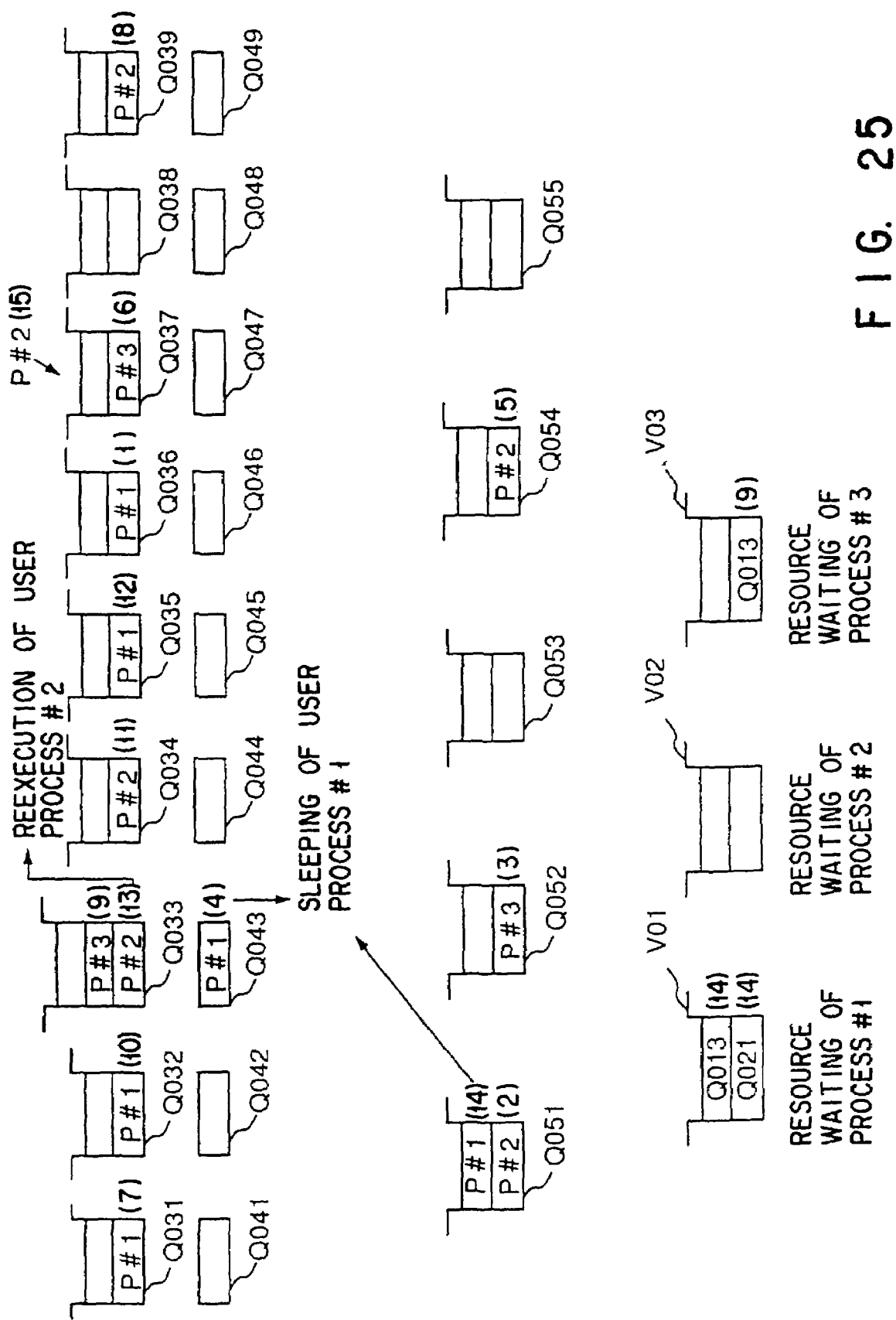
FIG. 25 is a second view for explaining a process scheduling by the second application.

Resource request (1) to (8) are requests to resources which are not assured by other processes, and are allocated to the processes which send requests. FIG. 24 expresses a state wherein the identifier of an allocated user process appears at the start of a process queue corresponding to each resource.

The moment the bandwidth of each physical link is allocated, a VPI/VCI for identifying a connection to be set is allocated by each physical link. The VPI/VCI allocation can be independently performed in each physical link, and can be easily realized. For example, each communication bandwidth management process holds the range of a VPI/VCI which can be set on a physical link managed by the process, and the list of an allocated VPI/VCI. A VPI/VCI which can be set and is not allocated may be searched from the range in which the value of the VPI/VCI can be set and the list of the allocated VPI/VCI. A result obtained by the VPI/VCI allocation may be notified to a required hub by a routing tag setting protocol to each hub disclosed by the present inventor in Japanese Patent Application No. 6-31180. The hub to which the VPI/VCI is notified is set in advance in a routing tag table requiring the notified VPI/VCI. At the same time, the port number of a physical link which assure a bandwidth is also specified. In this manner, a routing tag used for cell routing in the hub can be calculated by the hub itself. As a result, the calculated routing tag is written in the routing tag table together with the notified VPI/VCI.

A resource request (9) is a resource request to the physical link P033 assured by the user process #1 in response to resource request (4). At this time, waiting of resource does not generated by any resources, dead-lock related to resource allocation does not occur. For this reason, the user process #3 can be slept without any problem. The moment the user process #3 is slept, waiting of the user process #3 is registered in a process queue Q033 related to the communication bandwidth of the physical link P033 (FIG. 24), and the process number of a communication bandwidth management process which manages allocation of the physical link P033 is enqueued to the list U03 of resources for which the user process #3 waits. The process scheduler R21 uses this process number of the communication bandwidth management process as the identifier of each resource.

Before the identifier of the user process #3 is enqueued to the process queue Q033 corresponding to the physical link P033, as in the above case wherein a communication and is immediately allocated, even in waiting is to be set, the VPI/VCI used by the user process #3 on the physical link P033 is predetermined. The obtained result may be notified to a required hub by the routing tag setting protocol disclosed by the present inventor in Japanese Patent Application No. 6-31180. The notified hub sets the VPI/VCI used by the user process #3 in advance in the routing tag table. At the same time, the hub calculates a routing tag and sets it in advance as in the case the bandwidth is immediately allocated.

With respect to resource requests (10) to (12), there is no process which assures a corresponding resource in advance.

For this reason, the requested resources requested by the user process #1 (T01) and the user process #2 (T02) are allocated.

In a resource request (13), the user process 32 sends a request to the physical link P033. The physical link P033 allocated to the user process #1 in advance, and the user process #3 is set in a waiting state. As described above, it is checked whether deadlock occurs even if the user process #2 having the physical link P033 is slept. In this case, since waiting does not have occurred in resources except for the resource of the physical link P033, waiting of the user process 32 is registered in the process queue Q033 related to the communication bandwidth of the physical link P033, the user process #2 becomes a sleep state (FIG. 24). At this time, the process number of a communication bandwidth management process which manages allocation of the physical link P033 is enqueued to the list U02 of resources for which the user process #2 waits.

Up to this, only the user process #1 does not become a sleep state. The user process #1 outputs a request of circulated number 14 and a request for the file #1 (P041) to the process scheduler R21.

The file #1 (P041) is allocated to the user process #2 according to the request of circulated number 2. Before waiting of the user process #1 is registered in the process queue Q051 related to the file #1 (P041), the process scheduler R21 checks whether this waiting causes dead-lock (FIG. 24).

The process scheduler R21 obtains a list of user processes which wait resources which has been assured by the user process #1. In this stage, the resources allocated to the user process #1 are as follows. More specifically, the resources are the bandwidth of the physical link P031 (by resource request 7), the bandwidth of the physical link P032 (by resource request (10)), the bandwidth of the physical link P033 (by resource request (4)), and the bandwidth of a physical link P035 (resource request). Processes which wait for these resources can be known on the basis of the identifiers of the processes held in the process queue Q033 which manages the bandwidth of the physical link P033, and are the user process #3 and the user process #2.

Since the list of user processes which wait for the resources which have been assured by the user process #1, the process scheduler R21 checks whether a resource to be assured by the user process #1, i.e., a user process which has assured the file 32, is present in the list of user processes, so as to detect dead-lock. In the state shown in FIG. 24, a process which assures the file #2 is the user process #2, and the user process #2 is present in the process list described above. For this reason, when the user process #1 waits for the file #2, dead-lock occurs.

Since the dead-lock is detected, the process scheduler R21 intercepts the allocated resource to avoid the dead-lock (FIG. 37). On the basis of the process list formed above and the state of the process queue Q051, it is understood that the user process #1 and the user process #2 are set in a dead-lock state when the user process #1 is set in a waiting state. At this time, the resource which cannot be acquired by the user process #1 is a file which is a resource having a side effect, and the user process #2 waits for a communication bandwidth which is a resource having no side effect. Therefore, the overhead of interception of the resource can be decreased by restarting the user process #2 in place of sleeping the user process #1.

When the user process #2 is to be restarted, the communication bandwidth of the physical link P033 is intercepted from the user process #1. In order to express this, the identifier of the user process #1 is registered in an intercepted process register Q043 of the physical link P033, and the identifier of the user process #1 is registered in the process queue Q051 which manages allocation of the file #1 (P041), thereby sleeping the user process #1. At this time, from the list U02 of the resources for which the user process #2 waits, the process number of the communication bandwidth management process which manages allocation of the physical link P033 is dequeued. At the same time, the process number of the communication bandwidth management process which manages allocation of the physical link P033 and the process number of the file management process which manages allocation of the file #1 (P041) are enqueued to the list U01 of the resources for which the user process #1 waits (FIG. 37).

With respect to the user process #1, the following must be noted. That is, the bandwidth on the physical link P033 is intercepted, but the VPI/VCI and routing tag need not be intercepted. More specifically, a VPI/VCI used by the user process #1 on the physical link P033 and a VPI/VCI used by the user process #2 on the physical link P033 are selected to be different from each other, and each VPI/VCI is independently set in the entry of the routing tag table of a required hub. Although the bandwidth assured by the user process #1 is intercepted by the user process #2, setting of the VPI/VCI used by the user process #1 on the routing tag table need not be released. When a bandwidth is allocated to the user process #1 again to restart the user process #1, setting of the routing tag table remains. For this reason, it should be noted that communication can be rapidly restarted.

Figure 26:
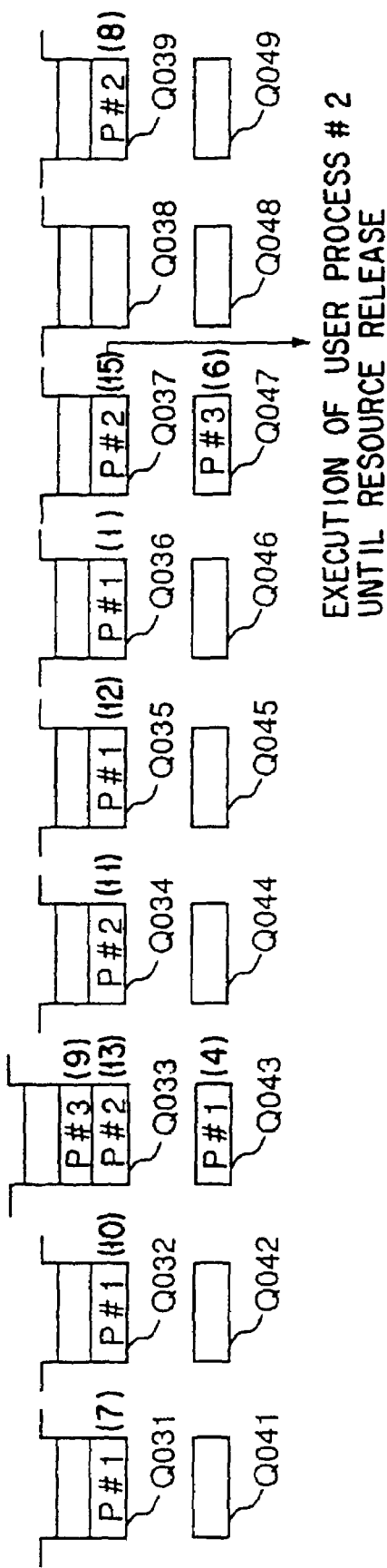
FIG. 26 is a third view for explaining a process scheduling by the second application.
Figure 26:
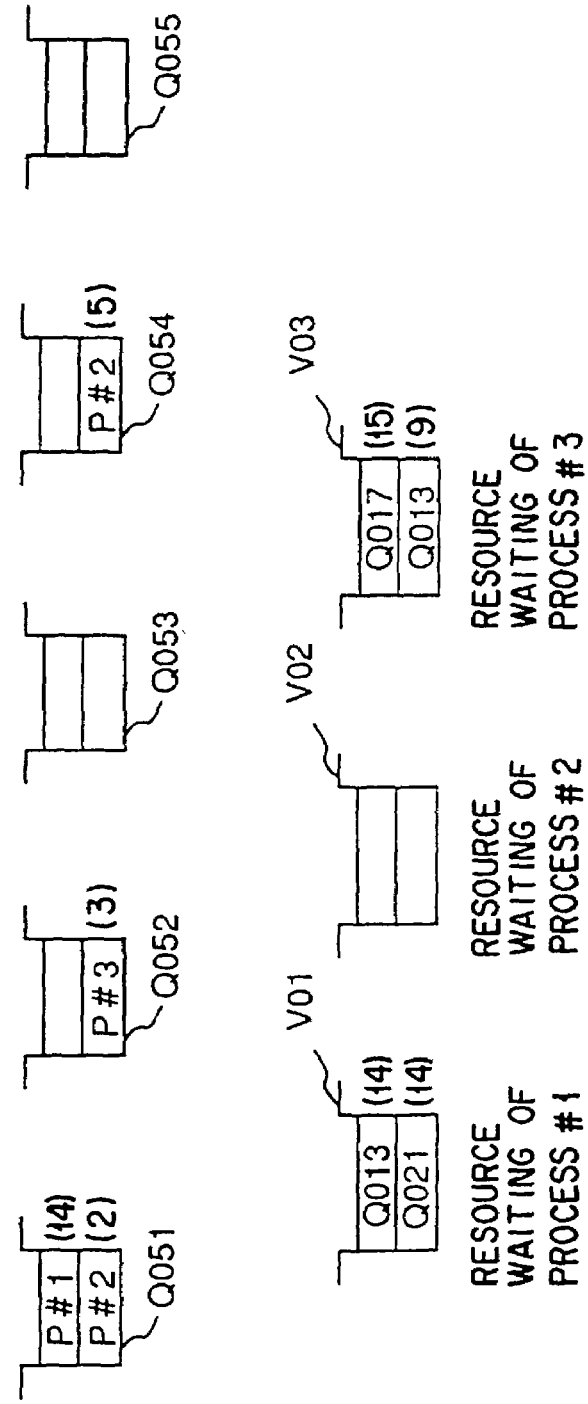

The restarted user process #2 sends a resource request (15) for the physical link P037 to the process scheduler R21. The physical link P037 has been allocated to the user process #3 by the resource request (6). At this time, however, since the user process 33 becomes a sleep state, the bandwidth of the physical link P037 is intercepted to be allocated to the user process #2 (FIG. 26). As a result, all the resources required to execute the user process #2 are allocated to the user process #2, and the execution of the user process #2 is continued until these resources are released. When the identifiers of processes are enqueued to the process queues in the bandwidths, VPIs/VCIs or routing tags on the physical links are sequentially set. For this reason, at this time, routing tag table setting of a hub on the route of the connection T023, which required to set a VP/VC link constituting the connection T023 used by the user process #2 has been completed. Therefore, it should be noted that communication between the sub-processes of the user process #2 can be performed.

Figure 27:
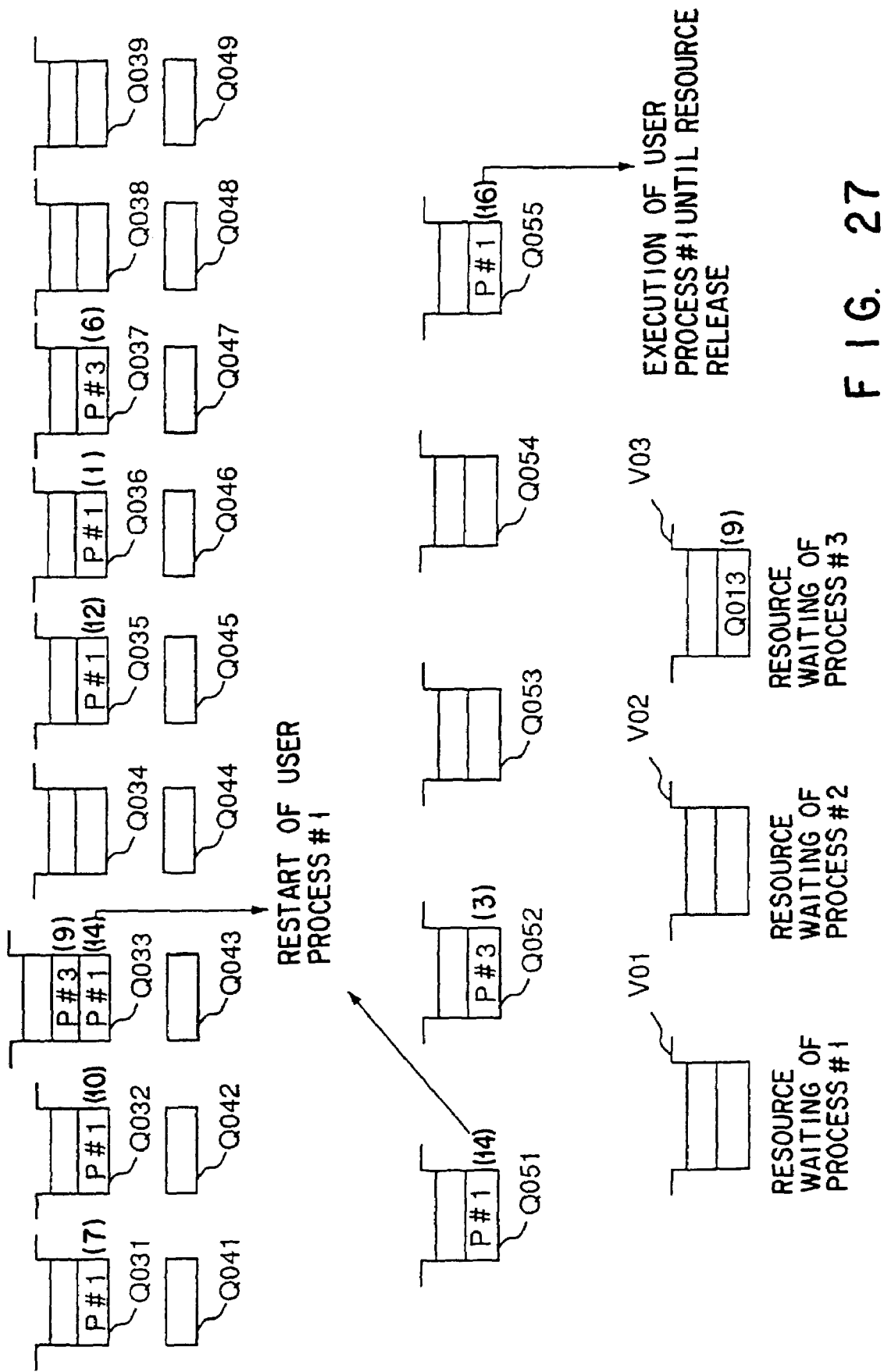
FIG. 27 is a fourth view for explaining a process scheduling by the second application.

When the execution of the user process #2 advances, the resources assured by the user process #2 are released. In order to express this, the identifier of the user process #2 is dequeued from process queues which manage the resources. More specifically, the identifier of the user process #2 is dequeued from the process queue Q033 which manages allocation of a user process to the physical link P033, a process queue Q034 corresponding to the physical link P034, a process queue Q037 corresponding to the physical link P037, a process queue Q039 corresponding to the physical link P039, a process queue Q051 corresponding to the file #1 (P041), and a process queue Q054 corresponding to the file #4 (P044). As a result, the identifier of the user process #1 appears at the start of the process queue related to the file #1 (P041), and the file #1 (P041) is allocated to the user process #1 (FIG. 27).

In addition, with reference to the physical link P033, since the identifier of the user process #1 is written in the intercepted process register Q043, the identifier is inserted in the start of the process queue Q033, and the bandwidth of the physical link P033 is allocated to the user process #1 again. The identifiers of these resources are dequeued from the list U01 of the resources for which the user process #1 waits, and the list becomes empty. For this reason, execution of the user process #1 is restarted.

Setting on the routing tag table related to the VPI/VCI and routing tag which are used on a physical link released together with that on the hub in which the connection T023 is set, by a user process is preferably released by a protocol for releasing routing tag table setting, as disclosed by the present inventor in Japanese Patent Application No. 6-31180.

The user process #1 acquires the file #5 (P045) in response to a request of circled number 16. In this manner, all the resources required to execute the user process #1 are allocated, and execution of the user process #1 is continued until these resources are released.

With respect to the bandwidth of the physical link P037, the identifier of the user process #3 held by a intercepted process register Q047 of the physical link is inserted in the start of the process queue Q037, and the bandwidth of the physical link is allocated to the user process #3 again. The identifier of the allocated physical link is deleted from the list U03 of the resources for which the user process #3 waits. However, at this time, the list is not empty. The user process #3 is kept in a sleep state.

Figure 28:
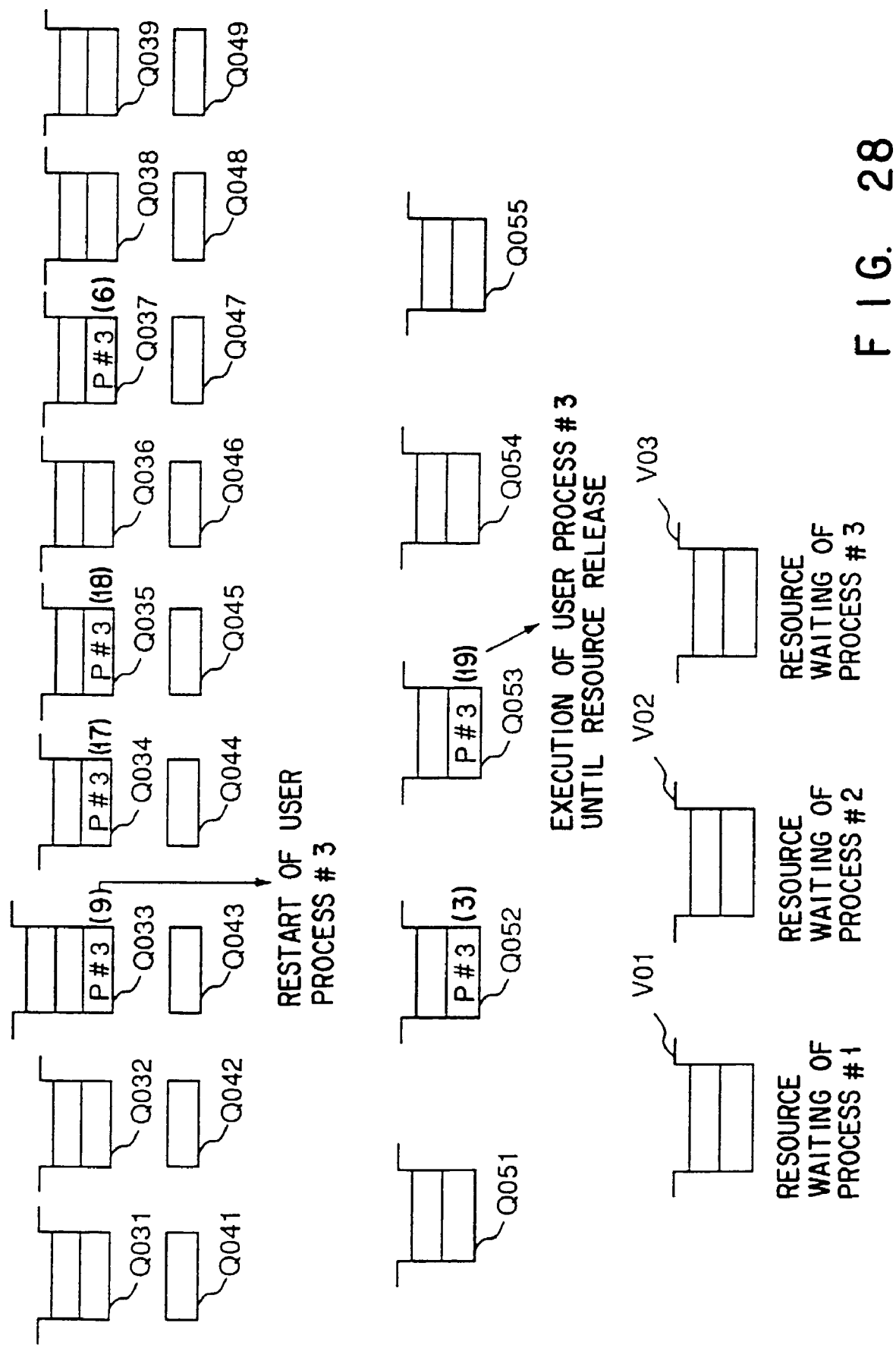
FIG. 28 is a fifth view for explaining a process scheduling by the second application.

When the execution of the user process #1 advances, the resources assured by the user process #1 are released. In order to express this, the identifier of the user process #1 is dequeued from process queues which manage the resources. More specifically, the identifier of the user process #1 is dequeued from the process queue Q031 which manages allocation of a user process to the physical link P031, a process queue Q032 corresponding to the physical link P032, a process queue Q033 corresponding to the physical link P033, the process queue Q035 corresponding to the physical link P035, a process queue Q036 corresponding to the physical link P036, the process queue Q051 corresponding to the file #1 (P041), and a process queue Q055 corresponding to the file #5 (P045). As a result, the identifier of the user process #3 appears at the start of the process queue Q033 related to the physical link P033, and the bandwidth of the physical link is allocated to the user process #3. The identifier of this resource is dequeued from the list U03 of resources for which the user process #3 waits, and the list becomes empty. For this reason, execution of the user process #3 is restarted (FIG. 28).

The user process #3 sequentially sends a request of circled number 17, i.e., a request to the bandwidth of the physical link P034, a request of circled number 18, i.e., a request to the bandwidth of the physical link P038, and a request of circled number 19, i.e., an access request to the file #3 (P043). There is no process which requires resources. Therefore, all the request are satisfied, all the resources required to execute the user process #3 are allocated to the user process #3, and execution of the user process #3 is continued.

As described above, when a process sends a request for a resource, and the resource is assured by another process, the process which sends the request becomes a sleep state. Therefore, an order of access to the resource is controlled.

The description about resource management and process execution control executed by the process scheduler R21 is completed.

In this case, processes for managing resources, communication bandwidth management processes Q01$i$, and file management processes Q02$i$ are described as processes which are independent of the process scheduler R21. However, it is apparent that the process scheduler R21 may incorporate the process queues having these processes and intercepted process registers. If these processes are used as independent processes, the present invention can disadvantageously cope with a change in arrangement of the network, e.g., additionally arrangement of a physical link. However, since inter-process communication increases, an increase in overhead disadvantageously occurs. The process arrangement should be determined depending on a time required for dead-lock detection/avoidance required by the process scheduler R21.

In the example described above, an intercepted process register is arranged for a resource to be intercepted. When interception occurs, the identifier of the process whose resource is intercepted is stored in the register. This can be also realized by the following manner. That is, the identifier of the process which intercepts the resource is inserted into the area next to the process identifier at the start of the process queue.

In addition, in the example described above, it is assumed that the bandwidth of one physical link is allocated to one process. However, the bandwidth of one physical link may be divided to be allocated to a plurality of processes.

Figure 29A:
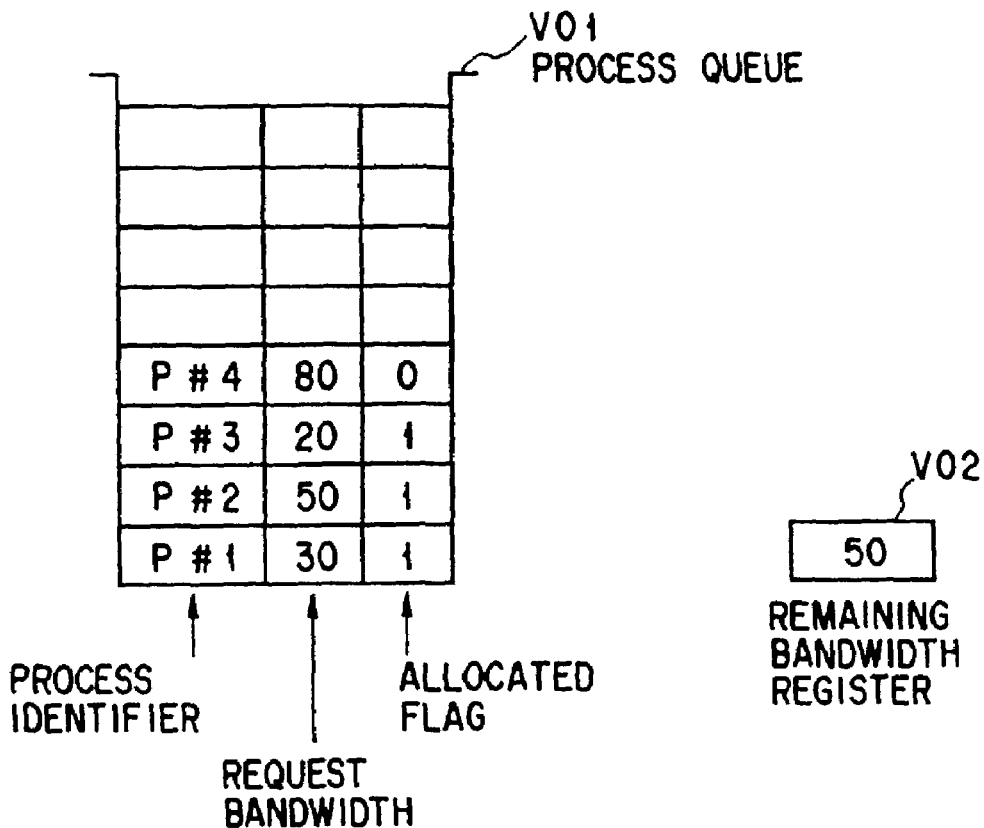
FIGS. 29A and 29B are views showing the arrangement of a process queue used when the bandwidth of one physical link is allocated to a plurality of processes in Embodiment 4.
Figure 29B:
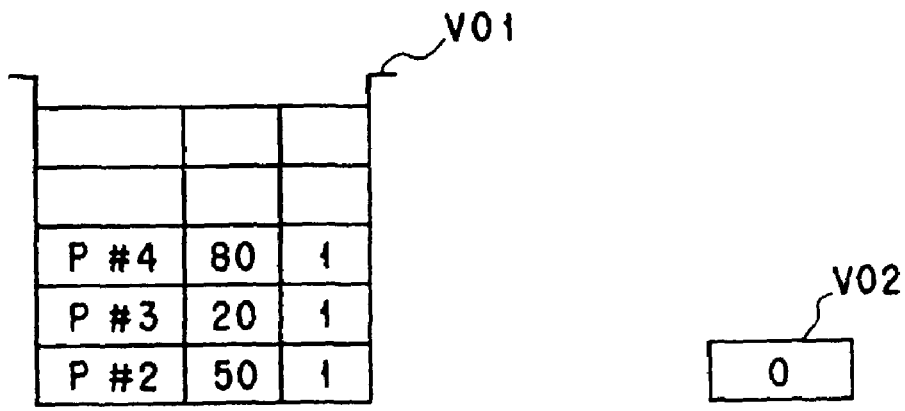

Bandwidths obtained by dividing the bandwidth of one physical link can be allocated to a plurality of processes by, e.g., the following manner. The communication bandwidth management process Q01$i$ may be constituted to include, as shown in FIG. 29, a process queue V01 which can hold words each obtained by combining a process identifier, a request bandwidth, and a allocated flag, and a remaining bandwidth register V02 which remains in the physical link managed by the communication bandwidth management process Q01$i$ and which is not allocated to a user process. The process queue V01 shown in FIG. 29 is designed to manage a physical link having a bandwidth of 150 Mbps. FIG. 29 shows state 1 wherein a request of a 30-Mbps bandwidth from the process #1, a request of a 50-Mbps bandwidth from the process #2, a request of a 20-Mbps bandwidth from the process #3, and a request of a 80-Mbps bandwidth from the process #4 are managed by the process queue Vol.

State 1 is a condition obtained after the processes #1, #2, #3, and #4 request a physical link in this order. Bandwidths according to the requests are allocated to the processes #1, #2, and #3, respectively. This is indicated such that an allocated flag corresponding to the process identifiers is "1". The sum of the bandwidths requested by the processes #1, #2, and #3 is 100 Mbps, the bandwidth remaining on the physical link corresponding to the process queue is 50 Mbps. The remaining bandwidth of 50 Mbps is recorded on the remaining bandwidth register V02. The process #4 requests a bandwidth of 80 Mbps, and this bandwidth exceeds the bandwidth remaining on the physical link at present. For this reason, bandwidth allocation is not performed. This is indicated such that an allocated flag corresponding to the process #4 is "0".

State 2 shows a condition wherein, in state 1, the process #1 release the bandwidth, and the bandwidth is allocated to the process #4.

In condition 1, when the process #1 releases 30-Mbps assured in the physical link, the request related to the process #1 is dequeued from the process queue V01, and, at the same time, the released 30-Mbps bandwidth is added to the remaining bandwidth register V02. As a result, the 80-Mbps bandwidth which remains on the physical link in such a manner that the process #1 releases the bandwidth is recorded on the remaining bandwidth register V02. When the process #1 releases the bandwidth, the bandwidth requested by the process #4 can be obtained on the physical link, and the bandwidth can be allocated to the process #4.

When the 80-Mbps bandwidth is allocated to the process #4, an allocated flag corresponding to the identifier of the process #4 is set to be "1", and, at the same time, the allocated 80-Mbps bandwidth is drawn from the remaining bandwidth register V02. As a result, "0 Mbps" is recorded in the remaining bandwidth register V02.

In state 2, in order to avoid dead-lock, the 80-Mbps bandwidth allocated to the process #4 may be intercepted to be allocated to another process. In this case, as in the above case wherein all the bandwidths of physical links are allocated to one process, the process #4 becomes a sleep state. For this reason, the 80 Mbps is not used by the process #4, and no congestion does not occurs in a hub as a matter of course. When interception occurs, as in the above case all the bandwidths of physical links are allocated to one process, setting of the VPI/VCI and routing tag allocated to the process #4 need not be released.

The above scheduling method for user processes can be executed by, e.g., the call setting process of the ATM-LAN or, in particular, a connection setting process disclosed by the present inventor in Japanese Patent Application No. 6-31180. However, when scheduling of user processes is executed by one process in the ATM communication system as described above, the throughput of a multimedia application on the ATM communication system is disadvantageously limited to the throughput of the process. This scheduling method is preferably executed to be distributed to terminals. This can be realized at low cost by applying the above process migration, as described below.

Figure 30:
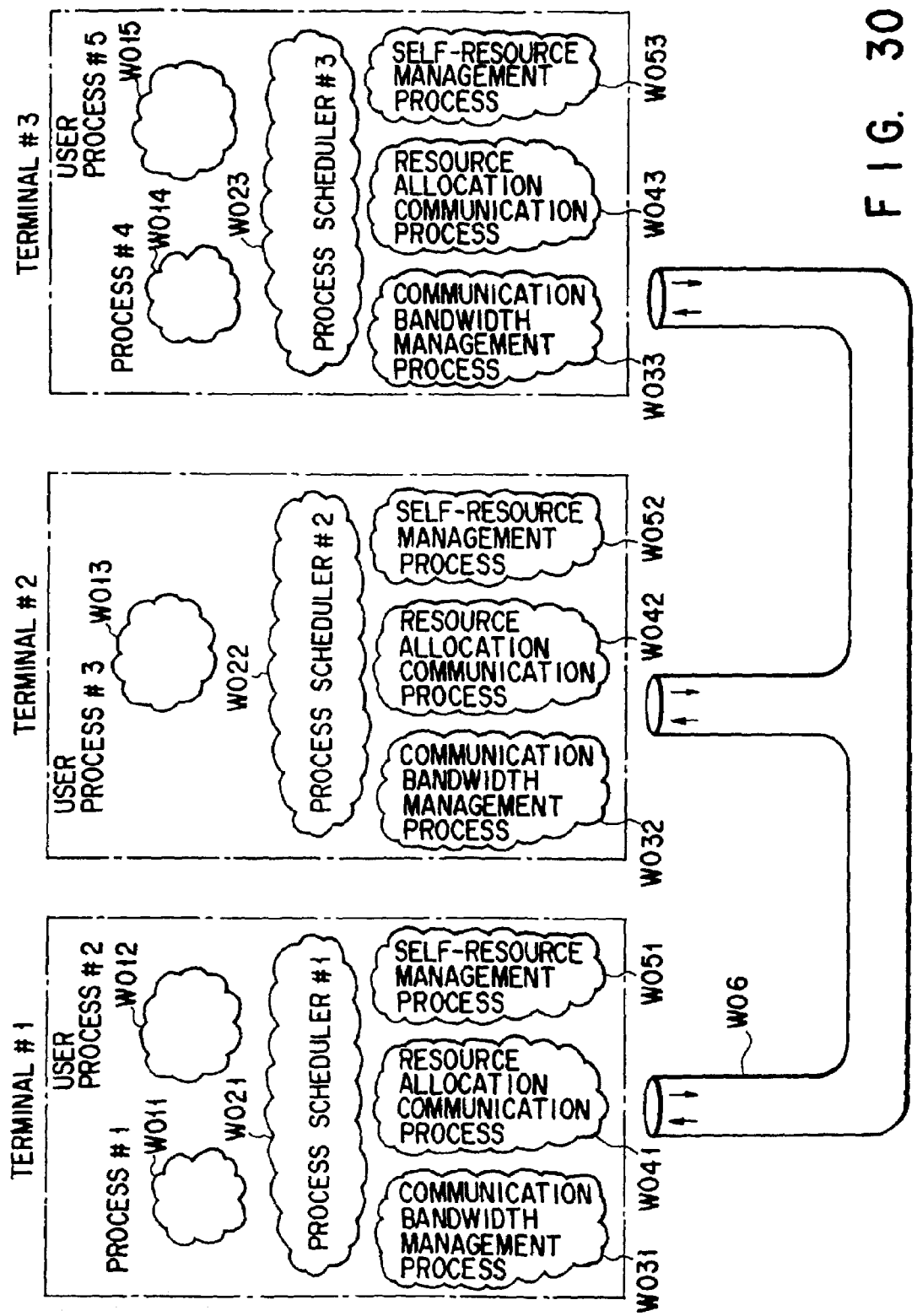
FIG. 30 is a view showing a process arrangement used when the present invention is applied to the second application.
Figure 31:
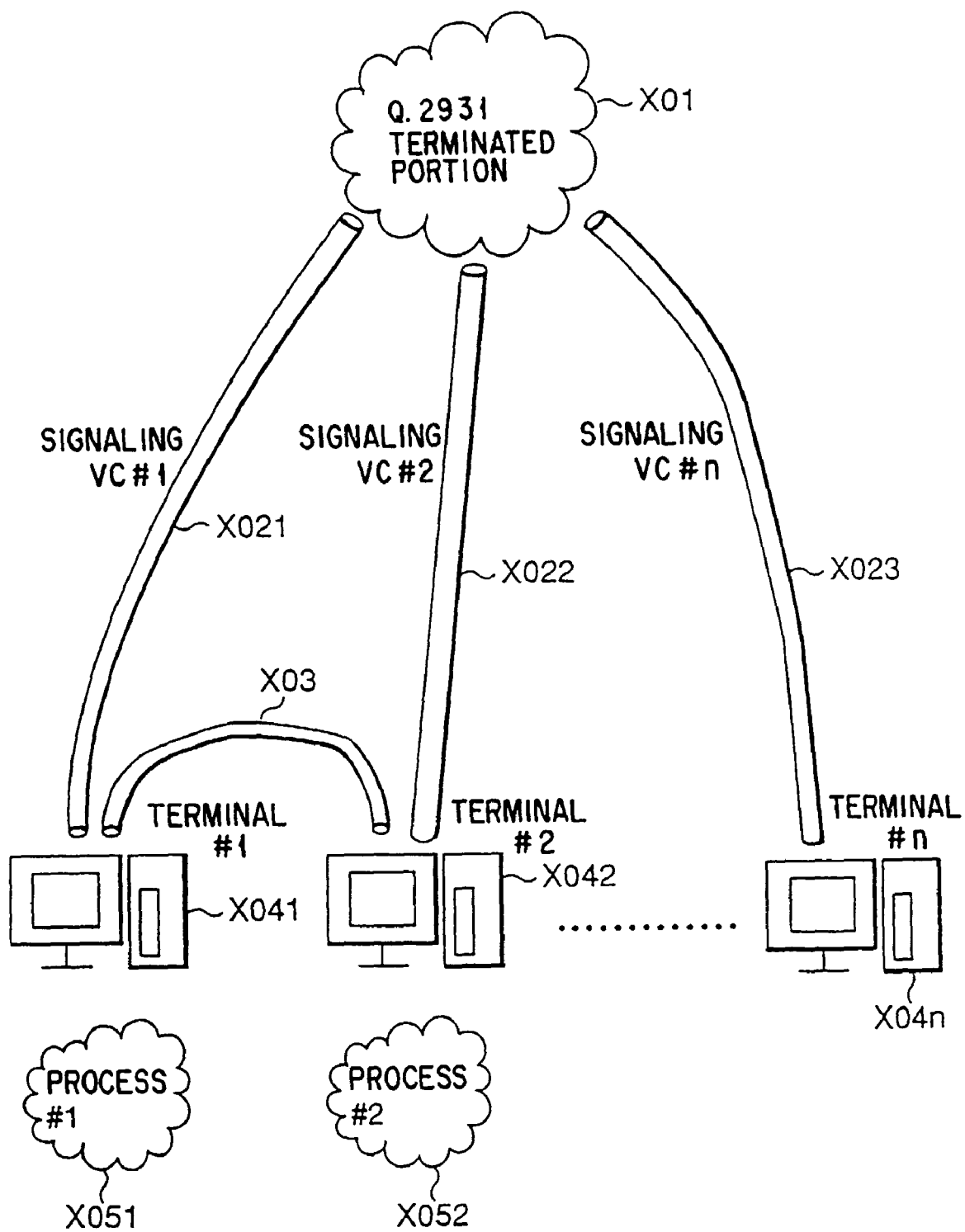
FIG. 31 is a view showing the arrangement of a conventional ATM communication system.
Figure 33:
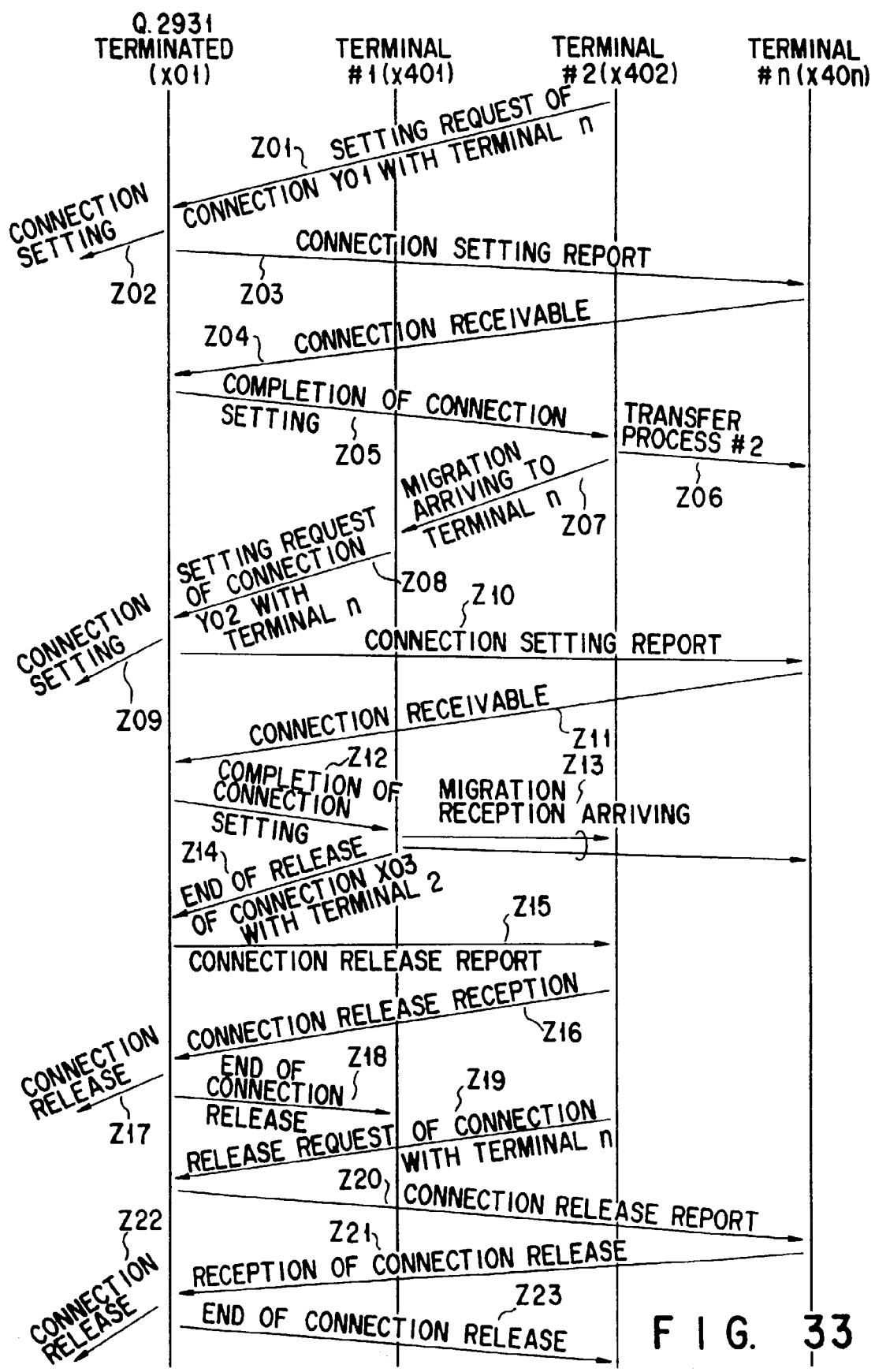
FIG. 33 is a view showing an executing procedure for process migration in the conventional ATM communication system.

FIG. 30 shows the process arrangement of terminals for realizing the above scheduling method for user processes according to the present invention. In each terminal, a process scheduler W02$i$, a communication bandwidth management process W03$i$, a resource allocation communication process W04$i$, and a self resource management process W05$i$.

The process scheduler W02$i$ of each terminal receives a resource request issued from the user process #i on each terminal, communicates with the process which managing the resource to perform allocation, and performs execution control of the user process. The self resource management process W05$i$ manages a file system and other resources which each terminal has, i.e., which can be accessed without the ATM-LAN. For this purpose, the self resource management process W05$i$ has a process queue equivalent to a process queue for file management shown in FIG. 19 in units of resources managed by the self resource management process W05$i$.

The communication bandwidth management process W03$i$, in order to manage the bandwidth of a predetermined physical link of the physical links in the ATM-LAN, has process queues for managing the communication bandwidths shown in FIG. 19 or FIG. 29 in units of physical links managed by the communication bandwidth management process W03$i$. The resource allocation communication process W04$i$ uses an n:n bidirectional ATM connection W06 to send a request of a resource which is requested by a user process W01$i$ executed on each terminal and is not managed by the terminal to another terminal, or to receive a request from another terminal to a resource managed by the corresponding terminal. This process performs an adaptation process such as cell dividing by an MID allocated on the n:n bidirectional ATM connection W06.

The communication bandwidth management process W03$i$ on each terminal manages the bandwidth of an allocated physical link in the ATM-LAN. For this reason, a physical link must be allocated to the communication bandwidth management process W03$i$ in an active state. An allocating method of a physical link in an active state and a notifying method to each terminal will be described below.

When a terminal connected to the ATM-LAN is powered on, each terminal starts the process scheduler W02$i$ to schedule a process group which independently executed by the corresponding terminal, and activates a multi-process environment. The process scheduler W02$i$ performs execution control of the user process W01$i$ or the like in the terminal, and, at the same time, presents function for performing inter-process communication. When inter-process communication is performed on a terminal, a message is necessarily exchanged between processes through the process scheduler W02$i$.

When the multi-process environment is activated, the terminal activates the self resource management process W05$i$ for managing resources such as a file system held by the terminal. The self resource management process W05$i$ includes a process queue for allocating resources which each terminal has. As performed in a work station available from the market, each terminal is arranged in such a manner that a list of resources which the terminal has can be formed immediately after the terminal is powered on. For this reason, the terminal can form a required process queue group by using the list of resources which the terminal has. Thereafter, each terminal activates the resource allocation communication process W04$i$ to communicate with another terminal and to switch resources. The resource allocation communication process W04$i$ communicates with another terminal by using the atmosphere and the n:n bidirectional ATM connection W06. It is assumed that VPIs/VCIs for identifying the n:n bidirectional ATM connection W06 by a physical link between a terminal and a hub, i.e., a VPI/VCI used when the process sends a cell and the VPI/VCI of a cell received by the process, are predetermined to control distributed application execution.

When the process scheduler W02$i$, the resource allocation communication process W04$i$, and the self resource management process W05$i$ are activated in each terminal, a manager of the ATM-LAN selects one terminal, and instructs the terminal to be an activation seed. The terminal which is instructed to be an activation seed recognizes the network configuration by using a method or the like disclosed by the present inventor in Japanese Patent Application No. 6-31180 to recognize hubs, terminals, and physical links included in the ATM-LAN.

The terminal serving as the activation seed, by using the result of the recognition of the network configuration, identifies each terminal constituting a "field" in which distributed applications are executed, and sets up the n:n bidirectional ATM connection W06. For this reason, the terminal rewrites the routing tag table of a required hub by using the method or the like disclosed by the present inventor in Japanese Patent Application No. 6-31180 to set the n:n bidirectional ATM connection W06. A VPI/VCI for identifying the connection is the above VPI/VCI which is used when each terminal sends information to the n:n bidirectional ATM connection W06 or receives information from the n:n bidirectional ATM connection W06.

When the n:n bidirectional ATM connection W06 is set, the resource allocation communication processes W04i of the terminals can communicate with each other. In this state, each resource allocation communication process W04i executes an MID acquisition procedure (to be described later) to acquire an MID used when each terminal performs communication by a variable length message using the n:n bidirectional ATM connection W06.

The MID acquisition protocol uses that one ATM cell is transferred on the n:n bidirectional ATM connection W06 without being divided. In order to execute the MID acquisition protocol, MID=0 is reserved. Each resource allocation communication process W041 sends a message of MID=0 constituted by a single cell as shown in FIG. 17.

However, in the protocol described herein, the MID is allocated by using the usable MID arriving message newly defined as a type of a MID operation message shown in FIG. 17.

Each resource allocation communication process W041 is started when no MID is allocated. Thereafter, usable MID arriving messages are sent at a predetermined period of time. In this case, the node number field includes the node number of a terminal in which the resource allocation communication process W041 which sends the message is executed. On the other hand, a value indicating that no MID is allocated is written in the allocation MID field because no MID is allocated at this time. MID=0 is allocated to an MID operation message, and cannot be allocated to the process. Therefore, from the point of view of effective use of an MID number space, it is desirable that the value zero is used as the value indicating that no MID is allocated.

According to the MID acquisition protocol described here, MIDs are not simultaneously allocated to the resource allocation communication processes W041, and the MIDs are sequentially allocated to the resource allocation communication process W041. More specifically, while the protocol described here operates, a process to which no MID is allocated and a process to which an MID is allocated may be present at same time. In the resource allocation communication process W041 in which an MID is allocated, the allocated MID is written in the allocation MID field, and the usable MID arriving messages are sent at predetermined time intervals.

Each usable MID arriving message is transferred to a corresponding one of the resource allocation communication processes W041 by the operation of the connection W06. When each resource allocation communication process W041 receives the usable MID arriving message from the connection W06 for a time about three times the sending time of the use MID arriving message, the resource allocation communication process W041 can obtain a table of MIDs used on the connection W06. In addition, the node number of a terminal in which the resource allocation communication process W041 to which no MID is allocated.

The resource allocation communication process W041 having no MID refers to the table of the usable MID acquired by the resource allocation communication process W041 to select an MID to be used by the resource allocation communication process W041 from remaining MIDs. When only one resource allocation communication process W041 acquires a new MID, MID acquisition is completed.

When a plurality of resource allocation communication processes W041 select MIDs at once, MIDs may collide with each other depending on these selections. In order to detect this and to reliably allocate a unique MID to each process, the following operation is performed.

The resource allocation communication process W041 which obtains the new MID waits for a predetermined time. In meantime, the resource allocation communication process W041 performs transmission of the usable MID arriving message and reception of the message from the connection again to update a table of an MID allocation state. At this time, as described above, the usable MID arriving message sent from the resource allocation communication process W041 includes an MID to be used by the resource allocation communication process W041. By referring to the table of the use state of an MID updated a predetermined time after, it is understood that another process does not try to use an MID to be used by the resource allocation communication process W041. In this case, communication using this MID can be started.

When it is understood by referring the updated table that at least another process tries to use the same MID, the node numbers of the terminal in which the competing processes are executed are compared with each other. When the node number of the terminal in which the resource allocation communication process W041 is executed is the smallest number in the terminal group in which the process group which tries to use the same MID, communication using this MID is started; otherwise, an unused MID is selected again, and a procedure for checking whether the MID collies with another MID is executed again.

In this MID selection, each process generates random numbers, and an MID is selected according to the random numbers. In this case, preferable characteristics in which a probability of MID collision decreases can be obtained.

When all the resource allocation communication processes W041 execute the procedure, a unique MID can be allocated to each process. It should be noted that this procedure is a procedure using that node numbers are uniquely allocated to all the terminals at manufacture time.

In this case, the above MID acquisition protocol is executed in such a manner that the terminal serving as an activation seed acquires MID=1 and other terminals acquire MIDs except for the MID=1. It is assumed that MID=1 is reserved for the terminal serving as the activation seed.

When the n:n bidirectional ATM connection W06 is set, the terminal serving as the activation seed uses the result of network configuration recognition to form the list of terminals which can execute the communication bandwidth management process W03i. Whether the terminal can execute the communication bandwidth management process W03i is checked by checking whether the version number of the operating system of the terminal obtained as the result of arrangement recognition exceeds a predetermined value.

When the list of terminals which execute the communication bandwidth management process W03i, the terminal serving as the activation seed, in reception of the result of network arrangement recognition, physical links in the ATM-LAN to the terminals in the formed list by a predetermined method such that an almost equal number of physical links are allocated to each terminal.

Upon completion of the above process, the terminal serving as the activation seed, via the resource allocation communication process W04i of the terminal, by using a message cellulated by MID=1, sequentially informs the terminals included in the previously formed list of the arrangement information of the ATM-LAN obtained as the result of arrangement recognition and the allocated physical links. The resource allocation communication process W04i changes a message into cells. As a destination of the message, the node number disclosed by the present inventor in Japanese Patent Application No. 6-31180 may be used.

On the other hand, the resource allocation communication process W04$i$ of each terminal assembles a message transferred through the n:n bidirectional ATM connection W06 on the basis of the MID of the cell. The resource allocation communication process W04$i$ receives a message to be sent to the resource allocation communication process W04$i$ with reference to the destination of the message. The terminal which receives the arrangement information of the ATM-LAN and the allocated physical links through the n:n bidirectional ATM connection W06 forms a process queue or the like for managing of the bandwidths of the allocated physical links, and then activates the communication bandwidth management process W03$i$ including the arrangement information of the ATM-LAN and the formed process queues. In the terminal serving as the activation seed, after process queues for managing the bandwidths of physical links allocated to the terminal, the communication bandwidth management process W03$i$ includes the process queues and the arrangement information of the ATM-LAN is activated.

With the above process, the communication bandwidth management process W03$i$ is activated in each terminal, and the physical links can be allocated to the communication bandwidth management process W03$i$. Subsequently, execution of the user processes W01$i$ on the terminals is managed in such a manner that the process scheduler W02$i$ of each terminal cooperates with reference to the process queues of the communication bandwidth management process W03$i$ in the following manner.

When the user process W01$i$ tries to assure a communication bandwidth used in communication with a terminal, the user process W01$i$ executes a protocol well known as, e.g., ARP, by using the method using communication on a broadcast channel disclosed by the present inventor in Japanese Patent Application No. 6-31180 or the n:n bidirectional ATM connection W06, thereby obtaining the node number of a communication destination. The user process W01$i$ executes inquiry to the communication bandwidth management process W03$i$ by using the obtained node number. The communication bandwidth management process W03$i$ forms the list of physical links used until the communication bandwidth management process W03$i$ reaches the terminal of the notified node number with reference to the arrangement information of the ATM-LAN held by the communication bandwidth management process W03$i$, and returns the list of physical links to the user process W01$i$ which executes inquiry.

When the user process W01$i$ receives the list of physical links, the user process W01$i$ sequentially sends communication bandwidth acquisition requests to the physical links in the list through the process scheduler W02$i$. When the process scheduler W02$i$ receives the communication bandwidth acquisition request, the process scheduler W02$i$ executes inquiry to the communication bandwidth management process W03$i$ in the self terminal to check whether the communication bandwidth acquisition request is a communication bandwidth acquisition request to the physical link managed in the self terminal. When the communication bandwidth acquisition request is the communication bandwidth acquisition request to the physical link managed in the self terminal, the process scheduler W02$i$ refers to a corresponding process queue in the communication bandwidth management process W03$i$ in the self terminal to check whether a bandwidth according to the request can be allocated. When the bandwidth according to the request can be allocated, the process scheduler W02$i$ enqueues the identifier of a user process which requests the resource to the corresponding process queue, and execution of the user process which issues the request is continued. When a bandwidth according to the request cannot be allocated, the following dead-lock detection procedure is executed by the process scheduler W02$i$.

When the communication bandwidth acquisition request is the communication bandwidth acquisition request corresponding to a physical link which is not managed in the self terminal, the communication bandwidth acquisition request is broadcasted to other terminals through the n:n bidirectional ATM connection W06. In each terminal, the communication bandwidth acquisition request sent through the n:n bidirectional ATM connection W06 is monitored. When the request is the communication bandwidth acquisition request to the physical link managed by the terminal, the terminal receives the communication bandwidth acquisition request to check whether a bandwidth according to the request can be allocated. If the resource is to be allocated, the identifier of the process which requests the resource is enqueued to the corresponding process queue. This checking result is informed to the terminal of a request sender by a response message including the checking result through the n:n bidirectional ATM connection W06. When the process scheduler W02$i$ of the terminal of the request sender receives a response message indicating that bandwidth allocation is succeeded, the process scheduler W02$i$ continues execution of the user process which requires the bandwidth. On the other hand, when the process scheduler W02$i$ receives a message indicating that bandwidth allocation is not succeeded, the process scheduler W02$i$ executes dead-lock detection procedure (to be described later). Note that it is assumed that the message indicating that bandwidth allocation is not succeeded includes the identifier of the process to which the resource is allocated. This is used in the dead-lock detection executed next.

When the terminal or another terminal fails to assure a bandwidth, before a user process (to be referred to a resource un-acquisition process) which issues the failed bandwidth allocation request becomes a sleep state, a dead-lock detection procedure shown in FIG. 21 or FIGS. 24 to 28 and resource interception (if necessary) must be performed. This procedure or the like is performed in the process arrangement shown in FIG. 30 in the same manner as described above.

According to method disclosed here, the process scheduler W02$i$ which controls execution of the resource un-acquisition process is mainly used to perform a dead-lock detection/avoidance process while performing inquiry or instruction to other process schedulers W02$i$. Subsequently, the process scheduler W02$i$ which mainly performs the dead-lock detection/avoidance process is called a master process scheduler, and a process scheduler W02$j$ is called slave process scheduler. It should be noted that the master process scheduler is only one, but the slave process scheduler means all the process schedulers except for the master process scheduler included in the ATM-LAN. It should be noted that any process scheduler may be the master process scheduler or the slave process scheduler.

The master process scheduler informs, through the n:n bidirectional ATM connection W06, each slave process scheduler of the identifier of the resource un-acquisition process. Each slave process scheduler W02$j$ received the identifier of the resource un-acquisition process refers to a communication bandwidth management process W03$j$ of the self terminal and a self resource management process W05$j$ to form a list (list A) of resources which have been allocated to a user process having the arrived identifier and a list (list B) of processes which waits for the resources in units of resources, and returns the lists A and B to the master process scheduler W02i through the n:n bidirectional ATM connection W06.

When the master process scheduler W02i receives, from each slave process scheduler, the list A which is a list of resources acquired by the resource un-acquisition process and the list B which is a list of processes waiting for these resources, the master process scheduler W02i refers to the communication bandwidth management process W03i on the terminal on which the master process scheduler W02i is executed and process queues included in the self resource management process W05i, adds resources which are managed by the self terminal and acquired by the resource un-acquisition process to the list A, and adds identifiers of processes which waits for resources managed by the self terminal and acquired by the resource un-acquisition process to the list B. In this manner, the lists A and B related to all the resources in the ATM-LAN are completed.

The master process scheduler W02i checks whether the identifier of a process (to be referred to a rejection reason process hereinafter), to which resources included in the response message indicating that the resource acquisition is failed and failed to be acquired by the user process is allocated, is included in the completed list B. When the identifier of the rejection reason process is not included in the list B, dead-lock does not occur. For this reason, resource un-acquisition process becomes a sleep state. At the same time, when the resource failed to be acquired is a resource managed by the self terminal, the master process scheduler W02i enqueues the identifier of the resource un-acquisition process to the resource process queue which fails to acquire the resource. When a resource managed by a terminal except for the terminal in which the process scheduler W02i is executed is used, a slave process scheduler on the terminal which manages the resource failed to be acquired is requested to register the identifier of the resource un-acquisition process to a process queue, by using the n:n bidirectional ATM connection W06. A slave process scheduler requested to enqueue the identifier of resource un-acquisition process to the process queue through the n:n bidirectional ATM connection W06 executes the requested operation, and notifies the master process scheduler W02i of the completion of the operation through the n:n bidirectional ATM connection W06.

When the identifier of the rejection reason process is included in the completed list B, dead-lock occurs. For this reason, interception of the resource is performed to avoid the dead-lock. For this purpose, the master process scheduler W02i performs the following process.

The master process scheduler W02i refers to the completed list A, and knows the type of the resource which has been acquired by the resource un-acquisition process on the basis of resources for which the rejection reason process waits. In addition, since the rejection reason process has acquired the resource, the type of a resource failed to be acquired by the resource un-acquisition process can be known.

Depending on these types of resources, it is determined whether the resource acquired by the rejection reason process is intercepted to be allocated to the resource un-acquisition process or the resource acquired by the resource un-acquisition process is intercepted to intercept the resource acquired by the rejection reason process.

When the resource which is acquired by the rejection reason process and is to be acquired by the reason un-acquisition process and the resource which is requested by the resource un-acquisition process and is to be acquired by the rejection reason process are resources having no side effect (in the case indicated by circled number 15 in FIG. 20), the rejection reason process waits for the resource which has been acquired by the resource un-acquisition process to be set in a sleep state. For this reason, in order to execute the resource un-acquisition process first, the resource acquired by the rejection reason process is intercepted to be resource un-acquisition process.

When the resource which is acquired by the rejection reason process and is to be acquired by the resource un-acquisition process or the resource which is requested by the resource un-acquisition process and to be acquired by the rejection reason process is a resource having a side effect (in the case indicated by circled number 14 in FIG. 20), a resource having no side effect is preferably intercepted to reduce overhead related to the interception.

When both of the resource which is acquired by the rejection reason process and is to be acquired by the reason un-acquisition process and the resource which is requested by the resource un-acquisition process and is to be acquired by the rejection reason process are resources having side effects, it is regarded that a distributed application itself has dead-lock characteristics, an alarm may be given to the manager of the ATM-LAN to inform the manager of dead-lock occurrence. When the ATM-LAN manager is notified of the dead-lock occurrence, the manager can set the process occurring dead-lock in a KILL state by inputting a command to release the dead-lock.

When a resource to be intercepted, an intercepted process, and a process for newly allocating an intercepted resource are determined, the master process scheduler forms a resource interception message including the identifier of the resource to be intercepted, the identifier of the intercepted process, and the identifier of the process for allocating the intercepted resource, and sends the resource interception message to all the slave process schedulers through the n:n bidirectional ATM connection W06.

According to the contents of the message, the slave process scheduler which receives the resource interception message updates the process queue managed by the terminal in which the slave process scheduler is executed. As a result, when the slave process scheduler restarts the process which is executed and managed by the slave process scheduler, the slave process scheduler restarts the process. The same operation as described above is also executed by the master process scheduler which has sent the resource interception message.

With the above operation, the above dead-lock avoidance can be executed in the distributed environment. In this case, in the above operation, it should be noted that the identifiers of the processes and the identifiers of the files are exchanged between the terminals. For this reason, these identifiers must be unique in the entire ATM-LAN. However, this condition can be satisfied such that numbers obtained by adding a node number unique to the ATM-LAN disclosed by the present inventor in Japanese Patent Application No. 6-31180 to process numbers or file numbers independently added to the terminals are transferred as process numbers or node numbers on the n:n bidirectional ATM connection W06.

The above operation is performed in all the physical links on the route to the terminal having a resource to be used. When communication bandwidths can be acquired in all the physical links, a connection to be set by the user process is set on the an ATM-LAN.

Note that it is cleared for one skilled in the art that a request to resources except for files and communication bandwidths can be processed in the same manner that of the request to the communication bandwidth described above.

In execution of the procedure for performing the dead-lock detection/avoidance, when each slave process scheduler allocates a resource to another user process or causes another user process to be set in a resource waiting state, the consistency between the contents of the lists A and B formed to detect dead-lock and a resource allocation state in execution of avoidance is lost, and incorrect dead-lock detection may be performed. In order to avoid this, in a period of time from when the identifier of the resource un-acquisition process is broadcasted to when an enqueue command of the resource un-acquisition process to a process queue or a resource interception command to another process is broadcasted, each process scheduler may temporarily stop allocation of resource is to the user process. This temporary stop can be easily realized by allocating no processor to the user process which requests resources.

An operation performed when the network arrangement changes will be described below. In the ATM-LAN, increase/decrease in physical link and terminal in number relatively frequently occur. For this reason, it is desired that the frame of management described here can automatically follow the change in network arrangement.

The communication bandwidth management process W03$i$, of the terminal serving as the activation state in the ATM-LAN, which sends a message to the n:n bi-directional ATM connection W06 at MID=1 performs recognition of the entire arrangement of ATM-LAN at a predetermined constant cycle by the method disclosed by the present inventor in Japanese Patent Application No. 6-31180 to update arrangement information assured by the communication bandwidth management process W03$i$.

If new physical link is arranged, the communication bandwidth management process W03$i$ determines the communication bandwidth management process W03$j$ for managing the new physical link, the communication bandwidth management process W03$i$ requests the communication bandwidth management process W03$j$ through the n:n bidirectional ATM connection W06 to add the managed physical link. The communication bandwidth management process W03$j$ requested to add the managed physical link forms a process queue corresponding to the added physical link to prepare communication bandwidth management. Upon completion of preparation, the communication bandwidth management process W03$i$ uses the n:n bidirectional ATM connection W06 to notify a request sender of the completion of preparation.

When the physical link is removed, the communication bandwidth management process W03$i$ of the terminal of MID=1 transfers a removal request, through the connection W06, to the communication bandwidth management process W03$j$ which manages the bandwidth of the physical link. When the communication bandwidth management process W03$j$ is requested to remove the physical link, the communication bandwidth management process W03$j$ removes a process queue corresponding to the physical link from itself. Upon completion of removal, the communication bandwidth management process W03$i$ informs the request sender of the removal of process queue.

When the connection state is changed, the communication bandwidth management process W03$i$ of the terminal of MID=1 forms a message including new arrangement information, and sends the message to another communication bandwidth management process W03$j$ through the connection W06. When each communication bandwidth management process W03$j$ receives a message for informing that the connection state is changed, the communication bandwidth management process W03$j$ updates the arrangement information assured by the communication bandwidth management process W03$j$.

In order to perform the above operation, the communication bandwidth management process on the terminal of MID=1 has the arrangement information of the ATM-LAN, management information such as the process queue of a physical link managed by the process, and information indicating that a specific communication bandwidth management process manages a specific physical link.

Process Migration

A case wherein process migration is performed with the process arrangement shown in FIG. 30 will be described. In this case, a method of performing process migration of a communication bandwidth process to make it possible to perform connection setting even if a terminal is temporarily stopped for maintenance is disclosed.

In order to execute physical link allocation by the communication bandwidth management process described above, the communication bandwidth management process must be recognize each physical link. For this purpose, an identifier must be allocated to each physical link. When the node numbers disclosed by the present inventor in Japanese Patent Application No. 6-31180 and port numbers allocated to the hubs are paired, and these pairs are used as the identifiers of the physical links, the node numbers are global-uniquely defined. For this reason, the identifiers of the physical links are also global-uniquely defined. More specifically, when management of a physical link is to be performed on any terminal, the identifier of the same physical link can be used. For this reason, the communication bandwidth management process W03$i$ which manages the bandwidth of a physical link can be realized with small overhead.

When the terminal in which the communication bandwidth management process W03$i$ is executed is turned off, in order to continue allocation of the physical links, the communication bandwidth management process W03$i$ is migrated. In this case, the process advances as follows. When the communication bandwidth management process W03$i$ receives an instruction of migration from an ATM-LAN maintenance person, the communication bandwidth management process W03$i$ searches for a terminal for executing the communication bandwidth management process W03$i$. This search is performed on the bidirectional ATM connection W06 by searching for a terminal having the lightest load.

The communication bandwidth management process W03$i$ specifies the terminal of a migration destination to the terminal in which the communication bandwidth management process W03$i$ is newly executed, and requests the process scheduler W02$i$ to transfer the communication bandwidth management process W03$i$ to the new terminal. When the process scheduler W02$i$ receives a request of migration from the communication bandwidth management process W03$i$ executed and managed by the process scheduler W02$i$, the process scheduler W02$i$ sleeps the communication bandwidth management process W03$i$, and transfers the communication bandwidth management process W03$i$ to the process scheduler W02$j$ of the specified terminal through, e.g., the n:n bi-directional ATM connection W06.

When the process scheduler W02$j$ receives the communication bandwidth management process W03$i$, the process scheduler W02$j$ restarts the received communication bandwidth management process W03*i* as a process executed and managed by the process scheduler W02*j*.

When the migrated communication bandwidth management process W03*i* is re-executed on a new terminal, the communication bandwidth management process W03*i* can correspond to the resource allocation request from the user process W01*i* or the like again. This can be realized because each communication bandwidth management process W03*i* identifies physical links by means of identifiers which are global unique, i.e., significant on all the terminals on the ATM-LAN, and also identifies user processes.

As described above, the communication bandwidth management process started on the terminal serving as the activation seed, in preparation for the following change in arrangement, holds information indicating that a specific physical link is allocated to a specific communication bandwidth management process. For this reason, the communication bandwidth management processes must be identified. According to the present invention, when identification of the processes is performed by MIDs, and the MIDs are used in migration, the migration can be executed without rewriting information about the relationship between the communication bandwidth processes and the physical links. Overhead related to the migration can be reduced. For this purpose, an MID is allocated to each communication bandwidth management process W03*i*. In this manner, even after the migration, a change in arrangement information in each communication bandwidth management process caused by the above change in arrangement can be executed without rewriting the information held by the communication bandwidth management process.

When the process scheduler W02*i* receives a request from the communication bandwidth management process W03*i*, the process scheduler W02*i* executes migration of the communication bandwidth management process W03*i* at this time, the code of the communication bandwidth management process W03*i* and an environment (process queue or the like) held by the process must be transferred on the n:n bidirectional ATM connection. As an MID used for changing a message for this transfer into cells, an MID which is originally used by the communication bandwidth management process W03*i* which performs the transfer. However, in this case, when the communication bandwidth management process W03*i* is migrated, there is no MID used when the following scheduler sends a message to the n:n bidirectional ATM connection. In order to solve this problem, an MID is given to the process scheduler. More specifically, in order to migrate the communication bandwidth management process, two types of MIDs for sending a message on the n:n bidirectional ATM connection are desirably allocated to the terminal in which the communication bandwidth management process is executed. This can be realized in such a manner that one terminal operates to acquire two MIDs in an MID allocation protocol, i.e., two messages indicating that an MID to be used by a terminal is informed to another terminal are sent. One of the acquired MIDs is used to identify the communication bandwidth management processes, and the other is used to identify the process schedulers.

As described above, when identification of the communication bandwidth management processes is not performed by node numbers, but is performed by MIDS, even if a terminal is temporarily stopped for maintenance, a communication bandwidth management process executed on the terminal can be easily migrated to another terminal. This is an advantage of a distributed application on the ATM communication system to which the present invention is applied. Note that the process scheduler W02*i* and the self resource management process W05*i* are unique processes of each terminal. When a terminal is stopped, these processes may be stopped. That is, these processes are not subjected to migration. MIDs allocated to the processes which are not subjected to migration are identifiers for identifying the processes, and can also be used as an identifier of a terminal in which these processes are executed.

When migration of a user process is to be performed, in order to reduce overhead in migration, it is apparent that a process identifier on a process queue must be global unique. The identifier of a process, e.g., the above "pair between the node number of the terminal in which the process is executed and a process number on the terminal", is a kind of global unique identifier. This identifier can be continuously used without being rewritten in migration. In this case, it must be understood that the node number does not indicate "terminal in which the process is executed", but the node number of "terminal in which the process is started". In this case, in order to reuse process number issued from each terminal, when execution of a migrated process is completed, by using the node number which means the "terminal in which the process is started", the process number of the completed process is preferably informed to the terminal having the node number.

It is apparent that communication between user processes which are migrated can be realized according to the above principle. In this case, in addition to, the n:n bidirectional ATM connection W06, an ATM connection group according to the principle of the present invention is set as a matter of course.

The description of a scheduling method of distributed-executed user processes to which the present invention is applied and a method of realizing the scheduling method using the present invention is completed.

As has been described above, according to the present invention, communication between processes subjected to migration is performed through an n:n bidirectional ATM connection, or an m:n uni-directional ATM connection and an n:m unidirectional ATM connection, and a process identifier such as an MID used when a message for inter-process communication into cells is allocated to each process. Therefore, the communication can be continued by using the allocated process and connection identifiers after migration, overhead in migration can be reduced.

According to the present invention, since a resource which is preferentially intercepted is set to be the bandwidth of an ATM connection in detection of dead-lock, overhead in a process switching state can be considerably reduced.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A communication method of performing communications between a plurality of terminals connected to each other through at least one switch, comprising:

setting, in advance of a process migration, a connection for connecting two or more of the plurality of terminals bi-directionally by means of the at least one switch, the two or more of the plurality of terminals being determined to have a possibility of becoming an object of the process migration;

copying a message output from one of the terminals and transferring copied messages to the terminals determined to become the object of the process migration; and moving a process executed on one of the two or more of the plurality of terminals to another of the two or more of the plurality of terminals, the process using the connection both before and after the migration, wherein the connection setting includes assigning a connection identifier for each of the two or more of the plurality of terminals, so that each of the two or more of the plurality of terminals identifies the connection based on the same value of connection identifier on transmitting a message onto the connection.

2. A process migration method in a communication system having at least one switch which connects a plurality of terminals, comprising:

setting, through the at least one switch, a connection for connecting two or more of the plurality of terminals bi-directionally, the two or more of the plurality of terminals being determined to have a possibility of becoming an object of the process migration;

copying a message output from one of the terminals and transferring copied messages to the terminals determined to become the object of the process migration; and migrating a process executed on one of the two or more of the plurality of terminals to another of the two or more of the plurality of terminals, the process migration using the connection both before and after the migration, wherein the setting assigns a connection identifier for each of the two or more of the plurality of terminals so that each of the two or more of the plurality of terminals identifies the connection based on the same value of connection identifier on transmitting a message onto the connection.

* * * * *